United States Patent
Aoki

(10) Patent No.: US 7,876,369 B2
(45) Date of Patent: Jan. 25, 2011

(54) IMAGE PROCESSING APPARATUS, IMAGE PROCESSING METHOD, AND PROGRAM

(75) Inventor: Junichi Aoki, Tokyo (JP)

(73) Assignee: Sony Corporation, Tokyo (JP)

(*) Notice: Subject to any disclaimer, the term of this patent is extended or adjusted under 35 U.S.C. 154(b) by 532 days.

(21) Appl. No.: 11/866,717

(22) Filed: Oct. 3, 2007

(65) Prior Publication Data

US 2008/0117318 A1 May 22, 2008

(30) Foreign Application Priority Data

Nov. 20, 2006 (JP) ............................. 2006-313183

(51) Int. Cl.
*H04N 9/64* (2006.01)
(52) U.S. Cl. ..................... 348/246; 348/247
(58) Field of Classification Search ................ 348/246, 348/247
See application file for complete search history.

(56) References Cited

U.S. PATENT DOCUMENTS

| 5,854,655 | A  | * | 12/1998 | Watanabe et al. | ........... 348/247 |
| 7,092,018 | B1 | * | 8/2006  | Watanabe        | .............. 348/247 |
| 2005/0099516 | A1 | * | 5/2005 | Kagle et al.    | .............. 348/246 |
| 2006/0125939 | A1 | * | 6/2006 | Yoneda          | ....................... 348/246 |

FOREIGN PATENT DOCUMENTS

| JP | 4-115785    | 4/1992  |
| JP | 2002-330353 | 11/2002 |
| JP | 2004-056395 | 2/2004  |
| JP | 2005-184307 | 7/2005  |
| JP | 2005-341244 | 12/2005 |

* cited by examiner

*Primary Examiner*—Sinh Tran
*Assistant Examiner*—Anthony J Daniels
(74) *Attorney, Agent, or Firm*—Oblon, Spivak, McClelland, Maier & Neustadt, L.L.P.

(57) ABSTRACT

In an image processing apparatus, a defect detection unit detects a defective pixel and a defect level thereof by comparing a maximum pixel value detected at each pixel position of a plurality of images captured via an image taking operation performed a plurality of times by an image sensor with a threshold value for detecting white defective pixels, and/or by comparing a minimum pixel value detected at each pixel position of the plurality of images with a threshold value for detecting black defective pixels. A defective pixel selection unit selects a predetermined plurality of defective pixels with high defect degrees, and registers defect data associated with the predetermined plurality of selected defective pixels in the defect data table. A defect correction unit corrects pixel values of pixels of the image output from the image sensor, in accordance with the defect data registered in the defect data table.

12 Claims, 34 Drawing Sheets

FIG. 9

| | n-2 | n-1 | n | n+1 | n+2 |
|---|---|---|---|---|---|
| m-2 | G$_{(m-2)(n-2)}$ | B$_{(m-2)(n-1)}$ | G$_{(m-2)n}$ | B$_{(m-2)(n+1)}$ | G$_{(m-2)(n+2)}$ |
| m-1 | R$_{(m-1)(n-2)}$ | G$_{(m-1)(n-1)}$ | R$_{(m-1)n}$ | G$_{(m-1)(n+1)}$ | R$_{(m-1)(n+2)}$ |
| m | G$_{m(n-2)}$ | B$_{m(n-1)}$ | G$_{mn}$ | B$_{m(n+1)}$ | G$_{m(n+2)}$ |
| m+1 | R$_{(m+1)(n-2)}$ | G$_{(m+1)(n-1)}$ | R$_{(m+1)n}$ | G$_{(m+1)(n+1)}$ | R$_{(m+1)(n+2)}$ |
| m+2 | G$_{(m+2)(n-2)}$ | B$_{(m+2)(n-1)}$ | G$_{(m+2)n}$ | B$_{(m+2)(n+1)}$ | G$_{(m+2)(n+2)}$ |

$$G'_{mn} = (G_{(m-2)n} + G_{(m+2)n} + G_{m(n-2)} + G_{m(n+2)})/4$$

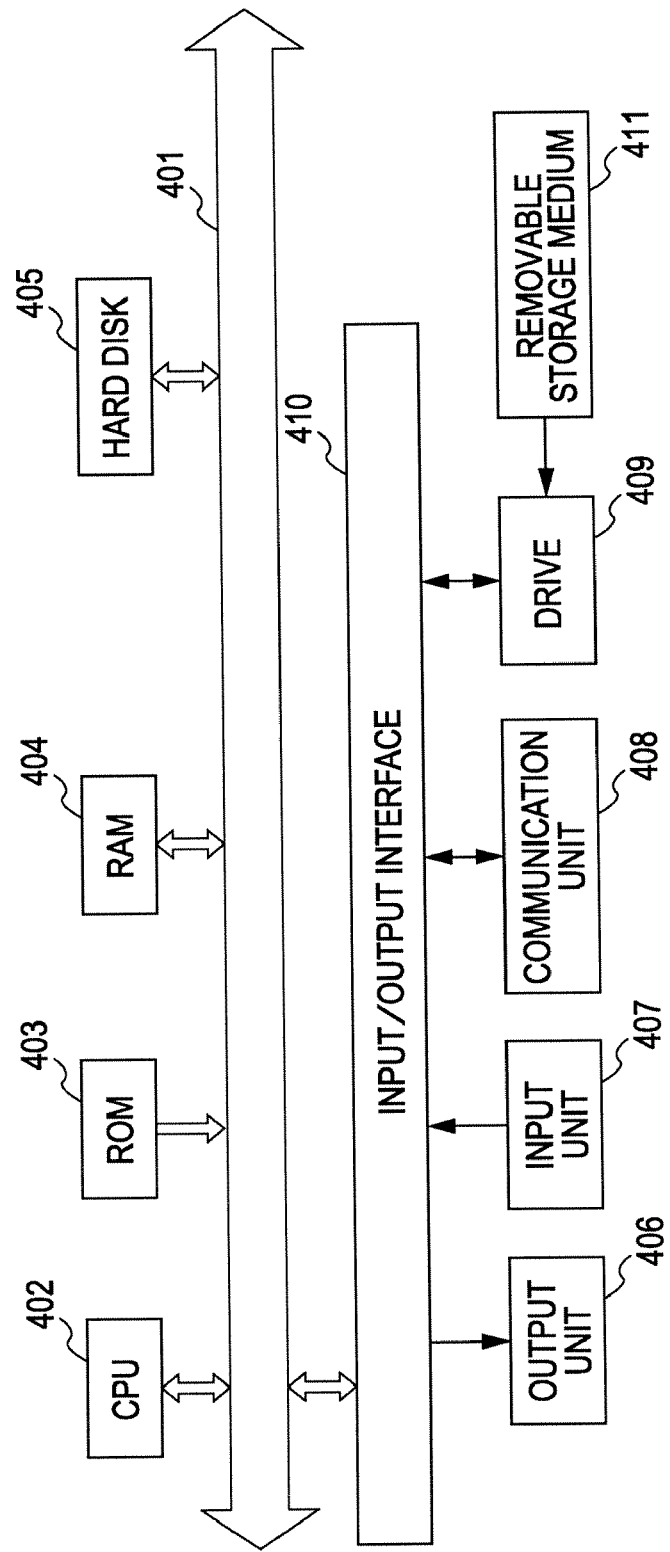

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2006-313183 filed in the Japanese Patent Office on Nov. 20, 2006, the entire contents of which are incorporated herein by reference.

BACKGROUND OF THE INVENTION

1. Field of the Invention

The present invention relates to an image processing apparatus, an image processing method, and an image processing program, and more particularly, to an image processing apparatus, an image processing method, and an image processing program, adapted to correct defective pixels of a still camera or a video camera in a highly reliable manner.

2. Description of the Related Art

In a digital still camera, a digital video camera, or a similar camera, an image is taken by sensing the image and converting an optical image signal into a corresponding electric signal using an image sensor (a solid-state image sensor) such as a CCD (Charge Coupled Device) or CMOS (Complementary Metal Oxide Semiconductor) image sensor.

All pixels of an image sensor are not necessarily normal, and defect can occur at some pixels. If defects occur, an image output from the image sensor having defective pixels has deviations of pixel values from correct values at defective pixels, which cause the image to become unnatural.

Note that defects occur at pixels of the image sensor, and the defects of the image sensor cause an image output from the image sensor to have abnormal dots corresponding to the defective pixels. However, hereinafter, for convenience of explanation, a state in which an image sensor has defective pixels will also be described as "an image has defective pixels".

To prevent a camera from producing an unnatural image caused by defective pixels, it is desirable to detect defective pixels and correct pixel values of the detected defective pixels.

Detection of defective pixels and correction of pixel values of defective pixels may be performed, for example, as follows.

One method of detecting defective pixels is to compare a pixel value of each pixel of an image taken by an image sensor (hereinafter, referred to simple as an image) with a predetermined threshold value and determine, on the basis of the comparison result, whether each pixel is defective.

One method of correcting pixel values of defective pixels is to determine a correct pixel value of each defective pixel from pixel values of pixels located close to the defective pixel according to a proper algorithm. Another method is to determine a correct pixel value of each defective pixel depending on a defective level indicating the degree of defect of each defective pixel.

The threshold value for detecting defective pixels may be a fixed threshold value determined in advance or a variable threshold value dynamically determined depending on pixel values of pixels located close to a pixel of interest being subjected to the comparison of the pixel value with respect to the threshold value.

In the method of determining whether a pixel of interest of an image is defective by comparing the pixel value of the pixel of interest with the predetermined threshold value, if the threshold value is dynamically determined depending on pixel values of pixels located close to the pixel of interest, then the method is equivalent to a method in which a predictive pixel value is determined based on pixel values of pixels located close to the pixel of interest, and the determination as to whether the pixel of interest is defective is made by judging whether the difference between the pixel value of the pixel of interest and the predictive pixel value is within an allowable small range.

For example, in a case where the threshold value is set to be equal to a pixel value p of a pixel adjacent to the pixel of interest plus a fixed margin C, that is, the threshold value is set to p+C, if the pixel of interest has a pixel value v, then the determination as to whether the pixel of interest is defective or not by judging whether the pixel value v is greater than the threshold value p+C is equivalent to the determination made by employing the pixel value p of the pixel adjacent to the pixel of interest as the predictive pixel value and judging whether the difference (v−p) between the pixel value v of the pixel of interest and the predictive pixel value p is within a small range equal to the margin C.

The determination as to whether the pixel of interest is defective is made, as described above, on the basis of the relative magnitude of the pixel value of the pixel of interest with respect to the threshold value. This means that if a defective pixel has a pixel value close to the threshold value, a fluctuation of the pixel value can cause the determination as to whether the pixel of interest is defective to fluctuate between affirmative and negative conclusions.

One technique to prevent the above problem and improve reliability in detection of defective pixels is to evaluate the pixel value of each pixel a plurality of times. More specifically, the pixel value of each pixel is compared with the threshold value for each of a plurality of images captured by the image sensor via an image taking operation performed a plurality of times. If the number of occurrences of detection of defect at a particular pixel position is greater than a predetermined value, then the pixel at this pixel position is determined to be defective (see, for example, Japanese Unexamined Patent Application Publication No. 04-115785 or Japanese Unexamined Patent Application Publication No. 2005-341244).

SUMMARY OF THE INVENTION

Defective pixels can be classified into two types, i.e., permanent defective pixels and intermittent defective pixels. The permanent defective pixels are always in a state in which pixels are defective. In contrast, the intermittent defective pixels are in a defective state at some times but are in a non-defective state at other times.

Therefore, in the method in which the number of occurrences of detection of a defective state at each pixel position is counted, and if the number of occurrences of defective state detection for a particular pixel is greater than a threshold value, this pixel is regarded as a defective pixel, there is a possibility that intermittent defective pixels are incorrectly regarded as non-defective pixels.

The higher the frequency of occurrence of defective state of intermittent defective pixels, the greater the number of occurrences of detection of defect and thus the higher the probability that intermittent defective pixels are detected as defective pixels.

Conversely, the lower the frequency of occurrence of defective state of intermittent defective pixels, the smaller the number of occurrences of detection of defect and thus the lower the probability that intermittent defective pixels are detected as defective pixels. Furthermore, in the method of detecting defective pixels based on the number of occurrences of detection of defect, there is a possibility that, depending on the reference value, intermittent defective pixels with a low frequency of occurrence of defective state are not detected as defective pixels.

In the method of detecting defective pixels based on the number of occurrences of detection of defect, as described above, intermittent defective pixels with a high frequency of occurrence of defective state and with a low defective level are detected as defective pixels with a high probability, but intermittent defective pixels with a low frequency of occurrence of defective state and with a high defective level are low in probability of being detected as defective pixels.

Thus, although intermittent defective pixels with low defective levels detected as defective pixels are corrected, intermittent defective pixels with high defective levels which are not detected as defective pixels are not corrected.

In an image, defective pixels which are high in defect level are more conspicuous than defective pixels which are low in defect level. Therefore, it is desirable to correct pixel values of defective pixels in decreasing order of defect level starting with the defective pixel with the highest defect level.

In view of the above, it is desirable to provide a technique to correct defective pixels in a highly reliable manner.

According to an embodiment of the present invention, there is provided an image processing apparatus adapted to process an image output from image sensing means, including defect detection means for detecting a defective pixel, and defect correction means for correcting a pixel value of a pixel of the image output from the image sensing means, in accordance with a defect data table in which defect data associated with the defective pixel detected by the defect detection means is registered, wherein the defect detection means includes at least one of white defect detection means and black defect detection means, the white defect detection means being adapted to detect a defective pixel and a defect level indicating the degree of a defect of the detected defective pixel, by comparing a maximum pixel value detected at each pixel position of a plurality of images captured via an image taking operation performed a plurality of times by the image sensing means with a threshold value for detecting white defect, the black defect detection means being adapted to detect a defective pixel and a defect level indicating the degree of a defect of the detected defective pixel, by comparing a minimum pixel value detected at each pixel position of the plurality of images with a threshold value for detecting black defect, and the defect detection means also includes defective pixel selection means for selecting, based on the defect levels, a predetermined plurality of defective pixels with high defect degrees, and registering defect data associated with the predetermined plurality of selected defective pixels in the defect data table.

According to an embodiment of the present invention, there is provided a method/computer program of processing an image output from image sensing means, including the steps of detecting a defective pixel, and correcting a pixel value of a pixel of the image output from the image sensing means, in accordance with a defect data table in which defect data associated with the defective pixel detected in the defective pixel detection step is registered, wherein the defect detection step includes at least one of a white defect detection step and a black defect detection step, the white defect detection step including detecting a defective pixel and a defect level indicating the degree of a defect of the detected defective pixel, by comparing a maximum pixel value detected at each pixel position of a plurality of images captured via an image taking operation performed a plurality of times by the image sensing means with a threshold value for detecting white defect, the black defect detection step including detecting a defective pixel and a defect level indicating the degree of a defect of the detected defective pixel, by comparing a minimum pixel value detected at each pixel position of the plurality of images with a threshold value for detecting black defect, and the step of selecting, based on the defect levels, a predetermined plurality of defective pixels with high defect degrees, and registering defect data associated with the predetermined plurality of selected defective pixels in the defect data table.

In the image processing apparatus and the image processing method/program, defective pixels are detected, and pixel values of pixels of the image output from the image sensing means are corrected in accordance with the defect data table in which defect data associated with defective pixels is registered. The detection of defective pixels includes at least one or both of a white defect detection process or a black defect detection process. The white defect detection process includes detecting a defective pixel and a defect level indicating the degree of a defect of the detected defective pixel, by comparing a maximum pixel value detected at each pixel position of a plurality of images captured via an image taking operation performed a plurality of times by the image sensing means with the threshold value for detecting white defect. The black defect detection process includes detecting a defective pixel and a defect level indicating the degree of a defect of the detected defective pixel, by comparing a minimum pixel value detected at each pixel position of the plurality of images with the threshold value for detecting black defect. Based on the defect levels, a predetermined plurality of defective pixels with high defect degrees are selected, and defect data associated with the predetermined plurality of selected defective pixels is registered in the defect data table.

The computer program may be supplied via a transmission medium or a storage medium.

The present invention makes it possible to correct pixel values of defective pixels in a highly reliable manner.

BRIEF DESCRIPTION OF THE DRAWINGS

FIG. 9 is a diagram illustrating an example of a method of determining a predictive pixel value of a pixel of interest;

FIG. 34 is a block diagram illustrating an example of a configuration of a computer.

DESCRIPTION OF THE PREFERRED EMBODIMENTS

Figure 1:
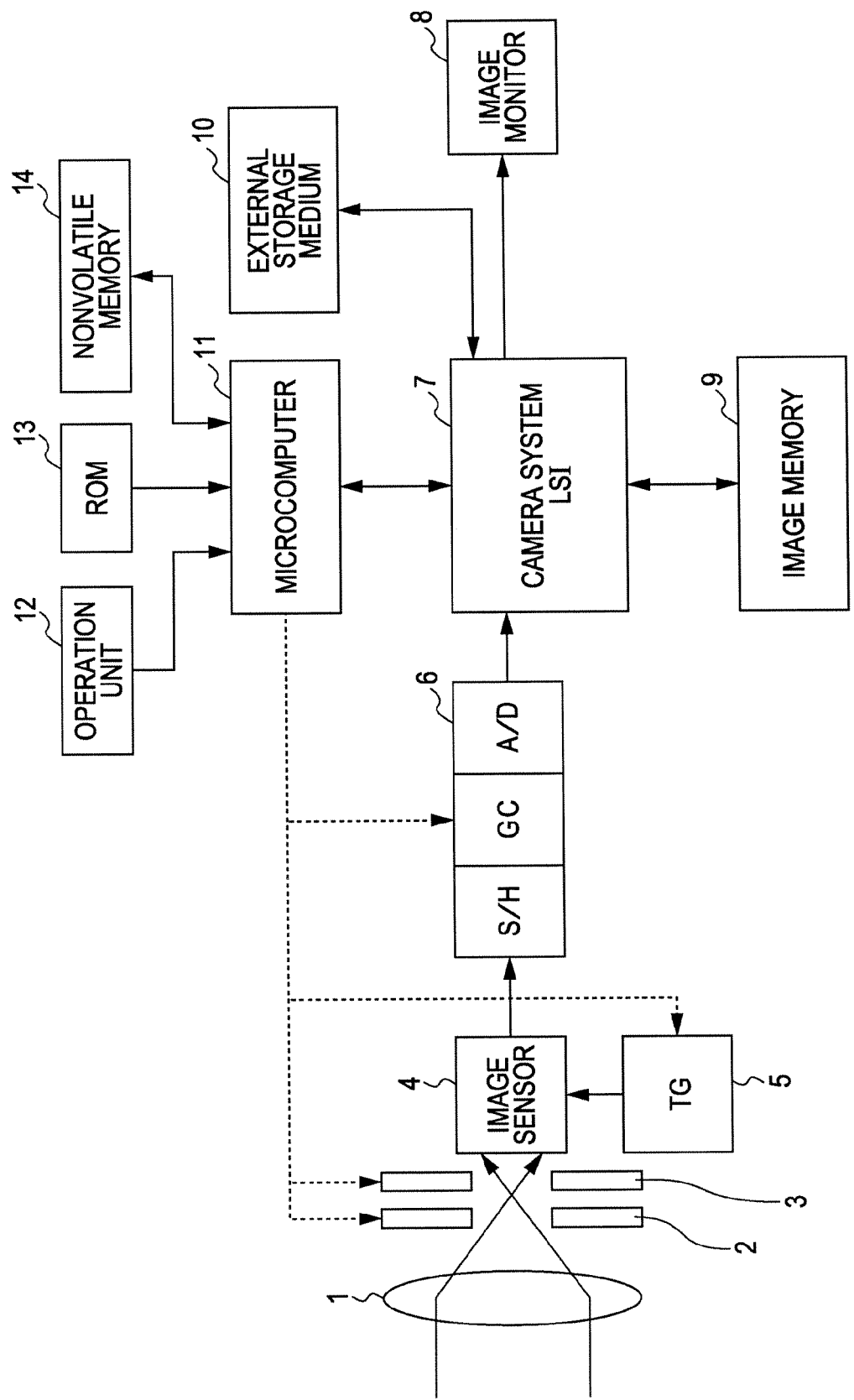
FIG. 1 is a block diagram illustrating an example of a configuration of a digital still camera according to an embodiment of the present invention.

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

According to an embodiment of the present invention, there is provided an image processing apparatus (for example, a digital still camera shown in FIG. 1) adapted to process an image output from image sensing means (for example, an image sensor 4 shown in FIG. 4) including defect detection means (for example, a defect detection unit 103 shown in FIG. 4 or a defect detection unit 303 shown in FIG. 28) for detecting a defective pixel, and defect correction means (for example, a defect correction unit 101 shown in FIG. 4 or a defect correction unit 201 shown in FIG. 28) for correcting a pixel value of a pixel of the image output from the image sensing means, in accordance with a defect data table in which defect data associated with the defective pixel detected by the defect detection means is registered. In this image processing apparatus, the defect detection means includes at least one of white defect detection means (for example, a white defect detection unit 121 shown in FIG. 5 or a white defect detection unit 321 shown in FIG. 29) and black defect detection means (for example, a black defect detection unit 122 shown in FIG. 5 or a black defect detection unit 322 shown in FIG. 29), wherein the white defect detection means is adapted to detect a defective pixel and a defect level indicating the degree of a defect of the detected defective pixel, by comparing a maximum pixel value detected at each pixel position of a plurality of images captured via an image taking operation performed a plurality of times by the image sensing means with a threshold value for detecting white defect, and the black defect detection means is adapted to detect a defective pixel and a defect level indicating the degree of a defect of the detected defective pixel, by comparing a minimum pixel value detected at each pixel position of the plurality of images with a threshold value for detecting black defect. The defect detection means further includes defective pixel selection means (for example, a defective pixel selection unit 123 shown in FIG. 5 or a defective pixel selection unit 323 shown in FIG. 29) for selecting, based on the defect levels, a predetermined plurality of defective pixels with high defect degrees, and registering defect data associated with the predetermined plurality of selected defective pixels in the defect data table.

Figure 17:
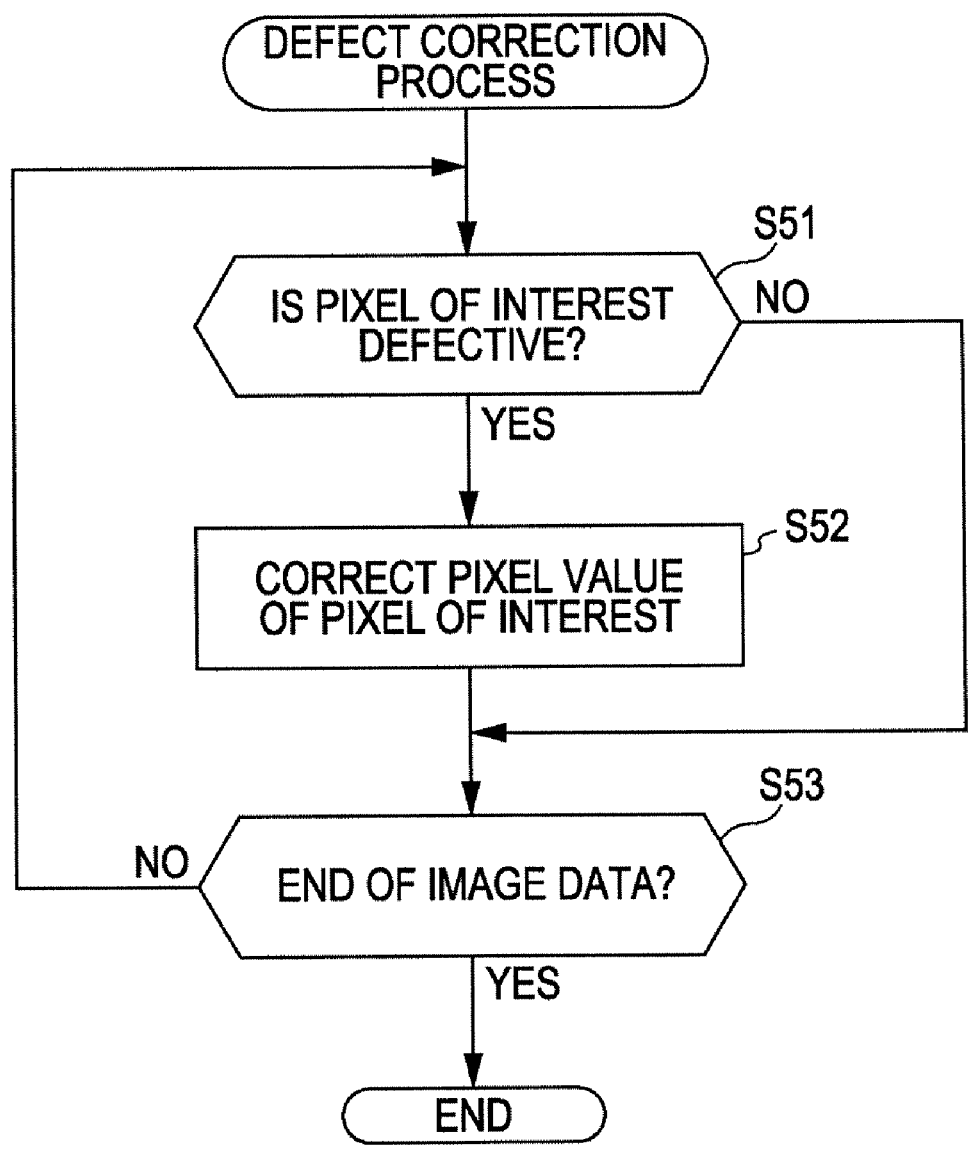
FIG. 17 is a flow chart illustrating a defect correction process.
Figure 26:
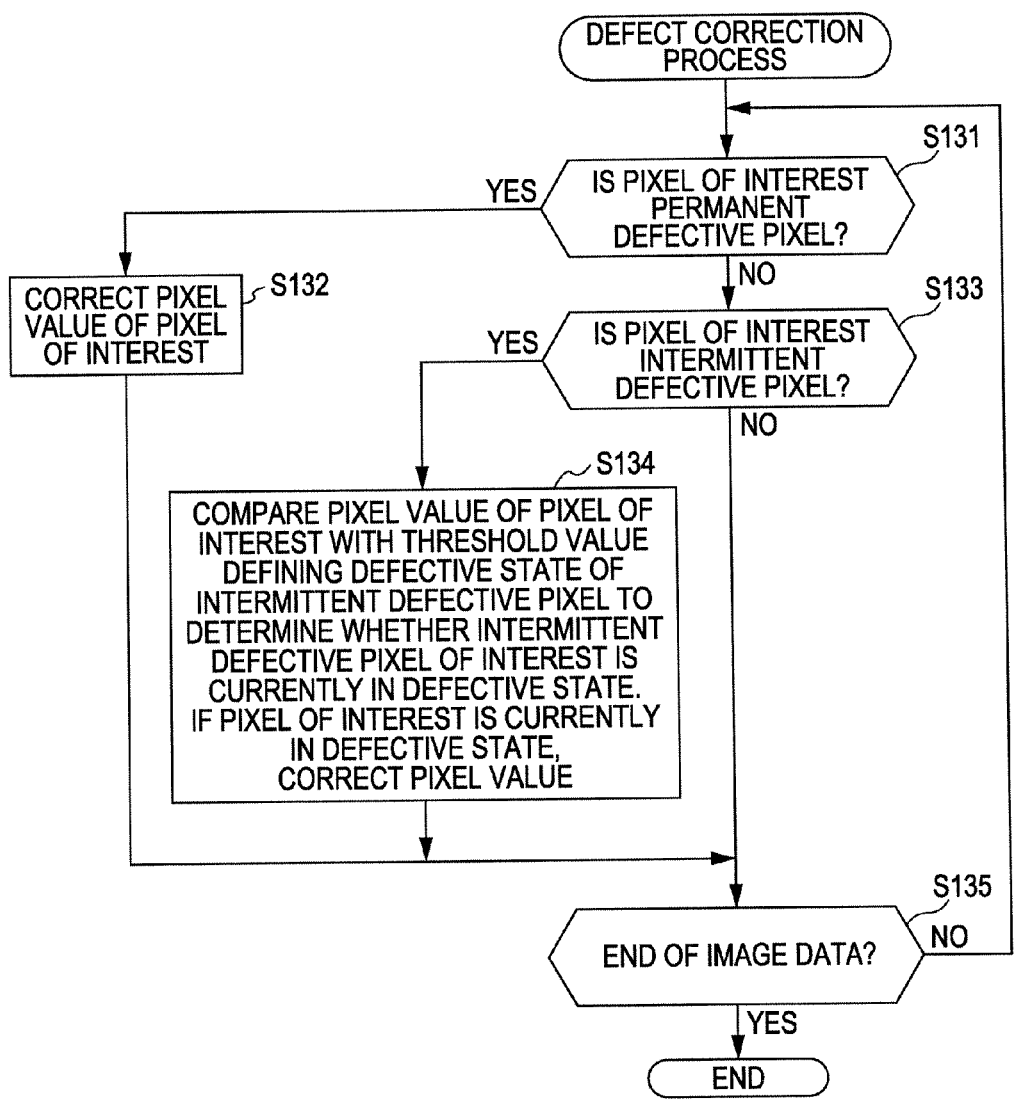
FIG. 26 is a flow chart illustrating a defect correction process.
Figure 27:
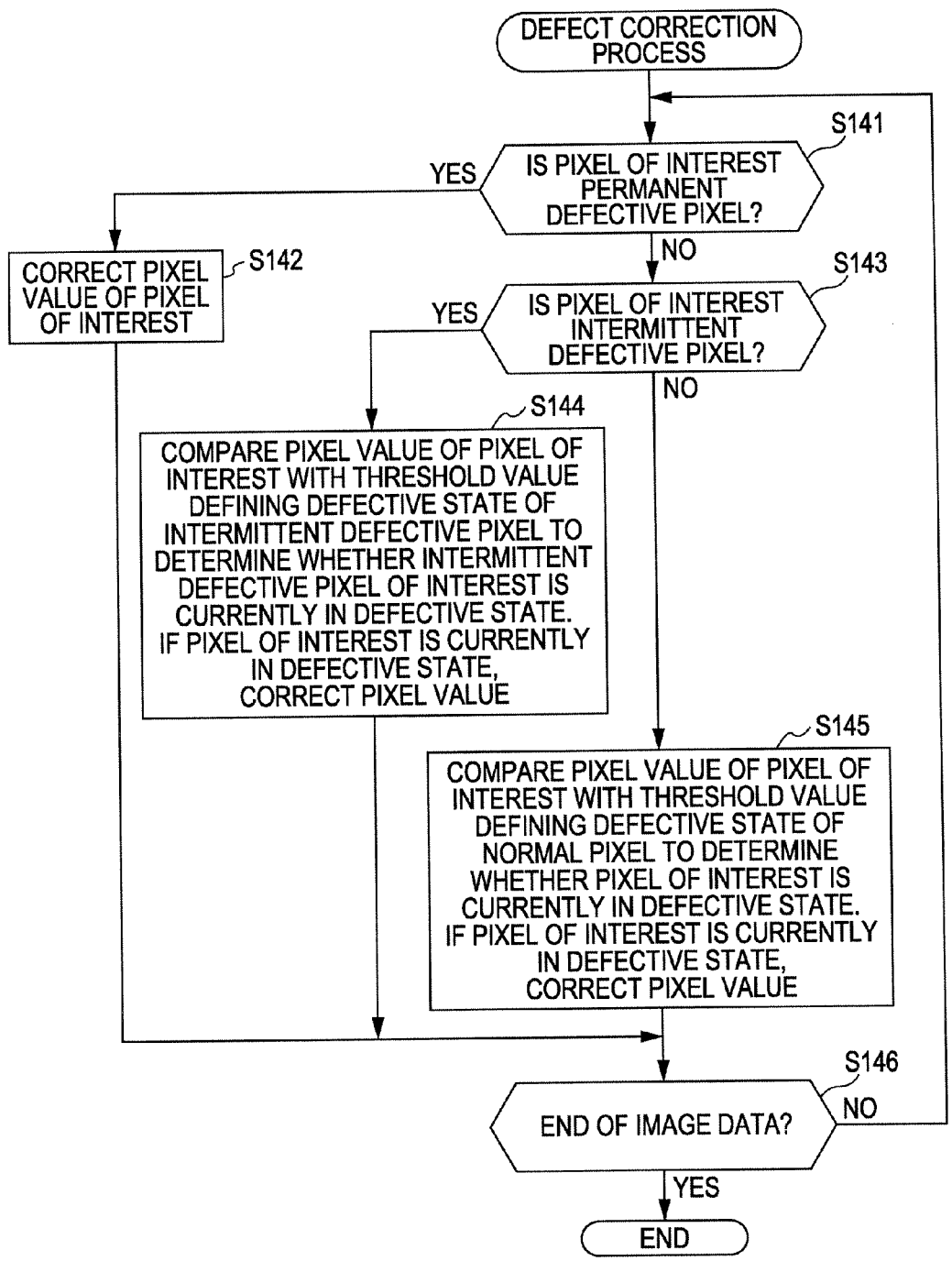
FIG. 27 is a flow chart illustrating a defect correction process.

According to an embodiment of the present invention, there is provided a method/computer program of processing an image output from image sensing means, including the steps of detecting a defective pixel (for example, in a defect detection process shown in FIG. 14 or 31), and correcting a pixel value of a pixel of the image output from the image sensing means, in accordance with a defect data table in which defect data associated with the defective pixel detected by the defective pixel detection step is registered (for example, in a defect correction process shown in FIG. 17, 26 or 27). In this image processing method/program, the defect detection step includes at least one of a white defect detection step (for example, step S11 shown in FIG. 14 or step S151 shown in FIG. 31) and a black defect detection step (for example, step S12 shown in FIG. 14 or step S152 shown in FIG. 31), wherein the white defect detection step includes detecting a defective pixel and a defect level indicating the degree of a defect of the detected defective pixel, by comparing a maximum pixel value detected at each pixel position of a plurality of images captured via an image taking operation performed a plurality of times by the image sensing means with a threshold value for detecting white defect, and the black defect detection step includes detecting a defective pixel and a defect level indicating the degree of a defect of the detected defective pixel, by comparing a minimum pixel value detected at each pixel position of the plurality of images with a threshold value for detecting black defect.

The defect detection step further includes the step (for example, step S13 or S14 shown in FIG. 14 or step S153 or S154 shown in FIG. 31) of selecting, based on the defect levels, a predetermined plurality of defective pixels with high defect degrees, and registering defect data associated with the predetermined plurality of selected defective pixels in the defect data table.

Now, specific embodiments of the present invention are described below with reference to the accompanying drawings.

FIG. 1 illustrates an example of a configuration of a digital still camera according to an embodiment of the present invention.

A lens unit 1 including a focusing lens, a zoom lens, and other lenses serves to focus incident light on an image sensor 4 via a diaphragm 2 and a shutter 3.

The diaphragm 2 adjusts the amount of light incident on the image sensor 4 via the lens unit 1, by controlling the size of an aperture via which the light passes. The shutter 3 controls an exposure time by blocking the light incident on the image sensor 4. The shutter 3 may be removed when the diaphragm 2 is configured to function also as a shutter.

The image sensor 4 is implemented by a CCD or CMOS imager, and serves to sense an image and output an electric signal corresponding to the image. More specifically, the image sensor 4 performs a photoelectric conversion in accordance with a driving pulse output from a timing generator 5 such that light incident on the image sensor 4 is converted into an electric signal corresponding to the amount of incident light and the resultant electric signal is output as an image signal. The image signal output from the image sensor 4 is supplied to a front end unit 6.

On a surface, on which light is incident, of the image sensor 4, a plurality of color filters (not shown) are disposed, for example, in the form of a Bayer array such that each pixel of the image sensor 4 receives light with a particular color and outputs a pixel value of the particular color.

The timing generator 5 outputs driving pulses in synchronization with a horizontal synchronizing signal and a vertical synchronizing signal to drive the image sensor 4. When the image sensor 4 has an electronic shutter function, the timing generator 5 also controls the electronic shutter operation. By controlling the electronic shutter to operate at a high or low speed, it is possible to control the light exposure.

The front end unit 6 includes a sample-and-hold circuit, a gain control circuit, and an analog-to-digital converter, and serves to perform pre-processing on the image signal supplied from the image sensor 4. More specifically, in the front end unit 6, the image signal output from the image sensor 4 is subjected to double-correlation sampling for removing noise, and gain control processing for adjusting a signal level, and a resultant analog image signal is subjected to an analog-to-digital conversion. The obtained digital image data is output from the front end unit 6 to a camera system LSI (Large Scale Integration) 7.

In the camera system LSI 7, the image data supplied from the front end unit 6 is subjected to camera signal processing including a defect correction, digital clamping, a white balance correction, a gamma correction, and interpolation. The image data including RGB (Red, Green, and Blue) pixel values obtained as a result of the camera signal processing is supplied to an image monitor 8. The camera system LSI 7 further converts the RGB image data into image data including a luminance signal Y and color difference signals Cb and Cr.

As required, the camera system LSI 7 encodes image data according to, for example, the JPEG (Joint Photographic Experts Group) standard, and supplies resultant encoded data to an image memory 9 or an external storage medium 10.

The camera system LSI 7 reads the encoded data from the image memory 9 or the external storage medium 10, decodes the read data into image data, and supplies the resultant image data to the image monitor 8.

The image monitor 8 is implemented, for example, by a liquid crystal panel and serves to display an image in accordance with the image data supplied from the camera system LSI 7. A user, who operates the digital still camera, can check composition by viewing the image displayed on the image monitor 8.

The image memory 9 is implemented by, for example, a semiconductor memory such as SDRAM (Synchronous Dynamic Random Access Memory), and serves to temporarily store the encoded data supplied from the camera system LSI 7 and other data necessary in processing performed by the camera system LSI 7.

The external storage medium 10 is, for example, a semiconductor memory removably attached to the digital still camera shown in FIG. 1, and serves to store the encoded data supplied from the camera system LSI 7. The external storage medium 10 can be removed from the digital still camera and can be carried by a user.

A microcomputer 11 executes a program stored in a ROM (Read Only Memory) 13 or a nonvolatile memory 14 to control the diaphragm 2, the shutter 3, the timing generator 5, the front end unit 6, and the camera system LSI 7.

An operation unit 12 includes a shutter button which is operated to capture image data sensed by the image sensor 4 and store the captured image data into the external storage medium 10, a zoom button which is operated to adjust zooming, and other various buttons. When one of these buttons is operated by a user, an operation signal corresponding to the operation performed by the user is supplied to the microcomputer 11.

The ROM 13 serves to store a program executed by the microcomputer 11 and data necessary in the execution of the program.

The nonvolatile memory 14 stores a program executed by the microcomputer 11. The nonvolatile memory 14 also stores data necessary in various processes performed by the microcomputer 11.

Figure 2:
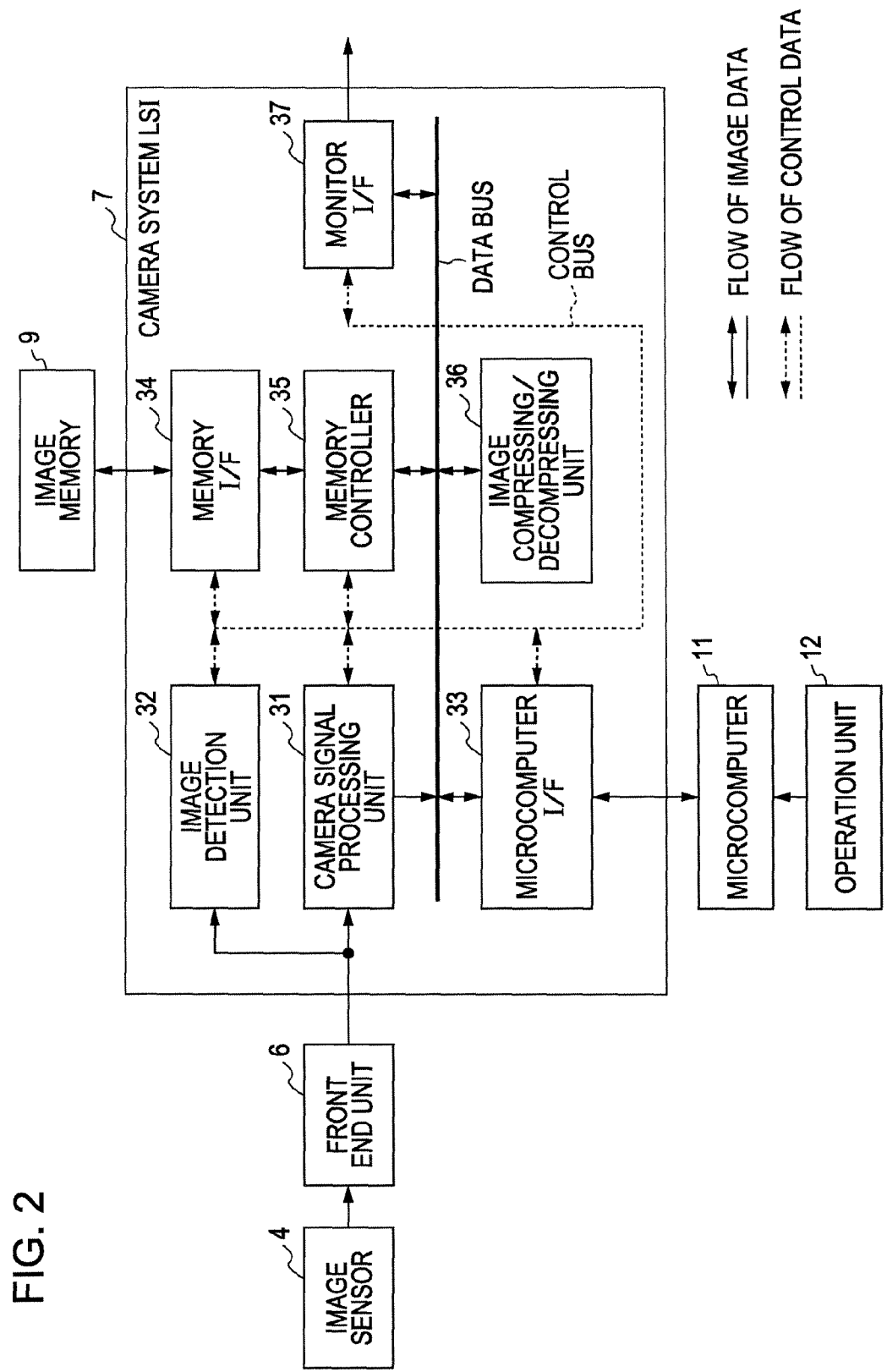
FIG. 2 is a block diagram illustrating an example of a configuration of a camera system LSI.

FIG. 2 illustrates an example of a configuration of the camera system LSI 7 shown in FIG. 1.

The camera system LSI 7 includes a camera signal processing unit 31, an image detector 32, a microcomputer interface 33, a memory interface 34, a memory controller 35, an image compressing/decompressing unit 36, and a monitor interface 37. In the camera system LSI 7, the above-described parts such as the camera signal processing unit 31 and the monitor interface 37 are connected to each other via a data bus so that image data, control data, and other data can be transmitted among them.

The camera signal processing unit 31 corrects defects of image data supplied from the image sensor 4 via the front end unit 6. The camera signal processing unit 31 also performs digital signal processing including interpolation, filtering, matrix processing, luminance signal generation, and color signal generation, on the input image data, thereby producing image data including pixel values each expressed by a luminance signal and color difference signals (color signals).

The image detector 32 performs a detection process on the image data supplied from the image sensor 4 via the front end unit 6 to obtain reference values used in automatic focus (AF) control, automatic exposure (AE) control, and automatic white balance (AWB) control.

The microcomputer interface 33 functions as an interface with the microcomputer 11. Transmission of image data or control data between the camera system LSI 7 and the microcomputer 11 is performed via the microcomputer interface 33.

The memory interface 34 functions as an interface with the image memory 9 or the external storage medium 10. That is, transmission of image data (which may be in an encoded form) between the camera system LSI 7 and the image memory 9 or the external storage medium 10 is performed via the memory interface 34.

The memory controller 35 controls transmission of image data among various blocks of the camera system LSI 7 (via a data bus).

The image compressing/decompressing unit 36 encodes supplied image data into a compressed form and outputs the resultant encoded data. When the image compressing/decompressing unit 36 receives encoded data, the image compressing/decompressing unit 36 decodes the supplied encoded data into a decompressed form of image data, and outputs the resultant image data.

The monitor interface 37 converts supplied image data into a format for use by the image monitor 8 (FIG. 1), and supplies the resultant image data in the converted format to the image monitor 8. For example, when the image monitor 8 is configured to display an image according to the NTSC (National Television System Committee) standard, a NTSC encoder is used as the monitor interface 37.

Figure 3:
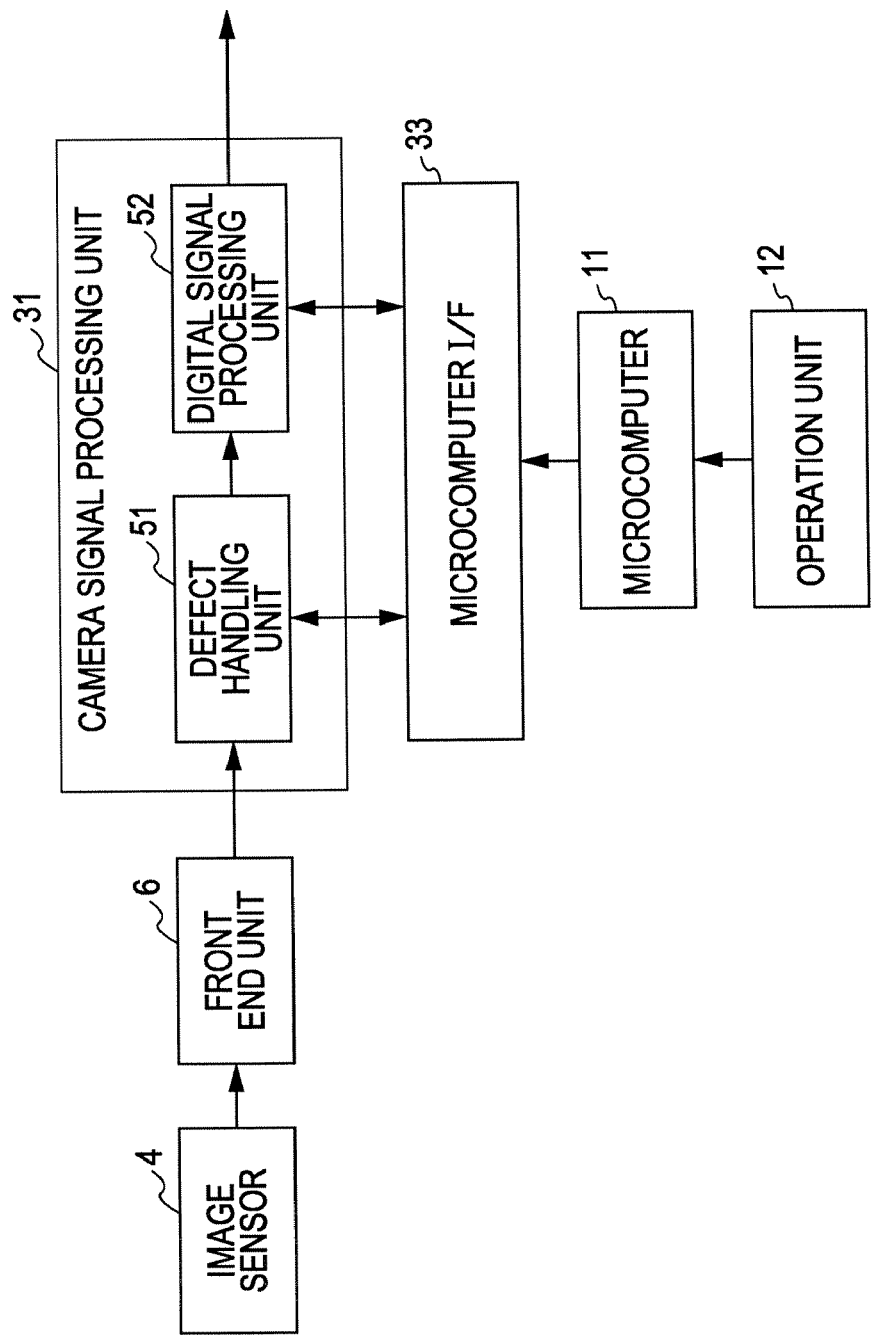
FIG. 3 is a block diagram illustrating an example of a configuration of a camera signal processing unit.

FIG. 3 illustrates an example of a configuration of the camera signal processing unit 31 shown in FIG. 2.

The camera signal processing unit 31 includes a defect handling unit 51 and a digital signal processing unit 52.

When image data is supplied to the camera signal processing unit 31 from the image sensor 4 via the front end unit 6, the image data is supplied to the defect handling unit 51.

The defect handling unit 51 performs, on the image data supplied from the image sensor 4, a defect detection process to detect a defective pixel and a defect correction process to correct a pixel value of the detected defective pixel, as required, and supplies the resultant image data to the digital signal processing unit 52.

The digital signal processing unit 52 performs a digital signal process such as an interpolation process on the image data supplied from the defect handling unit 51, and outputs resultant image data including pixel values each expressed by a luminance signal and color difference signals.

The defect handling unit 51 and the digital signal processing unit 52 are controlled by the microcomputer 11 via the microcomputer interface 33.

If a user operates the operation unit 12 to issue a command to perform the defect detection process, a defect detection command signal is output from the operation unit 12 as an operation signal corresponding to the operation performed by the user, and supplied to the defect handling unit 51 via the microcomputer 11 and the microcomputer interface 33. If the defect handling unit 51 receives the defect detection command signal from the microcomputer interface 33, the defect handling unit 51 performs the defect detection process.

Figure 4:
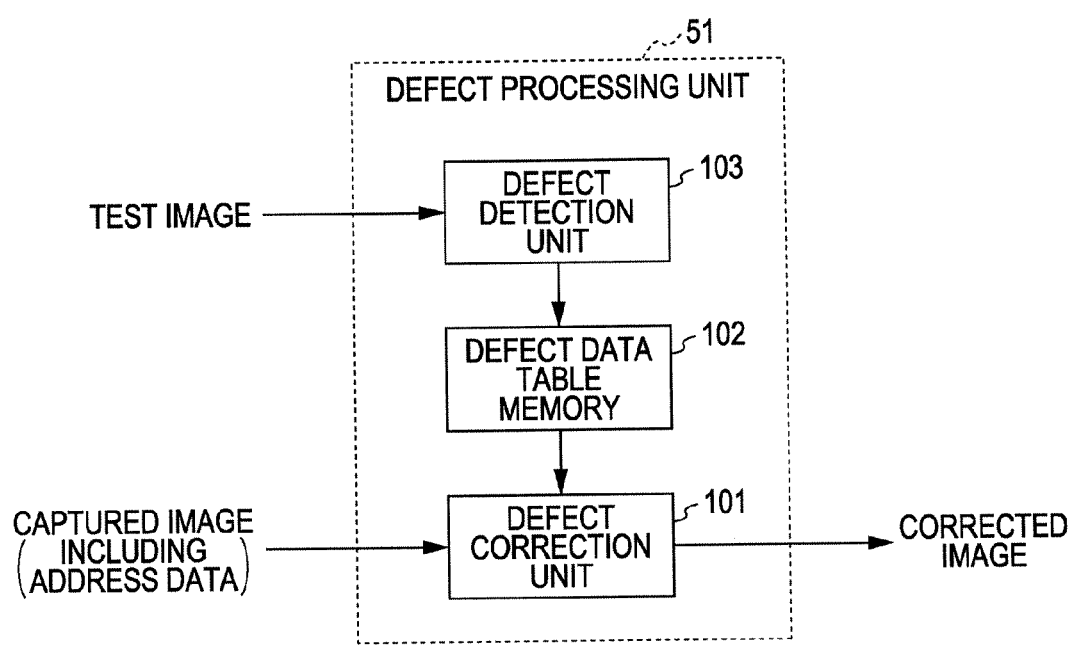
FIG. 4 is a block diagram illustrating an example of a configuration of a defect handling unit.

FIG. 4 illustrates an example of a configuration of the defect handling unit 51 shown in FIG. 3.

In the example shown in FIG. 4, the defect handling unit 51 includes a defect correction unit 101, a defect data table memory 102, and a defect detection unit 103.

The defect correction unit 101 receives image data output from the image sensor 4 (FIG. 1) via the front end unit 6. Hereinafter, such image data output from the image sensor 4 will be referred to simply as image data. The defect correction unit 101 performs a defect correction process to correct pixel values of the image data output from the image sensor 4 in accordance with defect data of defective pixels registered in a defect data table stored in the defect data table memory 102, and the defect correction unit 101 supplies corrected image data obtained as a result of the defect correction process to the digital signal processing unit 52 (FIG. 3).

The defect data table memory 102 stores the defect data table in which defect data associated with defective pixels detected by the defect detection unit 103 is described.

The defect data table memory 102 may be implemented using, for example, a nonvolatile memory such as a RAM (Random Access Memory) or an EEPROM (Electrically Erasable Programmable Read-only Memory).

In the case in which the defect data table memory 102 is implemented using a nonvolatile memory, the defect data table is read from the nonvolatile memory 14 shown in FIG. 1 into the defect data table memory 102 in the defect handling unit 51 of the camera signal processing unit 31 (FIG. 3) via the microcomputer 11 (FIG. 1) and the microcomputer interface 33 (FIG. 2) each time the power of the digital still camera shown in FIG. 1 is turned on.

In the case where the defect data table is stored in the nonvolatile memory 14 shown in FIG. 1, the defect data table may be encoded into a compressed form and the encoded defect data table may be stored in the nonvolatile memory 14. In this case, when the defect data table is read into the defect data table memory 102, the encoded defect data table is decoded into a decompressed form and the resultant decoded defect data table is stored in the defect data table memory 102. The encoding and the decoding of the defect data table may be performed by the microcomputer 11 (FIG. 17).

The defect detection unit 103 is supplied with test image data to be used in the defect pixel detection process. As for the test image data, image data which is output from the image sensor 4 and which is not yet subjected to the defect correction process may be employed, or image data which is output from the image sensor 4 and which has been subjected to the defect correction process performed by the defect correction unit 101 may be employed.

If the defect detection unit 103 receives test image data, the defect detection unit 103 performs the defect detection process to detect defective pixels, and the defect detection unit 103 registers defect data associated with detected defective pixels in the defect data table in the defect data table memory 102.

The defect detection process and the defect correction process performed by the defect handling unit 51 configured in the above-described manner are explained in further detail below.

If a user operates the operation unit 12 shown in FIG. 1 to issue a command to perform the defect detection process, a defect detection command signal is output from the operation unit 12 as an operation signal corresponding to the operation performed by the user, and supplied to the microcomputer 11.

If the microcomputer 11 receives the defect detection command signal from the operation unit 12, the microcomputer 11 switches an operation mode from a normal mode in which an image is taken in a normal manner into a defect detection mode to detect defects. The microcomputer 11 then controls the timing generator 5 (FIG. 1) so that the image sensor 4 takes an image a plurality of times.

A plurality of frames of image data or corrected image data obtained as a result of the image taking operation performed by the image sensor 4 are supplied as test image data to the defect detection unit 103.

The microcomputer 11 controls, via the microcomputer interface 33 (FIG. 2), the defect detection unit 103 of the defect handling unit 51 in the camera signal processing unit 31 to perform the defect detection process.

Under the control of the microcomputer 11, the defect detection unit 103 performs the defect detection process as described below. If the defect detection unit 103 receives the plurality of frames of test image data from the image sensor 4, the defect detection unit 103 detects defective pixels and registers defect data associated with detected defective pixels in the defect data table in the defect data table memory 102.

If the defect detection unit 103 has registered defect data in the defect data table, the microcomputer 11 switches the operation mode from the defect detection mode to the normal mode.

In a case where the defect data table in the defect data table memory 102 has existing defect data, new defect data produced by the defect detection unit 103 is stored in the defect data table such that the existing defect data is overwritten by the new defect data.

In the operation in the normal mode, if the image sensor 4 takes an image, and resultant image data is supplied to the defect correction unit 101, the defect correction unit 101 performs the defect correction process.

More specifically, the defect correction unit 101 corrects, as required, pixel values of the received test image data in accordance with the defect data table stored in the defect data table memory 102, and supplies corrected image data obtained as a result of the defect correction process to the digital signal processing unit 52 (FIG. 3).

Figure 5:
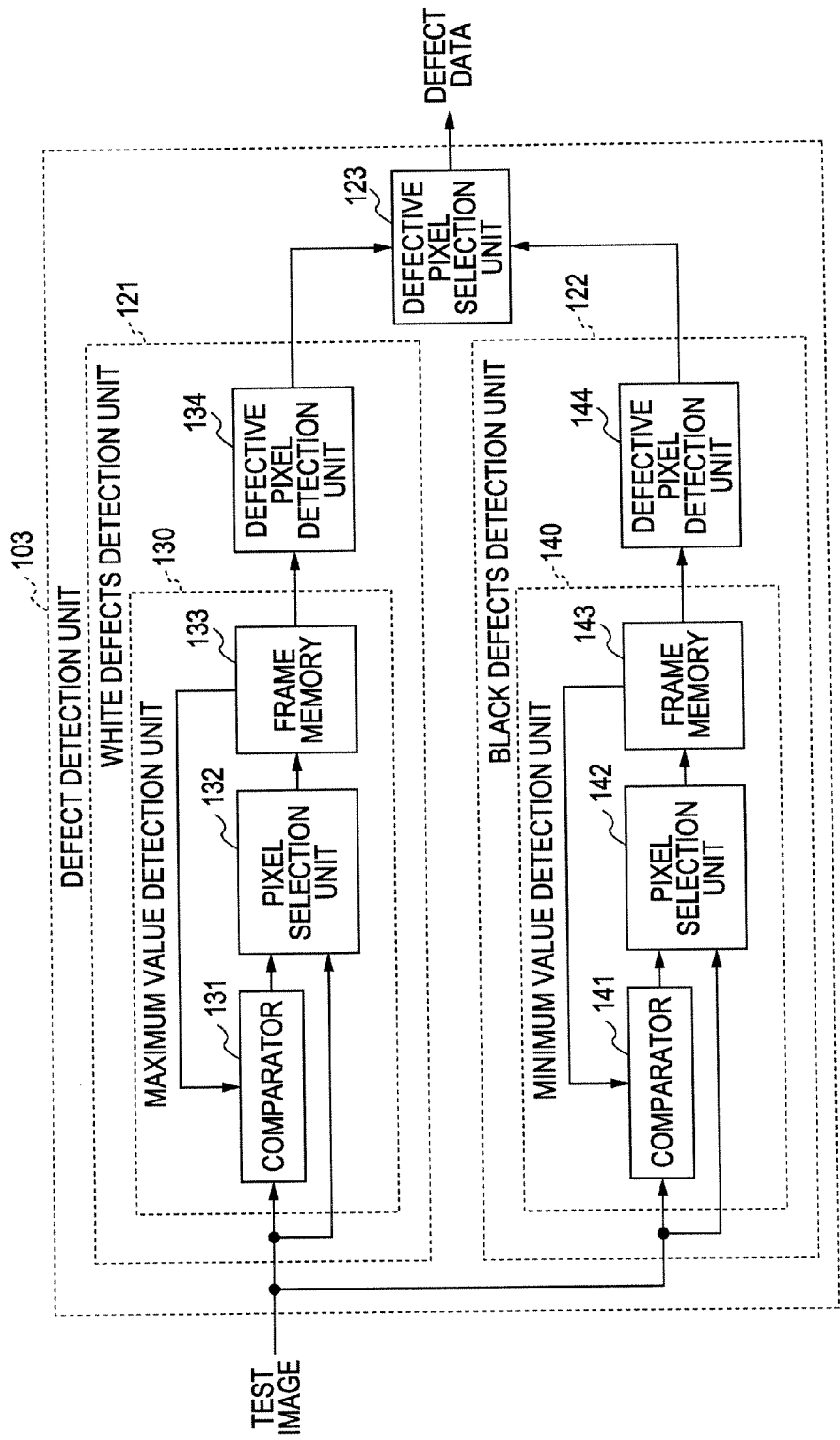
FIG. 5 is a block diagram illustrating an example of a configuration of a defect detection unit.

FIG. 5 illustrates an example of a configuration of the defect detection unit 103 shown in FIG. 4.

The defect detection unit 103 includes a white defect detection unit 121, a black defect detection unit 122, and a defective pixel selection unit 123.

The white defect detection unit 121 includes a maximum value detection unit 130 and a defective pixel detection unit 134, and serves to detect defective pixels having a pixel value higher than a normal pixel value (hereinafter such a defective pixel will be referred to as a white defective pixel) by comparing a maximum pixel value detected at each pixel of test image data captured via an image taking operation performed a plurality of times by the image sensor 4 with a threshold value for detecting white defect. When a defective pixel is detected, the white defect detection unit 121 also detects a defect level indicating the degree of the defect of the defective pixel.

More specifically, in the process described above, if the maximum value detection unit 130 receives a plurality of frames of test image data obtained via the test image taking operation performed a plurality of times by the image sensor 4, the maximum value detection unit 130 including a comparator 131, a pixel selection unit 132, and a frame memory 133 detects a maximum value of pixel values at each pixel position of the plurality of frames of the test image data.

More specifically, in the maximum value detection process described above, the comparator 131 compares a pixel value of each pixel of the test image data supplied to the white defect detection unit 121 with a pixel value of a corresponding pixel already stored in the frame memory 133. The comparator 131 detects a greater pixel value of the two pixel values of each pixel and supplies the detected greater pixel value to the pixel selection unit 132.

In addition to the pixel value supplied from the comparator 131, the pixel selection unit 132 also receives pixel values of the pixel of interest of the test image data supplied to the white defect detection unit 121. For a first frame of test image data of the plurality of frames of test image data supplied to white defect detection unit 121 in the defect detection mode, the pixel selection unit 132 selects a pixel value of the pixel of interest of the first frame and supplies the selected pixel value to the frame memory 133.

For a second and following frames of image data of the plurality of frames of image data supplied to white defect detection unit 121 in the defect detection mode, the pixel selection unit 132 selects the pixel value supplied from the comparator 131 and supplies the selected pixel value to the frame memory 133.

The frame memory 133 stores the pixel value supplied from the pixel selection unit 132 as the pixel value of the pixel of interest.

The defective pixel detection unit 134 compares the pixel value stored in the frame memory 133 with the threshold value for detecting white defect. If the pixel value stored in the frame memory 133 is equal to or greater than the threshold value for detecting white defect, the pixel corresponding to this pixel value is determined to be a white defective pixel. The defective pixel detection unit 134 further detects the defect level of the white defective pixel, defined by the difference between the pixel value of the white defective pixel and the threshold value for detecting white defect. The defective pixel detection unit 134 supplies defect pixel coordinates indicating the location of the white defective pixel and the defect level, as the defect data associated with the white defective pixel, to the defective pixel selection unit 123.

Note that the test image data used in the detection of black defective pixels performed by the white defect detection unit 121 is obtained by capturing an image of a subject by the image sensor 4 by performing an image taking operation a plurality of times in a state in which the shutter 3 (FIG. 1) is closed.

The pixel value of each pixel of image data captured by the image sensor 4 in the state in which the shutter 3 is closed corresponds to a black level if the pixel is not defective. Therefore, it is reasonable to set the threshold value for detecting white defects to a minimum value which cannot be regarded as the black level.

Alternatively, the threshold value for detecting white defect may be determined based on pixel values of pixels located close to a pixel of interest under test.

The black defect detection unit 122 includes a minimum value detection unit 140 and a defective pixel detection unit 144, and serves to detect defective pixels having a pixel value lower than a normal pixel value (hereinafter such a defective pixel will be referred to as a black defective pixel) by comparing a minimum pixel value detected at each pixel of test image data captured via an image taking operation performed a plurality of times by the image sensor 4 with a threshold value for detecting black defect. When a defective pixel is detected, the black defect detection unit 122 also detects a defect level indicating the degree of the defect of the defective pixel.

More specifically, in the process described above, the minimum value detection unit 140 receives a plurality of frames of test image data obtained via the test image taking operation performed a plurality of times by the image sensor 4. The minimum value detection unit 140 includes a comparator 141, a pixel selection unit 142, and a frame memory 143, and detects a minimum value of pixel values obtained at each pixel position of the plurality of frames of test image data.

More specifically, in the minimum value detection process described above, the comparator 141 compares a pixel value of each pixel of the test image data supplied to the black defect detection unit 122 with a pixel value of a corresponding pixel already stored in the frame memory 143. The comparator 141 detects a smaller pixel value of the two pixel values of each pixel and supplies the detected smaller pixel value to the pixel selection unit 142.

In addition to the pixel value supplied from the comparator 141, the pixel selection unit 142 also receives pixel values of the pixel of interest of the test image data supplied to the black defect detection unit 122. For a first frame of test image data of the plurality of frames of test image data in the defect detection mode, the pixel selection unit 142 selects a pixel value of the pixel of interest of the first frame and supplies the selected pixel value to the frame memory 143.

For a second and following frames of test image data of the plurality of frames of test image data in the defect detection mode, the pixel selection unit 142 selects the pixel value supplied from the comparator 141 and supplies the selected pixel value to the frame memory 143.

The frame memory 143 stores the pixel value supplied from the pixel selection unit 142 as the pixel value of the pixel of interest.

The defective pixel detection unit 144 compares the pixel value stored in the frame memory 143 with the threshold value for detecting black defect. If the pixel value stored in the frame memory 143 is equal to or greater than the threshold value for detecting black defect, the pixel corresponding to this pixel value is determined to be a black defective pixel. The defective pixel detection unit 144 further detects the defect level of the black defective pixel, defined by the difference between the pixel value of the black defective pixel and the threshold value for detecting black defect. The defective pixel detection unit 144 supplies defect pixel coordinates indicating the location of the black defective pixel and the defect level, as the defect data associated with the black defective pixel, to the defective pixel selection unit 123.

Note that the test image data used in the detection of black defective pixels performed by the black defect detection unit 122 is obtained by capturing an image of a white subject such as white paper by the image sensor 4 by performing an image taking operation a plurality of times in a state in which the shutter 3 (FIG. 1) is open.

The pixel value of each pixel of image data captured by the image sensor 4 for the white subject corresponds to a white level if the pixel is not defective. Therefore, it is reasonable to set the threshold value for detecting black defect to a maximum value which cannot be regarded as the white level.

Alternatively, the threshold value for detecting black defect may be determined based on pixel values of pixels located close to a pixel of interest under the test.

As described above, the defective pixel selection unit 123 receives defect data indicating defect pixel coordinates and defect levels of defective pixels from the white defect detection unit 121 and the black defect detection unit 122.

On the basis of defect levels indicated by the defect data, the defective pixel selection unit 123 selects a predetermined number, N, of defective pixels with large defect levels and supplies defect data of the selected N defective pixels to the defect data table memory 102. The defect data table memory 102 registers the received defect data in the defect data table.

In a case where the number of defect data or defective pixels supplied from the white defect detection unit 121 and the black defect detection unit 122 is smaller than the predetermined number N, the defective pixel selection unit 123 selects all defective pixels and registers the defect data of all defective pixels in the defect data table.

The number N may be determined, for example, depending on the storage capacity of the defect data table memory 102.

The detection of defective pixels (white defective pixels and black defective pixels) performed by the defective pixel detection units 134 and 144 shown in FIG. 5 is explained in further detail below.

Defective pixels may be detected using a fixed threshold value or a variable threshold value. Hereinafter, the former defect detection method will be referred to simply as an absolute defect detection method, and the latter defect detection method will be referred to as a relative defect detection method.

Figure 6:
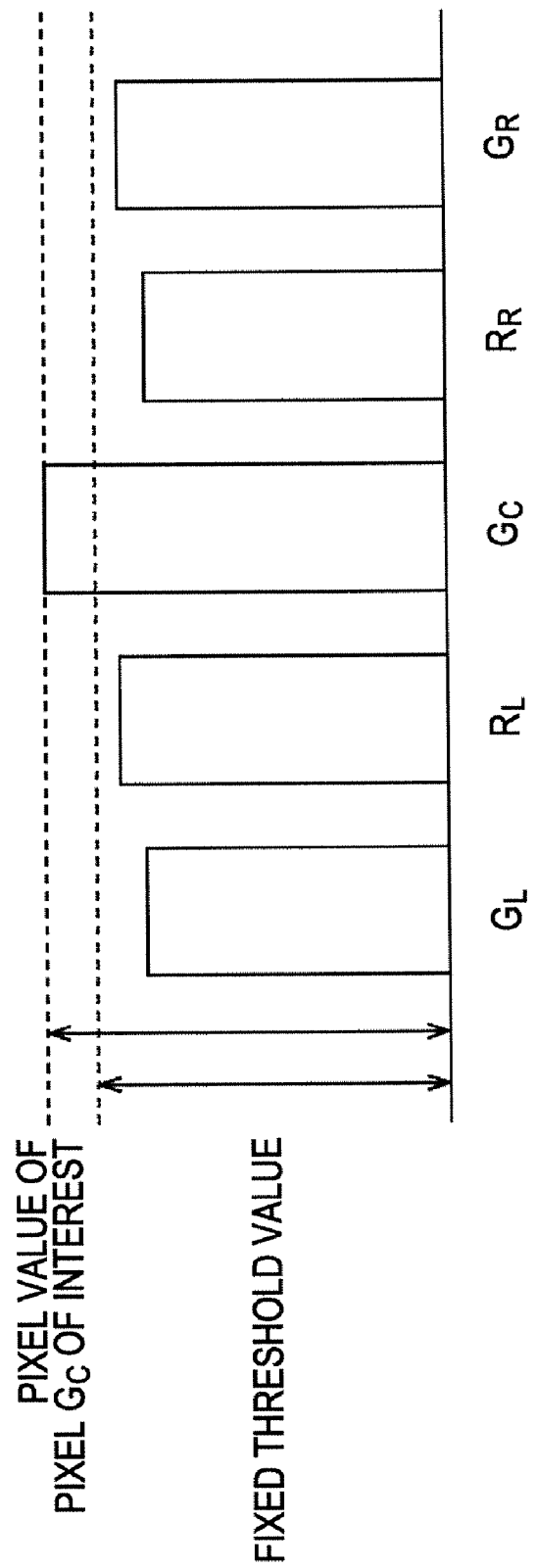
FIG. 6 is a diagram illustrating an example of a method of detecting a white defective pixel by using an absolute threshold value.

Referring to FIG. 6, absolute defect detection of white defective pixels using a fixed threshold value is described below.

FIG. 6 illustrates examples of pixel values of five successive pixels $G_L$, $R_L$, $G_C$, $R_R$, and $G_R$ arranged in a horizontal direction in a Bayer array.

Of these five pixels $G_L$, $R_L$, $G_C$, $R_R$, and $G_R$, pixels $G_L$, $G_C$, and $G_R$ each have a pixel value of a G component, while pixels $R_L$ and $R_R$ each have a pixel value of a R component.

In the absolute defect detection of white defective pixels, the threshold value for use in detection of white defective pixels is set to a fixed value, and a pixel value of a pixel of interest is compared with this fixed threshold value. If the pixel value of the pixel of interest is equal to or greater than the fixed threshold value, then this pixel of interest is determined to be a white defective pixel.

In the example shown in FIG. 6, the pixel $G_C$ located in the center of the horizontal arrangement of five pixels $G_L$, $R_L$, $G_C$, $R_R$, and $G_R$ has a pixel value greater than the fixed threshold value defined as the threshold value for use in detection of white defective pixels, and thus the pixel $G_C$ is determined to be a white defective pixel.

The fixed threshold value for use in detection of white defective pixels may be set, for example, to the minimum value which cannot be regarded as a black level.

Alternatively, the fixed threshold value for use in detection of white defective pixels may be set to a value determined based on a frequency distribution of defect levels.

Figure 7:
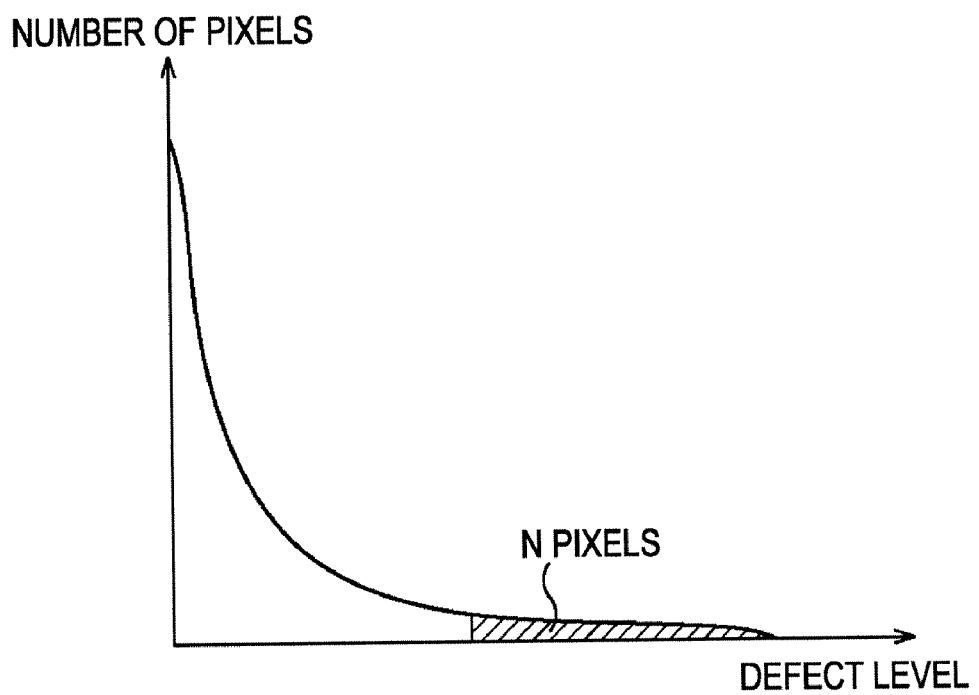
FIG. 7 is a diagram illustrating an example of a manner of determining a fixed threshold value.

FIG. 7 illustrates an example of a frequency distribution of defect levels.

In a case where the specifications of the digital still camera shown in FIG. 1 require image quality that can be achieved by correcting at least N' defective pixels with highest defect levels in the frequency distribution of defect levels, the fixed threshold value for use in detection of white defective pixels in a production line of the digital still camera shown in FIG. 1 may be set so that N ($\geqq$N') pixels with highest defect levels in the frequency distribution of defect levels are detected as defect levels.

Figure 8:
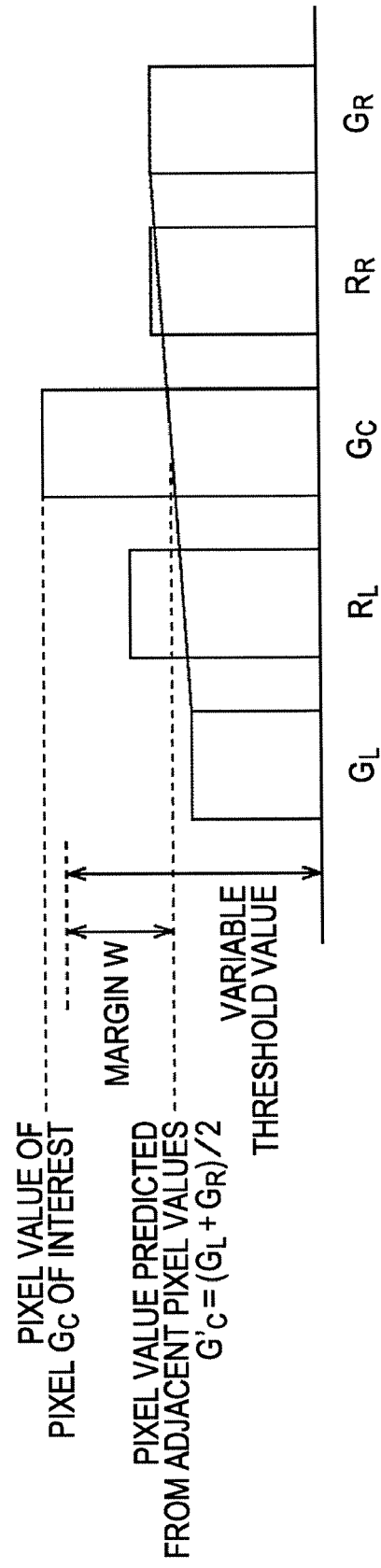
FIG. 8 is a diagram illustrating an example of a method of detecting a white defective pixel by using a varying threshold value.

Referring to FIG. 8, an example of the relative defect detection of white defective pixels using a variable threshold value as the threshold value for use in detection of white defective pixels is described below.

FIG. 8 illustrates examples of pixel values of five successive pixels $G_L$, $R_L$, $G_C$, $R_R$, and $G_R$ arranged in a horizontal direction in a Bayer array.

When the pixel $G_C$ located in the center of the horizontal arrangement of five pixels $G_L$, $R_L$, $G_C$, $R_R$, and $G_R$ is a pixel of interest being subjected to comparison of pixel value with the threshold value defined for use in detection of white defective pixels, a predictive value for the pixel value of the pixel $G_C$ of interest is given, for example, by the average value of pixel values of pixels located close to the pixel of interest and having the same color component as that of the pixel of interest, and more specifically, in the present example, by the average value of pixel values of pixels $G_L$ and $G_R$.

The variable threshold value for use in detection of white defective pixels is set to the sum of the predictive value of the pixel value of the pixel $G_C$ of interest and a fixed margin W (>0). The pixel value of the pixel $G_C$ of interest is then compared with the variable threshold value defined above. If the pixel value of the pixel of interest is equal to or greater than the threshold value, the pixel of interest is regarded as a white defective pixel.

In the example shown in FIG. 8, the pixel value of the pixel $G_C$ of interest is greater than the variable threshold value defined for use in detection of white defective pixels, and thus this pixel $G_C$ is detected as a white defective pixel.

In the example shown in FIG. 8, the predictive pixel value of the pixel of interest is determined from pixel values of pixels with the same color component as that of the pixel of interest. Alternatively, the predictive pixel value of the pixel of interest may be determined from pixel values of pixels with a color component that is not necessarily the same as that of the pixel of interest.

In the example shown in FIG. 8, the predictive pixel value of the pixel of interest is determined from pixel values of pixels arranged in a horizontal row including the pixel of interest. Alternatively, the predictive pixel value of the pixel of interest may be determined from pixel values of pixels arranged in a vertical column including the pixel of interest or from pixel values of pixels located in an arbitrary direction.

FIG. 9 illustrates an example of image data including pixel values of pixels arranged in a Bayer array.

In FIG. 9, when a pixel $G_{mn}$ with a pixel value of G component is a pixel of interest under test, the predictive pixel value for the pixel of interest may be given by the average value of pixel value of pixels located close to the pixel of interest and having the same color component as that of the pixel $G_{mn}$ of interest, and more particularly, for example, by the average value of pixel values of a pixel $G_{m(n-2)}$ located two pixels up from the pixel $G_{mn}$ of interest, a pixel $G_{m(n+2)}$ located two pixels down from the pixel $G_{mn}$ of interest, a pixel $G_{(m-2)n}$ located to two pixels to the left of the pixel $G_{mn}$ of interest, and a pixel $G_{(m+1)n}$ located to two pixels to the right of the pixel $G_{mn}$ of interest.

In the examples described above, the predictive pixel value of the pixel of interest is given by the simple average of pixel values of pixels located close to the pixel of interest. Alternatively, the predictive pixel value may be given by a weighted average value.

For example, the correlation among pixel values of pixels horizontally arranged to the left and right of the pixel of interest and the correlation among pixel values of pixels vertically arranged up and down from the pixel of interest are calculated. A greater weighting factor (for example, 1 or a value close to 1) is applied to pixel values of pixels in a direction having a greater correlation, and a small weighting factor (for example, 0 or a value close to 0) is applied to pixel values of pixels in the other direction having a smaller correlation. The average of pixel values weighted by the factors defined above is calculated, and the resultant average value is employed as the predictive pixel value of the pixel of interest.

Figure 10:
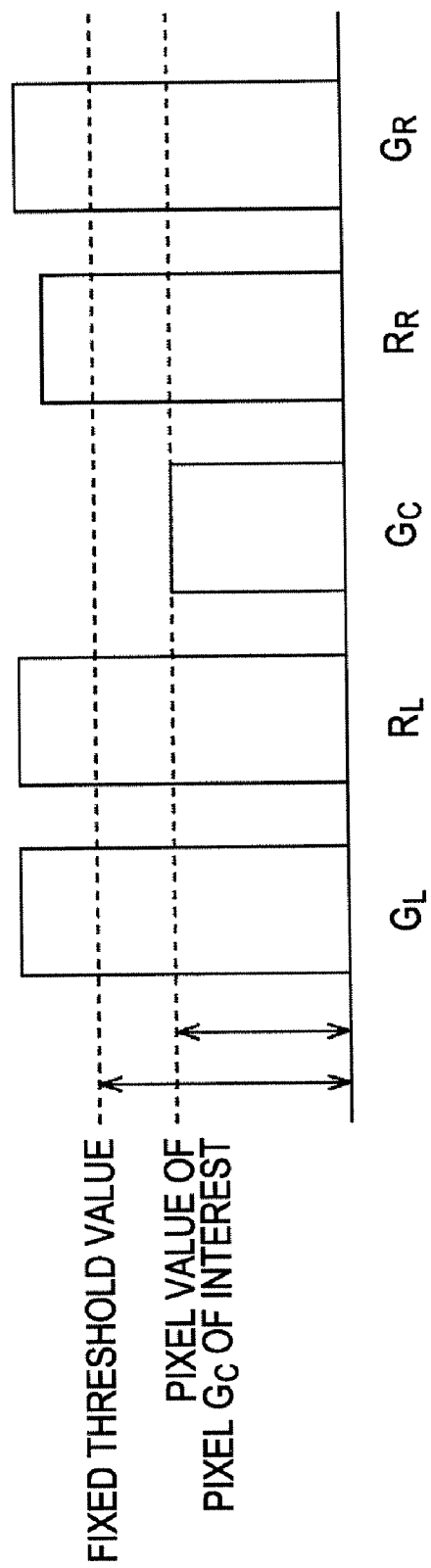
FIG. 10 is a diagram illustrating an example of a method of detecting a black defective pixel by using an absolute threshold value.

Referring to FIG. 10, absolute defect detection of black defective pixels using a fixed threshold value is described below.

FIG. 10 illustrates examples of pixel values of five successive pixels $G_L$, $R_L$, $G_C$, $R_R$, and $G_R$ arranged in a horizontal direction in a Bayer array.

In the absolute defect detection of black defective pixels, the threshold value for use in detection of black defective pixels is set to a fixed value, and a pixel value of a pixel of interest is compared with this fixed threshold value. If the pixel value of the pixel of interest is equal to or smaller than the fixed threshold value, the pixel of interest is regarded as a black defective pixel.

In the example shown in FIG. 10, the pixel $G_C$ located in the center of the horizontal arrangement of five pixels $G_L$, $R_L$, $G_C$, $R_R$, and $G_R$ has a pixel value smaller than the fixed threshold value defined as the threshold value for use in detection of black defective pixels, and thus this pixel $G_C$ is detected as a black defective pixel.

The fixed threshold value for use in detection of black defective pixels may be set, for example, to the maximum value which cannot be regarded as a white level.

The fixed threshold value for use in detection of black defective pixels may be set to a value determined based on a frequency distribution of defect levels as described above with reference to FIG. 7.

Figure 11:
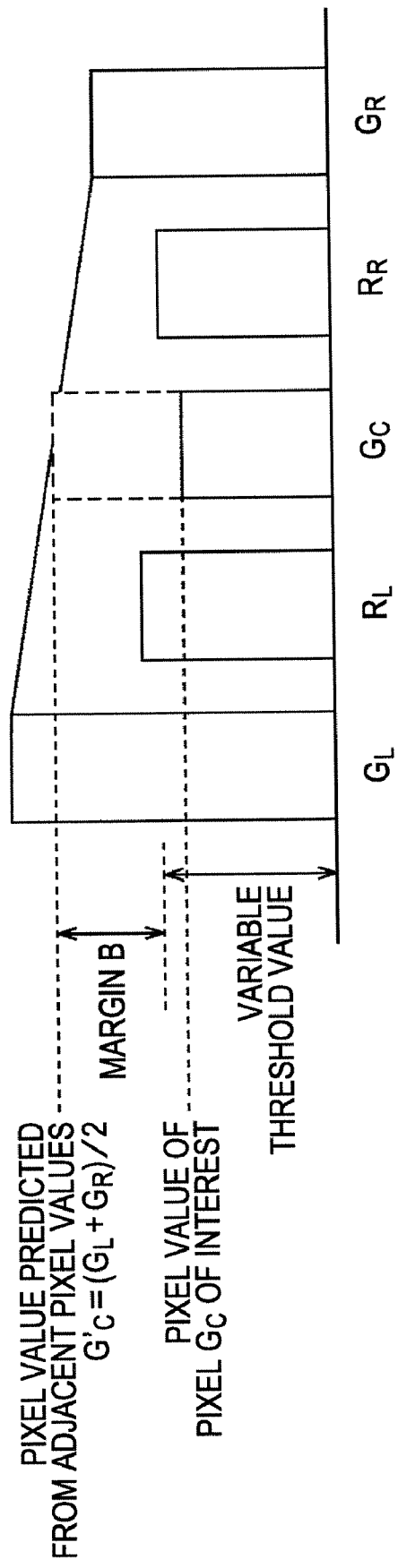
FIG. 11 is a diagram illustrating an example of a method of detecting a black defective pixel by using a varying threshold value.

Referring to FIG. 11, an example of the relative defect detection of black defective pixels using a variable threshold value as the threshold value for use in detection of black defective pixels is described below.

FIG. 11 illustrates examples of pixel values of five successive pixels $G_L$, $R_L$, $G_C$, $R_R$, and $G_R$ arranged in a horizontal direction in a Bayer array.

When the pixel $G_C$ located in the center of the horizontal arrangement of five pixels $G_L$, $R_L$, $G_C$, $R_R$, and $G_R$ is a pixel of interest being subjected to comparison of pixel value with the threshold value defined for use in detection of black defective pixels, a predictive value for the pixel value of the pixel $G_C$ of interest is given, for example, by the average value of pixel values of pixels located close to the pixel of interest and having the same color component as that of the pixel of interest, and more specifically, in the present example, by the average value of pixel values of pixels $G_L$ and $G_R$.

The variable threshold value for use in detection of black defective pixels is set to the sum of the predictive value of the pixel value of the pixel $G_C$ of interest and a fixed margin –B (B>0) (the value obtained by subtracting B from the predictive pixel value) is then calculated. The pixel value of the pixel $G_C$ of interest is then compared with the variable threshold value defined above. If the pixel value of the pixel of interest is equal to or smaller than the threshold value, the pixel of interest is regarded as a black defective pixel.

In the example shown in FIG. 11, the pixel value of the pixel $G_C$ of interest is smaller than the variable threshold value defined for use in detection of black defective pixels, and thus this pixel $G_C$ is detected as a black defective pixel.

In the detection of black defective pixels, as with the detection of white defective pixels, the predictive pixel value of the pixel of interest may be determined based on pixel values of pixels located close to the pixel of interest.

Figure 12:
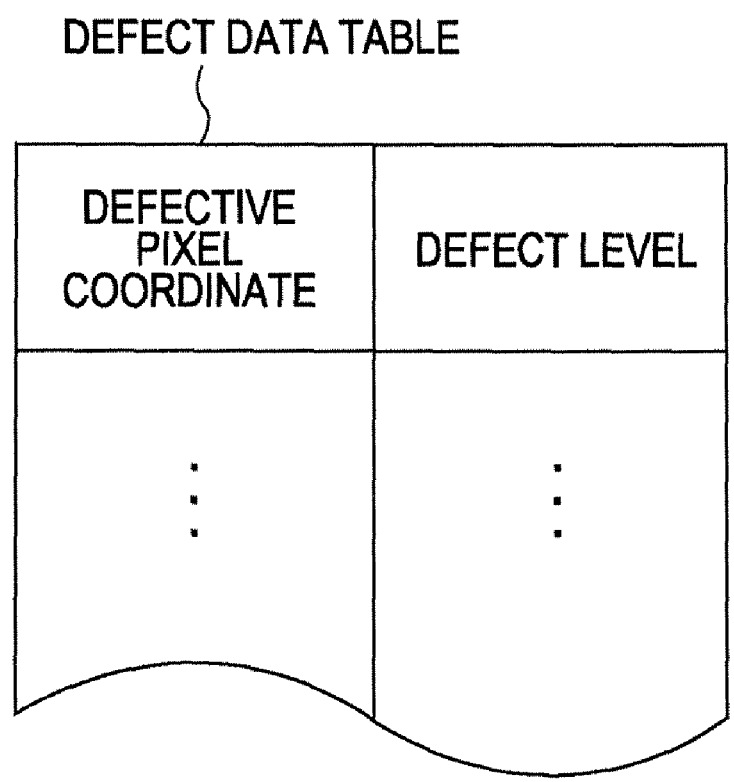
FIG. 12 is a diagram illustrating an example of a defect data table.

FIG. 12 illustrates an example of a defect data table stored in the defect data table memory 102 shown in FIG. 4.

In the example shown in FIG. 12, defect pixel coordinates and a defect level of each defective pixel are described as defect data in the defect data table.

Figure 13:
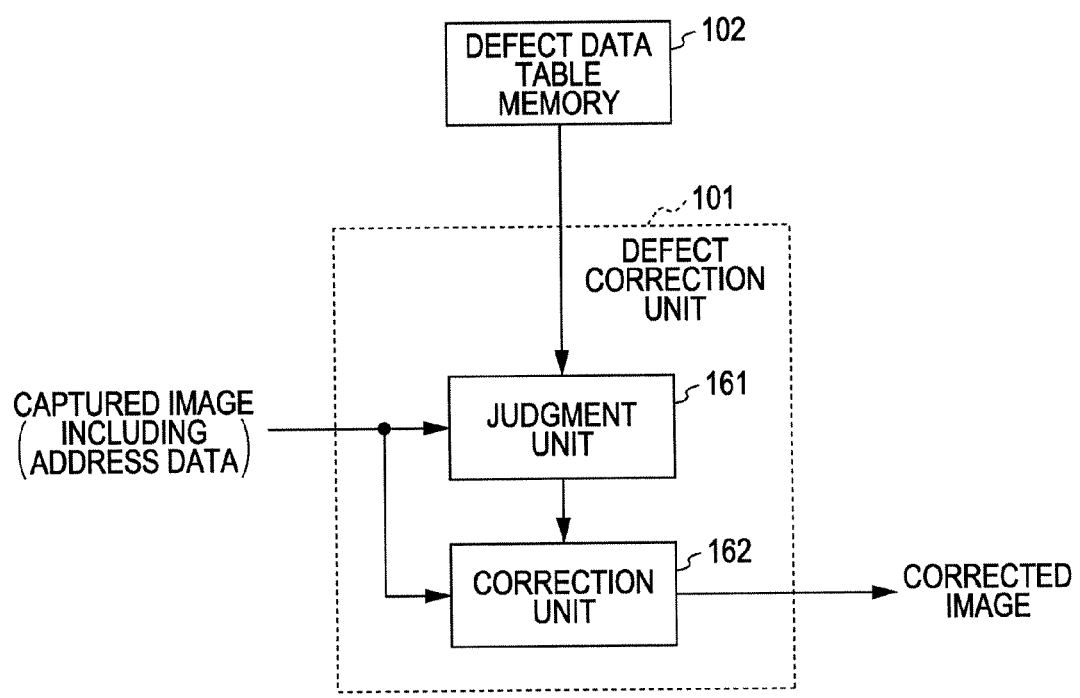
FIG. 13 is a block diagram illustrating an example of a configuration of a defect correction unit.

FIG. 13 illustrates an example of a configuration of the defect correction unit 101 shown in FIG. 4.

As shown in FIG. 13, the defect correction unit 101 includes a judgment unit 161 and a correction unit 162.

The test image data output from the front end unit 6 (FIG. 1) is supplied to the judgment unit 161. More specifically, a pixel value of each pixel is supplied together with a count value indicating coordinates of the pixel to the judgment unit 161 from the front end unit 6.

The judgment unit 161 compares the count value supplied together with the pixel value of a pixel of interest in the test image data with defect pixel coordinates in the defect data table stored in the defect data table memory 102. If a defect pixel coordinate value equal to the count value is found in the defect data table, then the judgment unit 161 supplies a correction command signal to the correction unit 162 to correct the pixel value of the pixel identified by the count value.

In addition to the correction command signal supplied from the judgment unit 161, the same test image data as that supplied to the judgment unit 161 is also supplied to the correction unit 162 from the front end unit 6.

Each time the correction unit 162 receives a pixel value of one of pixels sequentially supplied from the front end unit 6, the correction unit 162 determines whether a correction command signal has been received from the judgment unit 161 indicating that the present pixel is a pixel to be corrected. If it is determined that no correction command signal has been received and thus the present pixel is not a pixel to be corrected, the correction unit 162 directly outputs the pixel value of the present pixel as a pixel value of corrected image data.

On the other hand, if a correction command signal has been received from the judgment unit 161 and thus the present pixel is a pixel to be corrected, the correction unit 162 corrects the pixel value of the present pixel determined to be the pixel to be corrected, and outputs the corrected pixel value as a pixel value of the corrected image data.

The correction of the pixel value of the pixel of interest specified to be corrected is performed, for example, such that the predictive pixel value of the pixel of interest specified to be corrected is determined from pixel values of pixels located to close to the pixel specified to be corrected in a similar manner to the predictive pixel value determined in the relative defect detection process, and the pixel value of the pixel of interest is replaced with the predictive pixel value.

Alternatively, the pixel value of the pixel of interest specified to be corrected may be corrected such that the pixel value of the pixel of interest is multiplied by a value determined depending on the defect level of the defective pixel specified to be corrected or a value determined depending on the defect level of the defective pixel specified to be corrected is subtracted from the pixel value of the pixel of interest. In the case where the pixel value is corrected depending on the defect level as in the alternative method, the defect level is supplied to the correction unit 162 from the defect data table memory 102 via the judgment unit 161.

The pixel value of the pixel specified to be corrected may be corrected by replacing an abnormal pixel value with a reasonable (normal) value according to a proper method.

Next, referring to a flow chart shown in FIG. 14, a defect detection process performed by the defect detection unit 103 shown in FIG. 5 is described below.

Figure 14:
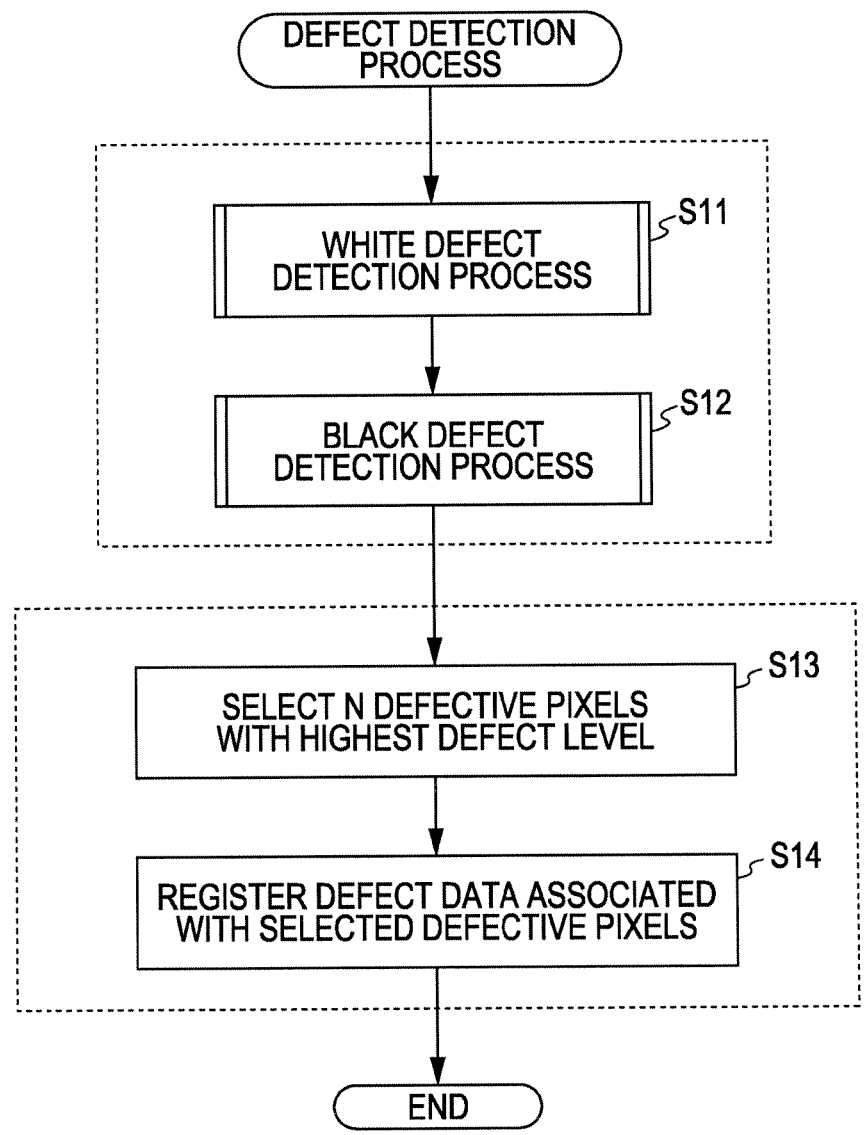
FIG. 14 is a flow chart illustrating a defect detection process.

The defect detection process shown in FIG. 14 is performed, for example, in a production line of the digital still camera shown in FIG. 1 before the digital still camera is shipped.

In step S11, the white defect detection unit 121 in the defect detection unit 103 shown in FIG. 5 performs the white defect detection process to detect white defective pixels. The defect data associated with the detected white defective pixels is supplied to the defective pixel selection unit 123. The process then proceeds to step S12.

In step S12, the black defect detection unit 122 performs the black defect detection process to detect black defective pixels. The defect data associated with the detected black defective pixels is supplied to the defective pixel selection unit 123. The process then proceeds to step S13.

In step S13, the defective pixel selection unit 123 selects N defective pixels with greatest defect levels in accordance with the defect data supplied from the white defect detection unit 121 and the black defect detection unit 122. The process then proceeds to step S14. In step S14, the defective pixel selection unit 123 supplies the defect data associated with the selected N defective pixels with greatest defect levels to the defect data table memory 102. The defect data table memory 102 registers the received defect data in the defect data table. Thereafter, the defect detection process is ended.

Referring to a flow chart shown in FIG. 15, the white defect detection process performed in step S11 in FIG. 14 by the white defect detection unit 121 shown in FIG. 5 is described in further detail below.

In step S21 in the white defect detection process, the frame memory 133 of the white defect detection unit 121 initializes the content stored in the frame memory 133.

In this white defect detection process, the microcomputer 11 (FIG. 1) controls the image sensor 4 via the timing generator 5 so as to take an image a predetermined plurality of times.

As a result, test image data for use in detection of white defective pixels is produced by the image sensor 4 and supplied to the maximum value detection unit 130 of the white defect detection unit 121. The maximum value detection unit 130 supplies the received test image data to the comparator 131 and the pixel selection unit 132.

If the comparator 131 receives the test image data, then in step S22, the comparator 131 compares a pixel value of each pixel of the received test image data with a pixel value of a corresponding pixel already stored in the frame memory 133. The comparator 131 detects a greater pixel value of the two pixel values of each pixel and supplies the detected greater pixel value to the pixel selection unit 132.

In step S22, the pixel selection unit 132 transfers the pixel value received from the comparator 131 to the frame memory 133. The frame memory 133 stores the received pixel value in an overwritten manner at an address corresponding to the location of the pixel of interest.

If the test image data supplied to the comparator 131 and the pixel selection unit 132 is that obtained in the first-time image taking operation performed by the image sensor 4, then in step S22, the pixel selection unit 132 directly supplies pixel values of respective pixels of the test image data to the frame memory 133. The frame memory 133 stores the received pixel values at addresses corresponding to the locations of the respective pixels.

If the process, in step S22, of storing a pixel value in the frame memory 133 at an address corresponding to the location of a pixel of interest is completed for all pixels of the test image data, the process proceeds to step S23. In step S23, the comparator 131 determines whether the image taking operation has been performed the predetermined number of times.

If it is determined in step S23 that the image taking operation has not been performed the predetermined number of times, the image sensor 4 captures test image data once more and supplies the captured test image data to the comparator 131 and the pixel selection unit 132. Thereafter, the process returns to step S22 to repeat steps S22 and S23.

Via the iterative execution of step S22 and S23, a maximum pixel value for each pixel is selected from the plurality of frames of test image data obtained as a result of the predetermined number of image taking operations performed by the image sensor 4, and the maximum pixel value of each pixel is stored in the frame memory 133. The image data of maximum pixel values of respective pixels determined from the plurality of frames of test image data and stored in the frame memory 133 will be hereinafter referred to simply as maximum value image data.

If it is determined in step S23 that the operation of capturing test image data has been performed the predetermined number of times, that is, if maximum value image data has been completely stored in the frame memory 133, the process proceeds to step S24. In step S24, the defective pixel detection unit 134 compares the pixel value of each pixel of the maximum value image data stored in the frame memory 133 with the threshold value for detecting white defect. If a pixel of interest under comparison has a pixel value equal to or greater than the threshold value for detecting white defect, the pixel of interest is determined to be a white defective pixel.

Furthermore, in step S24, the defective pixel detection unit 134 subtracts the threshold value for detecting white defect from the pixel value of each white defective pixel detected in the maximum value image data and employs the resultant value as the defect level of the white defective pixel. The determined defect level and defect pixel coordinates indicating the location of the white defective pixel are supplied as defect data associated with the white defective pixel to the defective pixel selection unit 123. Thereafter, the white defect detection process is ended.

Figure 15:
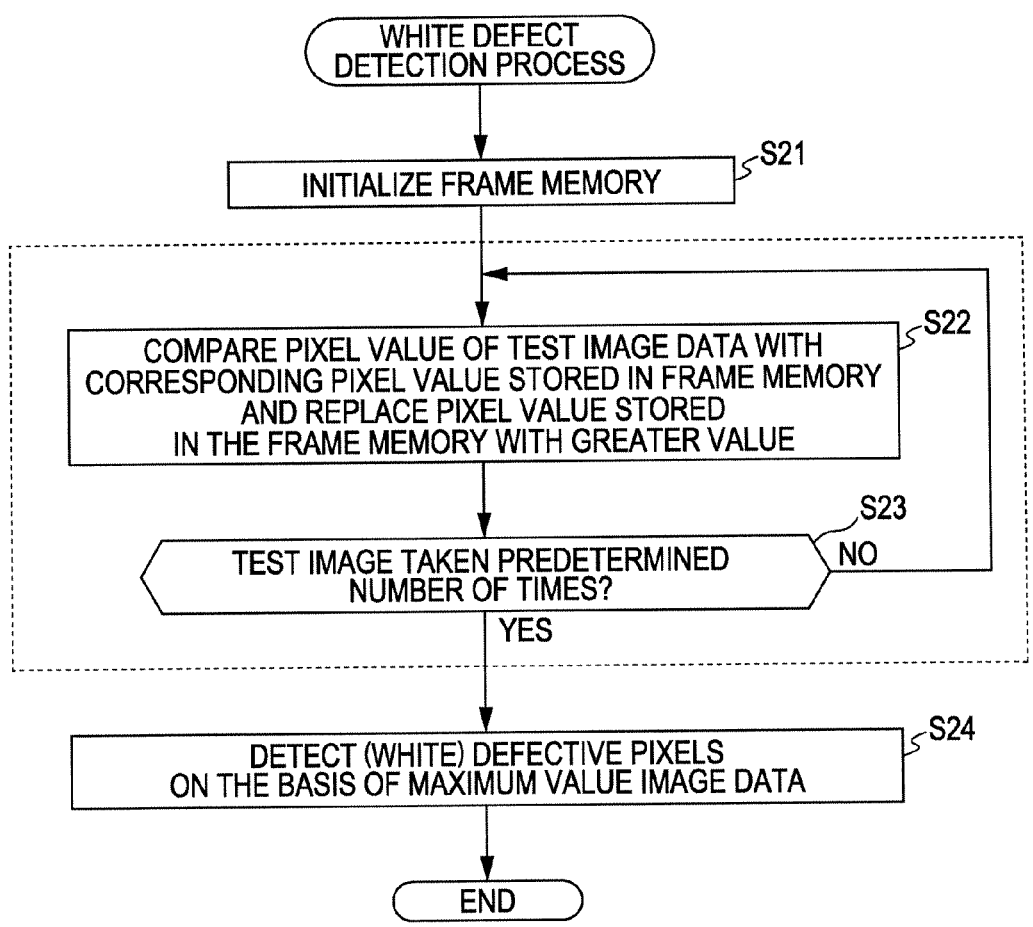
FIG. 15 is a flow chart illustrating a white defect detection process.

In the white defect detection process shown in FIG. 15 in which white defective pixels are detected by comparing pixel values of respective pixels of maximum value image data with the threshold value for detecting white defect, the absolute defect detection method or the relative defect detection method may be used.

Referring to a flow chart shown in FIG. 16, the black defect detection process performed in step S12 in FIG. 14 by the black defect detection unit 122 shown in FIG. 5 is described in further detail below.

In step S31 in the black defect detection process, the frame memory 143 of the black defect detection unit 122 initializes the content stored in the frame memory 143.

In this black defect detection process, the microcomputer 11 (FIG. 1) controls the image sensor 4 via the timing generator 5 so as to take an image a predetermined plurality of times.

As a result, test image data for use in detection of black defective pixels is produced by the image sensor 4 and supplied to the minimum value detection unit 140 of the black defect detection unit 122. The minimum value detection unit 140 supplies the received test image data to the comparator 141 and the pixel selection unit 142.

If the comparator 141 receives the test image data, then in step S32, the comparator 141 compares a pixel value of each pixel of the received test image data with a pixel value of a corresponding pixel already stored in the frame memory 143. The comparator 141 detects a smaller pixel value of the two pixel values of each pixel and supplies the detected smaller pixel value to the pixel selection unit 142.

Furthermore, in step S32, the pixel selection unit 142 transfers the pixel value supplied from the comparator 141 to the frame memory 143. The frame memory 143 stores the received pixel value in an overwritten manner at an address corresponding to the location of the pixel of interest.

If the test image data supplied to the comparator 141 and the pixel selection unit 142 is that obtained in the first-time image taking operation performed by the image sensor 4, then in step S32, the pixel selection unit 142 directly supplies pixel values of respective pixels of the test image data to the frame memory 143. The frame memory 143 stores the received pixel values at addresses corresponding to the locations of the respective pixels.

If the process, in step S32, of storing a pixel value in the frame memory 143 at an address corresponding to the location of a pixel of interest is completed for all pixels of the test image data, the process proceeds to step S33. In step S33, the comparator 141 determines whether the image taking operation has been performed the predetermined number of times.

If it is determined in step S33 that the operation of capturing test image data has not been performed the predetermined number of times, the image sensor 4 captures test image data once more and supplies the captured test image data to the comparator 141 and the pixel selection unit 142. Thereafter, the process returns to step S32 to repeat steps S32 and S33.

Via the iterative execution of step S32 and S33, a minimum pixel value for each pixel is selected from the plurality of frames of test image data obtained as a result of the predetermined number of image taking operations performed by the image sensor 4, and the minimum pixel value of each pixel is stored in the frame memory 143. The image data of minimum pixel values of respective pixels determined from the plurality of frames of test image data and stored in the frame memory 143 will be hereinafter referred to simply as minimum value image data.

If it is determined in step S33 that the operation of capturing test image data has been performed the predetermined number of times, that is, if maximum value image data has been completely stored in the frame memory 143, the process proceeds to step S34. In step S34, the defective pixel detection unit 144 compares the pixel value of each pixel of the minimum value image data stored in the frame memory 143 with the threshold value for detecting black defect. If a pixel of interest under comparison has a pixel value equal to or smaller than the threshold value for detecting black defect, the pixel of interest is determined to be a black defective pixel.

Furthermore, in step S34, the defective pixel detection unit 144 subtracts the threshold value for detecting black defect from the pixel value of each black defective pixel detected in the minimum value image data and employs the resultant value as the defect level of the black defective pixel. The determined defect level and defect pixel coordinates indicating the location of the black defective pixel are supplied as defect data associated with the black defective pixel to the defective pixel selection unit 123. Thereafter, the black defect detection process is ended.

Figure 16:
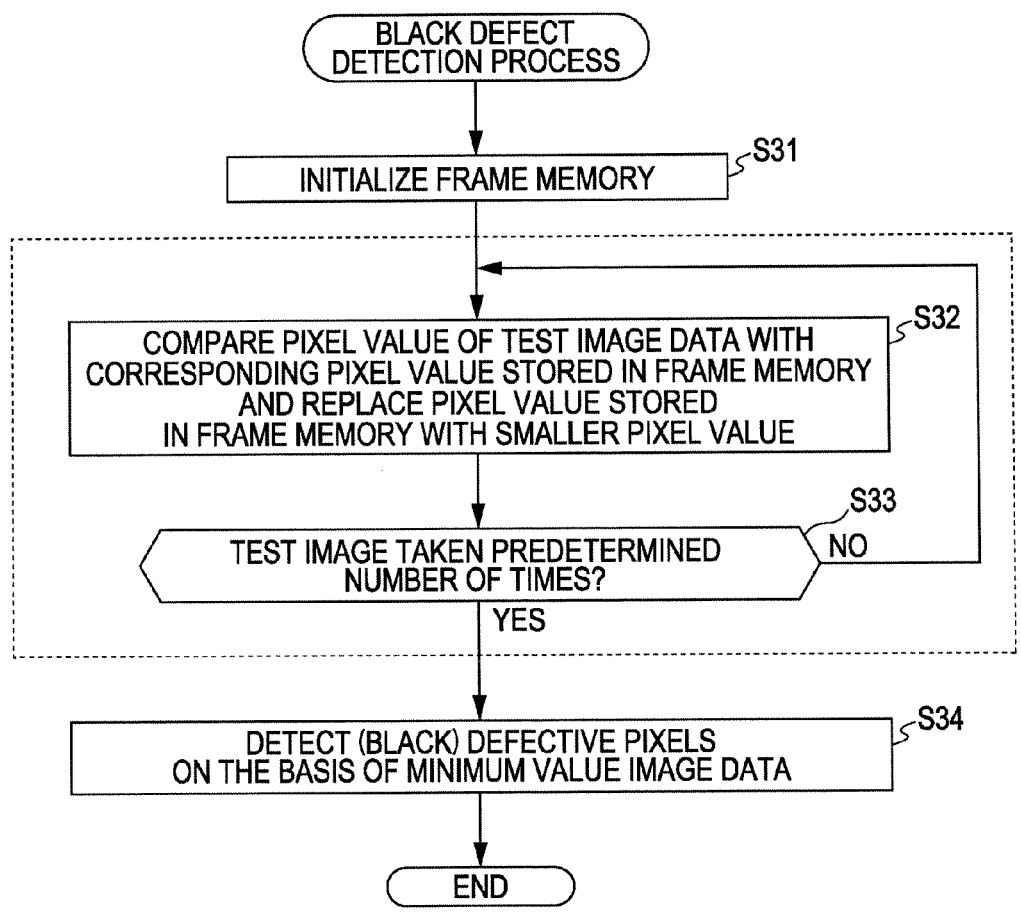
FIG. 16 is a flow chart illustrating a black defect detection process.

In the black defect detection process shown in FIG. 16 in which black defective pixels are detected by comparing pixel values of respective pixels of minimum value image data with the threshold value for detecting black defect, the absolute defect detection method or the relative defect detection method may be used.

Referring to a flow chart shown in FIG. 17, a defect correction process performed by the defect correction unit 101 shown in FIG. 13 is described below.

As described above, the image data output from the front end unit 6 (FIG. 1) is supplied to the judgment unit 161 and the correction unit 162 in the defect correction unit 101.

In step S51, the judgment unit 161 selects pixels one by one as a pixel of interest from the image data supplied from the front end unit 6 and determines whether the pixel of interest is defective, by referring to the defect data table stored in the defect data table memory 102.

If it is determined in step S51 that the pixel of interest is not defective, the correction unit 162 directly outputs the pixel value of the pixel of interest as a pixel value of corrected image data. The process jumps to step S53 without performing step S52.

On the other hand, if it is determined in step S51 that the pixel of interest is defective, then in step S52, the correction unit 162 corrects the pixel value of the pixel of interest and outputs the corrected pixel value as a pixel value of corrected image data. The process then proceeds to step S53.

In step S53, the judgment unit 161 determines whether the pixel of interest is a pixel located at the end of the test image data, that is, whether the test image data includes no more pixels to be tested.

If it is determined in step S53 that the test image data includes more pixels to be tested, then the judgment unit 161 selects one pixel as a new pixel of interest from the test image data. The processing flow returns to step S51 to repeat the process from step S51.

On the other hand, if it is determined in step S53 that the test image data includes no more pixels to be tested, the defect correction unit 101 ends the defect correction process.

In the defect handling unit 51 shown in FIG. 4, as described above, the defect detection unit 103 detects defective pixels (white defective pixels) and defect levels thereof, by comparing a maximum pixel value detected at each pixel of test image data captured via an image taking operation performed a plurality of times by the image sensor 4 (FIG. 1) with a threshold value for detecting white defect. The defect detection unit 103 also detects defective pixels (black defective pixels) and defect levels thereof, by selecting a minimum pixel value among pixel values at each pixel position of the plurality of frames of test image data, and comparing the minimum pixel value of each pixel with a threshold value for detecting black defect. The defect detection unit 103 then selects N defective pixels in decreasing order of the defect level starting from the highest defect level, and registers the selected N defective pixels in the defect data table. This makes it possible to correct defective pixels in a highly reliable manner.

As described above, defective pixels which are high in defect level are more conspicuous than defective pixels which are low in defect level. Therefore, it is desirable to correct pixel values of defective pixels in decreasing order of defect level starting with the defective pixel with the highest defect level.

In view of the above, the defect detection unit 103 selects N defective pixels in decreasing order of the defect level starting from the defective pixel with the highest defect level, and registers the selected N defective pixels in the defect data table thereby making it possible to preferentially correct pixel values of defective pixels which are high in defect level.

Besides, because only defect data of N defective pixels with high defect levels are registered in the defect data table, it is allowed to use low-cost RAM with a low storage capacity as the defect data table memory 102 for storing the defect data table. In other words, in a case where the defect data table memory 102 for storing the defect data table is limited in storage capacity, N defective pixels with high defect levels are allowed to be registered in the defect data table in the defect data table memory 102 with limited storage capacity, thereby making it possible to preferentially correct pixel values of defective pixels which are high in defect level.

Because defect detection unit 103 detects defective pixels not from one frame of test image data obtained via the image taking operation performed only once but from a plurality of frames of test image data obtained via the image taking operation performed a plurality of times by comparing maximum value image data or minimum value image data obtained from the plurality of frames of test image with the threshold value, and N defective pixels with highest defect levels are registered in the defect data table, it is possible to detect not only permanent defective pixels but also intermittent defective pixels, and preferentially correct N defective pixels with highest defect levels selected from the two types of defective pixels.

As described above, defective pixels can be classified into two types, i.e., permanent defective pixels and intermittent defective pixels. In the defective pixel detection process performed by the defect detection unit 103, if a pixel value greater than the threshold value for detecting white defect or lower than the threshold value for detecting black defect is detected even only in one of the plurality of frames of test image data, a corresponding pixel is regarded as defective. Therefore, not only permanent defective pixels but also intermittent defective pixels can be detected.

The defect detection unit 103 selects N defective pixels with highest defect levels regardless of the defect type and registers the selected N defective pixels in the defect data table. Therefore, correction of pixel values is made preferentially for defective pixels which are high in defect level regardless of whether defective pixels are permanent defective pixels or intermittent defective pixels.

In the example shown in FIG. 5, the defect detection unit 103 includes both the white defect detection unit 121 for detecting white defective pixels and the black defect detection unit 122 for detecting black defective pixels. Alternatively, the defect detection unit 103 may include only one of the white defect detection unit 121 for detecting white defective pixels and the black defect detection unit 122 for detecting black defective pixels. However, in the case where the defect detection unit 103 includes only one of the white defect detection unit 121 and the black defect detection unit 122, it is possible to detect only white defective pixels or black defective pixels.

In the examples described above, the maximum value image data is obtained from a plurality of frames of test image data obtained via the image taking operation performed a plurality of times. Alternatively, equivalent maximum value image data may be obtained from a single frame of test image data obtained by performing the image taking operation only once but for a long exposure time.

More specifically, for example, a white defective pixel of the intermittent defect type may be detected either by comparing the maximum value image data obtained from the plurality of frames of test image data captured via the image taking operation performed the plurality of times with the threshold value for detecting white defect or by comparing the test image data captured via the image taking operation performed only once but for the ling exposure time with the threshold value for detecting white defect.

However, the maximum exposure time allowed by the specifications of the image sensor 4 is not necessarily long enough to take test image data suitable for use in detection of white defective pixels of the intermittent defect type. In the case where the maximum exposure time allowed by the specifications of the image sensor 4 is not long enough to take test image data suitable for use in detection of white defective pixels of the intermittent defect type, maximum value image data may be produced from a plurality of frames of test image data obtained by performing the image taking operation with the long exposure time a plurality of times, and the maximum value image data may be compared with the threshold value for detecting white defect. This results in an improvement in reliability of detecting white defective pixels of the intermittent defect type.

To detect an intermittent defective pixel with a long occurrence-to-occurrence interval in a highly reliable manner without missing it, it is desirable to produce maximum value image data or minimum value image data from as many frames of test image data as possible.

Figure 18:
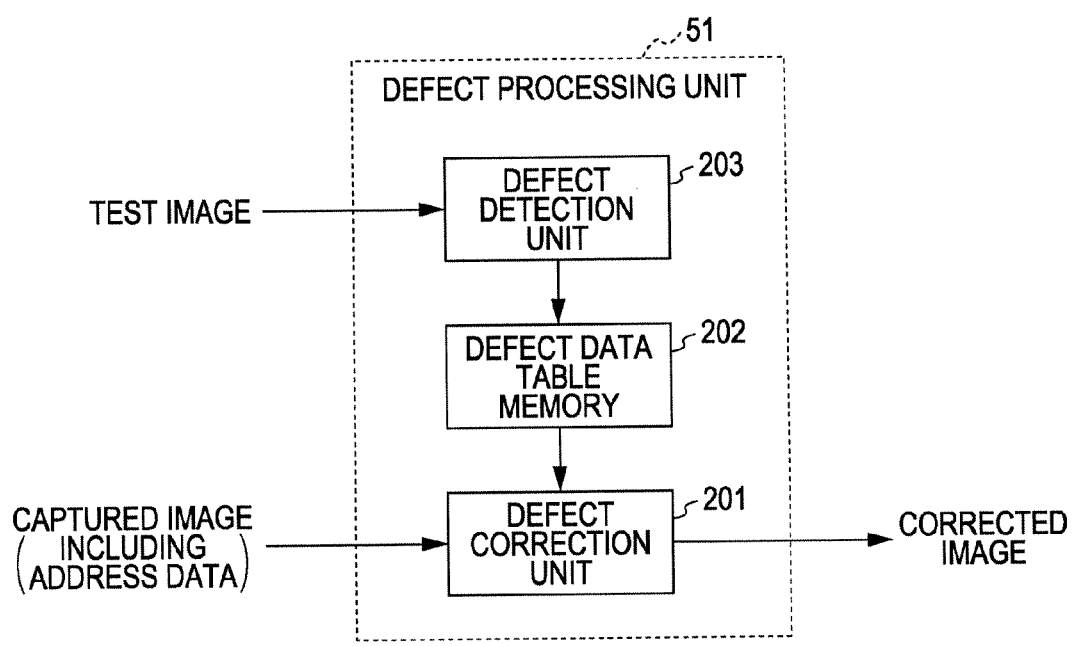
FIG. 18 is a block diagram illustrating another example of a configuration of a defect handling unit.

FIG. 18 illustrates another example of a configuration of the defect handling unit 51 shown in FIG. 3.

In the example shown in FIG. 18, the defect handling unit 51 includes a defect correction unit 201, a defect data table memory 202, and a defect detection unit 203.

The defect correction unit 201 receives image data output from the image sensor 4 (FIG. 1) via the front end unit 6. The defect correction unit 201 performs a defect correction process to correct pixel values of pixels of the received image data, in accordance with the defect data table stored in the defect data table memory 202, and supplies corrected image data obtained as a result of the defect correction process to the digital signal processing unit 52 (FIG. 3).

Defect data described in a defect data table stored in the defect data table memory 202 includes defect type data indicating whether each defective pixel is of the permanent defect type or the intermittent defect type.

The defect correction unit 201 always corrects pixel values for defective pixels of the permanent defect type in the image data. As for intermittent defective pixels in the image data, the defect correction unit 201 determines whether each intermittent defective pixel is in a defective state by comparing the pixel value of each intermittent defective pixel with a threshold value for determining the state of intermittent defective pixels, and the defect correction unit 201 corrects the pixel value only when the intermittent defective pixel is in the defective state.

The defect data table memory 202 is configured in a similar manner to the defect data table memory 102 shown in FIG. 4, and serves to store the defect data table in which defect data associated with defective pixels detected by the defect detection unit 203 is described. Note that the defect data registered in the defect data table stored in the defect data table memory 202 includes defect type data, as described above.

As with the defect detection unit 103 shown in FIG. 4, the defect detection unit 203 is supplied with test image data to be used in the defect pixel detection process.

The defect detection unit 203 performs the defect detection process. More specifically, the defect detection unit 203 detects defective pixels using the test image data supplied to the defect detection unit 203, and registers defect data associated with the detected defective pixel in the defect data table in the defect data table memory 202.

The defect detection unit 203 also determines whether each detected defective pixel is of the permanent defect type or the intermittent defect type, and registers defect data including defect type data in the defect data table.

The defect detection process and the defect correction process performed by the defect handling unit 51 configured in the above-described manner are explained in further detail below.

If a user operates the operation unit 12 shown in FIG. 1 to issue a command to perform the defect detection process, a defect detection command signal is output from the operation unit 12 as an operation signal corresponding to the operation performed by the user, and supplied to the microcomputer 11.

If the microcomputer 11 receives the defect detection command signal from the operation unit 12, the microcomputer 11 switches the operation mode from the normal mode to the defect detection mode, and controls the image sensor 4 via the timing generator 5 (FIG. 1) so as to take an image a plurality of times.

A plurality of frames of image data or corrected image data obtained as a result of the image taking operation performed by the image sensor 4 are supplied as test image data to the defect detection unit 203.

The microcomputer 11 controls, via the microcomputer interface 33 (FIG. 3), the defect detection unit 203 of the defect handling unit 51 in the camera signal processing unit 31 to perform the defect detection process.

That is, under the control of the microcomputer 11, the defect detection unit 203 performs the defect detection process as described below. If the defect detection unit 203 receives the plurality of frames of test image data from the image sensor 4, the defect detection unit 203 detects defective pixels and determines defect types of detected defective pixels. The defect detection unit 203 then registers defect data including defect type data in the defect data table in the defect data table memory 202.

If the defect detection unit 203 has registered defect data in the defect data table, the microcomputer 11 switches the operation mode from the defect detection mode to the normal mode.

In a case where the defect data table in the defect data table memory 202 has existing defect data, new defect data produced by the defect detection unit 203 is stored in the defect data table such that the existing defect data is overwritten by the new defect data.

In the operation in the normal mode, if the image sensor 4 takes an image, and resultant image data is supplied to the defect correction unit 201, the defect correction unit 201 performs the defect correction process.

More specifically, the defect correction unit 201 corrects, as required, pixel values of the received test image data in accordance with the defect data table stored in the defect data table memory 202, and supplies corrected image data obtained as a result of the defect correction process to the digital signal processing unit 52 (FIG. 3).

More specifically, the defect correction unit 201 selects pixels one by one as a pixel of interest from the image data and determines whether the pixel of interest is defective, by referring to the defect data table stored in the defect data table memory 202.

If it is determined that the pixel of interest is not defective, the defect correction unit 201 directly outputs the pixel value of the pixel of interest as a pixel value of corrected image data.

If it is determined that the pixel of interest is defective, the defect correction unit 201 determines whether the defective pixel of interest is of the permanent defect type or of the intermittent defect type, by referring to the defect data table stored in the defect data table memory 202.

If it is determined that the pixel of interest is a permanent defective pixel, the defect correction unit 201 corrects the pixel value of the pixel of interest in a similar manner to the defect correction unit 101 shown in FIG. 4, and outputs the corrected pixel value as a pixel value of the corrected image data.

On the other hand, in a case where it is determined that the pixel of interest is an intermittent defective pixel, the defect correction unit 201 determines whether the intermittent defective pixel is currently in the defective state in which the intermittent defective pixel has an abnormal pixel value, by comparing the pixel value of the intermittent defective pixel of interest with the threshold value for determining the state of intermittent defective pixels.

Unlike permanent defective pixels, intermittent defective pixels are in a defective state at some times but in a normal state at other times.

If the intermittent defective pixel of interest is not in the defective state, the defect correction unit 201 directly outputs the pixel value of the pixel of interest as a pixel value of corrected image data.

If the intermittent defective pixel of interest is in the defective state, the defect correction unit 201 corrects the pixel value of the pixel of interest in a similar manner to the defect correction unit 101 shown in FIG. 4, and outputs the corrected pixel value as a pixel value of the corrected image data.

Figure 19:
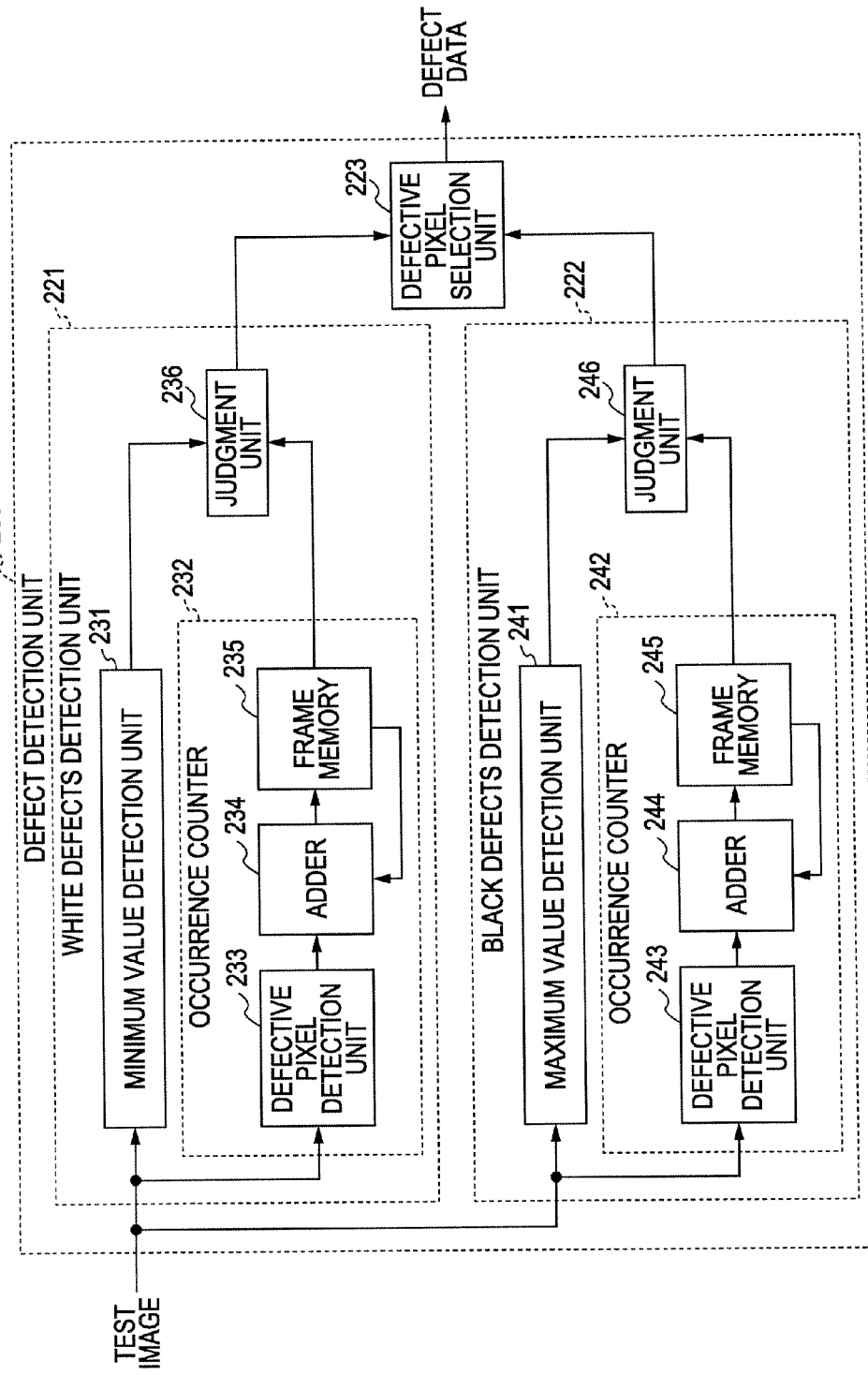
FIG. 19 is a block diagram illustrating an example of a configuration of a defect detection unit.

FIG. 19 illustrates an example of a configuration of the defect detection unit 203 shown in FIG. 18.

The defect detection unit 203 includes a white defect detection unit 221, a black defect detection unit 222, and a defective pixel selection unit 223.

The white defect detection unit 221 includes a minimum value detection unit 231, an occurrence counter 232, and a judgment unit 236. The white defect detection unit 221 detects white defective pixels and further determines the defect type of each detected white defective pixel, that is, determines whether each detected white defective pixel is of the permanent defect type or of the intermittent defect type. The white defect detection unit 221 then supplies data indicating the determination result as to whether each pixel is a white defective pixel and data indicating the defect type of each detected white defective pixel to the defective pixel selection unit 223.

More specifically, the minimum value detection unit 231 receives a plurality of frames of test image data obtained via the test image taking operation performed a plurality of times by the image sensor 4.

The minimum value detection unit 231 is configured in a similar manner to the minimum value detection unit 140 shown in FIG. 5, and serves to detect a minimum value of pixel values obtained at each pixel position of a plurality of frames of test image data and supply minimum value image data indicating detected minimum pixel values of respective pixels to the judgment unit 236.

The plurality of frames of test image data supplied to the minimum value detection unit 231 are also supplied to the occurrence counter 232.

The occurrence counter 232 detects white defective pixels by comparing a pixel value at each pixel position of the plurality of frames of test image data with the threshold value for detecting white defect. Furthermore, the occurrence counter 232 counts the number of occurrences of white defective pixels separately for each pixel location over the plurality of frames of test image data (hereinafter, such the number of occurrences will be referred to simply as the number of occurrences of white defects), and the occurrence counter 232 supplies data indicating the result to the judgment unit 236.

The configuration of the occurrence counter 232 and the operation thereof are described in further detail below. The occurrence counter 232 includes a defective pixel detection unit 233, an adder 234, and a frame memory 235.

The defective pixel detection unit 233 is supplied with test image data. The defective pixel detection unit 233 selects pixels one by one from the test image data and compares the pixel value of a pixel selected currently (hereinafter referred to as a pixel of interest) with the threshold value for detecting white defect. If the pixel value of the pixel of interest is equal to or greater than the threshold value for detecting white defect, the defective pixel detection unit 233 determines that the pixel of interest is a white defective pixel and supplies coordinates indicating the location of the pixel of interest determined to be a white defective pixel to the adder 234. In the white defective pixel detection process performed by the defective pixel detection unit 233, the absolute defect detection method or the relative defect detection method may be used.

If the adder 234 receives data indicating that a white defective pixel is detected at the current pixel position from the defective pixel detection unit 233, the adder 234 accesses the frame memory 235 and reads the number of occurrences of white defects stored at an address corresponding to the pixel location of the pixel of interest regarded as a white defective pixel, and the adder 234 increments the number of occurrences of white defects by one. The adder 234 then replaces the current data stored in the frame memory 235 at the address corresponding to the location of the pixel of interest with the incremented number of occurrences of white defects.

Thus, the number of occurrences of white defects detected at each pixel position of the test image data is stored in the frame memory 235 at the address corresponding to the pixel location of each pixel.

According to the minimum value image data supplied from the minimum value detection unit 231, i.e., data indicating a minimum pixel value detected at each pixel of test image data captured via the image taking operation performed a plurality of times by the image sensor 4, and also according to the number of occurrences of white defects stored in the frame memory 235, the judgment unit 236 determines whether each pixel of the test image data is a white defective pixel and determines the defect type of each pixel determined to be a white defective pixel, i.e., determines whether each pixel determined to be a white defective pixel is of the permanent defect type or the intermittent defect type. The judgment unit 236 supplies a judgment result for each pixel to the defective pixel selection unit 223.

The black defect detection unit 222 includes a maximum value detection unit 241, an occurrence counter 242, and a judgment unit 246. The black defect detection unit 222 detects black defective pixels and determines defect types of detected black defective pixels. The black defect detection unit 222 then supplies data indicating the determination result as to whether each pixel is a black defective pixel and data indicating the defect type of each detected black defective pixel to the defective pixel selection unit 223.

More specifically, the maximum value detection unit 241 receives a plurality of frames of test image data obtained via the test image taking operation performed a plurality of times by the image sensor 4.

The maximum value detection unit 241 is configured in a similar manner to the maximum value detection unit 130 shown in FIG. 5, and serves to detect a maximum value of pixel values obtained at each pixel position of the plurality of frames of test image data and supply maximum value image data including detected maximum pixel values of respective pixels to the judgment unit 246.

The plurality of frames of test image data supplied to the maximum value detection unit 241 are also supplied to the occurrence counter 242.

The occurrence counter 242 detects black defective pixels by comparing a pixel value at each pixel position of the plurality of frames of test image data with the threshold value for detecting black defect. Furthermore, the occurrence counter 242 counts the number of occurrences of black defective pixels separately for each pixel location over the plurality of frames of test image data (hereinafter, such the number of occurrences will be referred to simply as the number of occurrences of black defects), and the occurrence counter 242 supplies data indicating the result to the judgment unit 246.

The configuration of the occurrence counter 242 and the operation thereof are described in further detail below. The occurrence counter 242 includes a defective pixel detection unit 243, an adder 244, and a frame memory 245.

The defective pixel detection unit 243 is supplied with test image data. The defective pixel detection unit 243 selects pixels one by one from the test image data and compares the pixel value of a pixel selected currently (hereinafter referred to as a pixel of interest) with the threshold value for detecting black defect. If the pixel value of the pixel of interest is equal to or smaller than the threshold value for detecting black defect, the defective pixel detection unit 243 determines that the pixel of interest is a black defective pixel and supplies coordinates indicating the location of the pixel of interest determined to be a black defective pixel to the adder 244. In the black defective pixel detection process performed by the defective pixel detection unit 243, the absolute defect detection method or the relative defect detection method may be used.

The adder 244 accesses the frame memory 245 and reads the number of occurrences of black defects stored at an address corresponding to the pixel position of the pixel of interest regarded as a black defect, and the adder 244 increments the number of occurrences of black defects by one. The adder 244 then replaces the current data stored in the frame memory 245 at the address corresponding to the location of the pixel of interest with the incremented number of occurrences of black defects.

Thus, the number of occurrences of black defects detected at each pixel position of the test image data is stored in the frame memory 245 at the address corresponding to the pixel location of each pixel.

According to the maximum value image data supplied from the maximum value detection unit 241, i.e., data indicating a maximum pixel value detected at each pixel of test image data captured via the image taking operation performed a plurality of times by the image sensor 4, and also according to the number of occurrences of black defects stored in the frame memory 245, the judgment unit 246 determines whether each pixel of the test image data is a black defective pixel and determines the defect type of each pixel determined to be a black defective pixel, i.e., determines whether each pixel determined to be a black defective pixel is of the permanent defect type or the intermittent defect type. The judgment unit 246 supplies a judgment result for each pixel to the defective pixel selection unit 223.

As described above, the defective pixel selection unit 223 receives, from the white defect detection unit 221 and the black defect detection unit 222, data indicating the result of judgment as to whether each pixel of the test image data is a defective pixel (a white defective pixel or a black defective pixel) and data indicating the defect type.

The defective pixel selection unit 233 selects defective pixels from pixels of the test image data in accordance with the result of judgment as to whether each pixel of the test image data is defective. Furthermore, according to the result of judgment as to the defect type of each defective pixel, the defective pixel selection unit 223 produces defect data including defect pixel coordinates and the defective type of each defective pixel and supplies the defect data to the defect data table memory 202 to register the defect data in the defect data table stored in the defect data table memory 202.

Next, referring to FIG. 20, the process performed by the judgment unit 236 shown in FIG. 19 to determine the defect type is described in further detail below.

Figure 20:
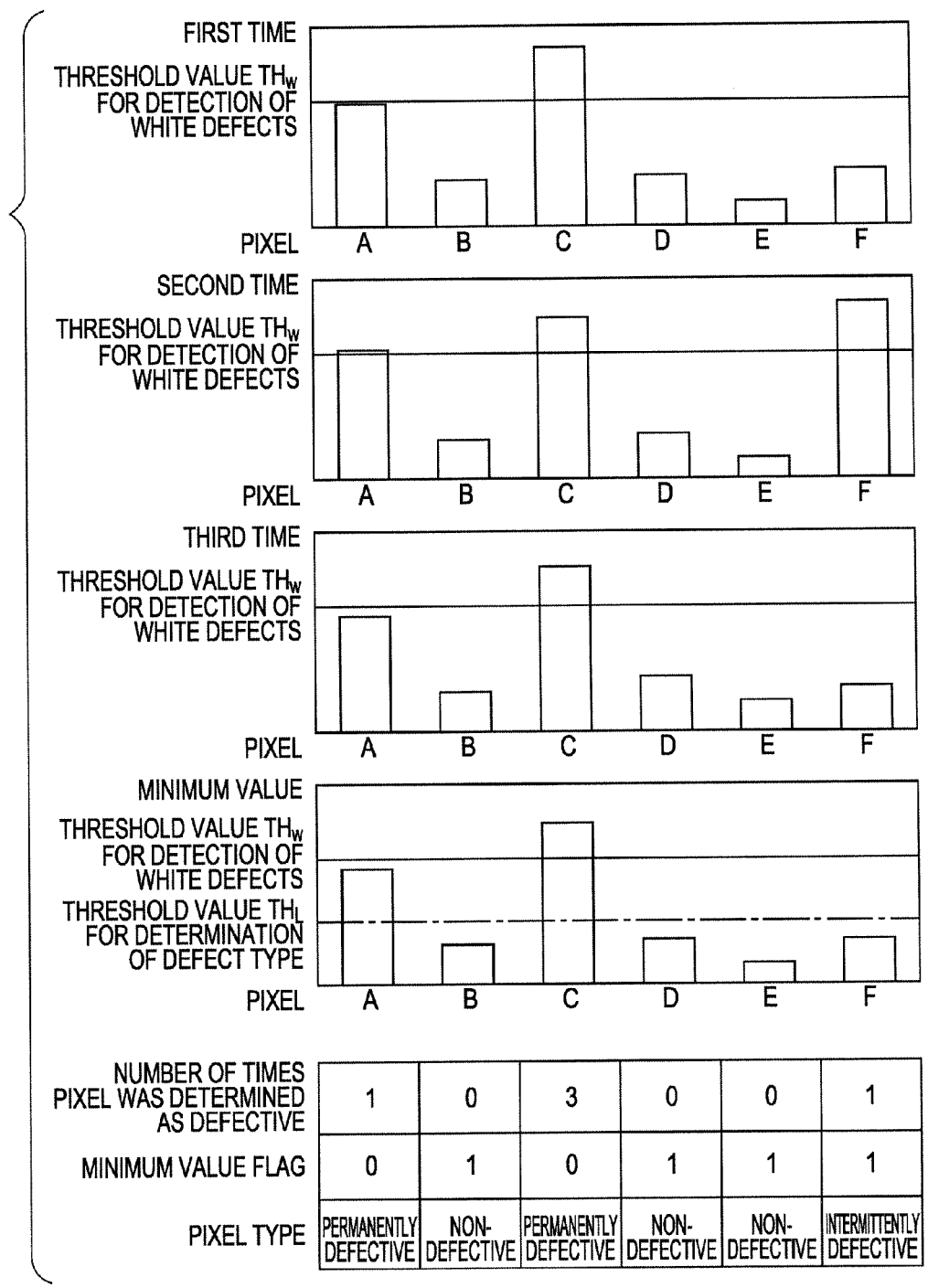
FIG. 20 is a diagram illustrating a method of determining a defect type.

FIG. 20 illustrates pixel values of six pixels A, B, C, D, E, and F for each of three frames of test image data captured via the image taking operation performed three times.

A bar chart at the top of FIG. 20 shows pixel values of six pixels A to F observed in a first frame of test image data taken in a first image taking operation, a bar chart at a next lower position shows pixel values of six pixels A to F observed in a second frame of test image data taken in a second image taking operation, and a bar chart at a further next lower position shows pixel values of six pixels A to F observed in a third frame of test image data taken in a third image taking operation.

In the example shown in FIG. 20, of six pixels A to F, three pixels B, D, and E have pixel values lower than the threshold value for detecting white defect in all three frames of test image data. However, the pixel C has pixel values higher than the threshold value for detecting white defect in all three frames of test image data. Note that in the example shown in FIG. 20, the threshold value for detecting white defect is fixed at $TH_W$.

On the other hand, the pixel A has pixel values close to the threshold value for detecting white defect in all three frames of test image data. That is, the pixel value of the pixel A fluctuates in a small range around the threshold value for detecting white defect. More specifically, the pixel value of the pixel A is slightly lower than the threshold value for detecting white defect in the first and third frame of test image data, but the pixel value of the pixel A is slightly higher than the threshold value for detecting white defect in the second frame of test image data.

The pixel F has pixel values smaller than the threshold value for detecting white defect in the first and third frame of test image data, but the pixel F has a pixel value greater than the threshold value for detecting white defect in the second frame of test image data. That is, the pixel value of the pixel F in the first and third frame of test image data are sufficiently lower than the threshold value for detecting white defect, although the pixel value in the second frame of test image data is greater than the threshold value for detecting white defect.

Pixels, which always have a pixel value lower than the threshold value for detecting white defect in any frame of test image data taken at any time, are normal pixels (also referred to as non-defective pixels). In the example shown in FIG. 20, pixels B, D, and E are always lower than the threshold value for detecting white defect, and thus they are non-defective pixels.

On the other hand, if pixels have a pixel value equal to or greater than threshold value for detecting white defect in some image taken operation, they are defective pixels (white defective pixels). In the example shown in FIG. 20, pixels A and F having pixel values greater than the threshold value for detecting white defect in the second image taking operation, and the pixel C having pixel values greater than the threshold value for detecting white defect in all three image taking operations are defective.

For the pixel C having pixel values greater than the threshold value for detecting white defect in all image taking operations, the number of occurrences of white defects is equal to the number of image taking operations performed, and thus the pixel C can be determined to be a permanent defective pixel. In the determination of the defect type, a careful consideration is needed for pixels which have a pixel value equal to or greater than the threshold value for detecting white defect in some image taking operations, but which have a pixel value lower than the threshold value for detecting white defect in other image taking operations. For such pixels, the number of occurrences of white defects is not equal to the number of image taking operations performed. In the example shown in FIG. 20, pixels A and F are of this type.

As described above, the pixel value of the pixel A is slightly lower than the threshold value for detecting white defect in the first and third image taking operations, but the pixel value of the pixel A is slightly higher than the threshold value for detecting white defect in the second image taking operation. Therefore, the pixel A is a permanent defective pixel having a pixel value fluctuating in a small range around the threshold value for detecting white defect.

On the other hand, the pixel F has pixel values smaller than the threshold value for detecting white defect in the first and third image taking operations, but the pixel value of the pixel F is higher than the threshold value for detecting white defect in the second image taking operation. In the case of the pixel F, as described above, the pixel values in the first and third image taking operations are sufficiently lower than the threshold value for detecting white defect, although the pixel value in the second image taking operation is greater than the threshold value for detecting white defect. This means that the pixel F behaves as a non-defective pixel in the first and third image taking operations, but it behaves as a defective pixel in the second image taking operation. Thus, the pixel F is an intermittent defective pixel.

For pixels, such as pixels A and F, which have a pixel value equal to greater than the threshold value for detecting white defect in some image taking operations but have a pixel value smaller than the threshold value for detecting white defect in other image taking operations, the defect type may be determined, for example, as follows.

A bar chart at the fourth position from the top of FIG. 20 shows minimum values of respective pixels A to F observed over three image taking operations.

If a threshold value for determining the defect type of white defective pixel is set to a value $TH_L$ which is sufficiently smaller than the threshold value for detecting white defect and thus can be regarded as a black level, then pixel values obtained for a permanent defective pixel are always greater than the threshold value $TH_L$ regardless of when the image is taken, because pixel values of such pixels fall within a small range close to the threshold value for detecting white defect which is sufficiently greater than the threshold value $TH_L$.

On the other hand, when an intermittent defective pixel such as the pixel F is in the non-defective state, it has a pixel value lower than the threshold value $TH_L$ for determining the defect type set to be much lower than the threshold value for detecting white defect, although the intermittent defective pixel can have a pixel value greater than the threshold value for detecting white defect when it is in the defective state.

Thus, when a certain pixel has a pixel value equal to or greater than the threshold value for detecting white defect in a certain image taking operation but has a pixel value lower than the threshold value for detecting white defect in another image taking operation as is the case with the pixels A and F, the determination of the defect type of this pixel, i.e., the determination as to whether this pixel is of the intermittent defect type or the permanent defect type is made by checking whether the pixel has a pixel value equal to or lower than the threshold value for determining the type of white defect in some image taking operation, that is, by checking whether the minimum value among a plurality of pixel values observed for this pixel via a plurality of image taking operations is equal to or lower than the threshold value for determining the type of white defect.

At the bottom of FIG. 20, shown is a table representing the number of occurrences of white defect for each of pixels A to F, and a flag indicating whether the minimum value is lower than the threshold value for determining the type of white defect (hereinafter, this flag will be referred to simply as a minimum value flag).

This table indicates that the number of occurrences of white defects is 0 for pixels B, D, and E, and thus it can be determined that these are non-defective pixels.

On the other hand, the table indicates that pixels A, C, and F have one or more occurrences of white defect, and thus it can be determined that these are defective pixels.

Furthermore, according to the table, of defective pixels A, C, and F having one or more occurrences of white defect, the minimum value flag is set to 0 for the pixels A and C (and thus the minimum values of pixel values of the pixels A and C are greater than the threshold value for determining the type of white defect), and thus the pixels A and C are permanent defective pixels.

On the other hand, of the pixels A, C, and F having one or more occurrences of white defect, the minimum value flag is set to 1 for the pixel F (and thus the minimum value of pixel values of the pixel F is equal to or lower than the threshold value for determining the type of white defect), and thus the pixel F is an intermittent defective pixel.

The determination of the defect type for black defective pixels can be made in a similar manner to the determination for white defective pixels. However, in the determination of the defect type for black defective pixels, as opposed to the determination of the defect type for white defective pixels, the defect type is determined based on the maximum value.

Figure 21:
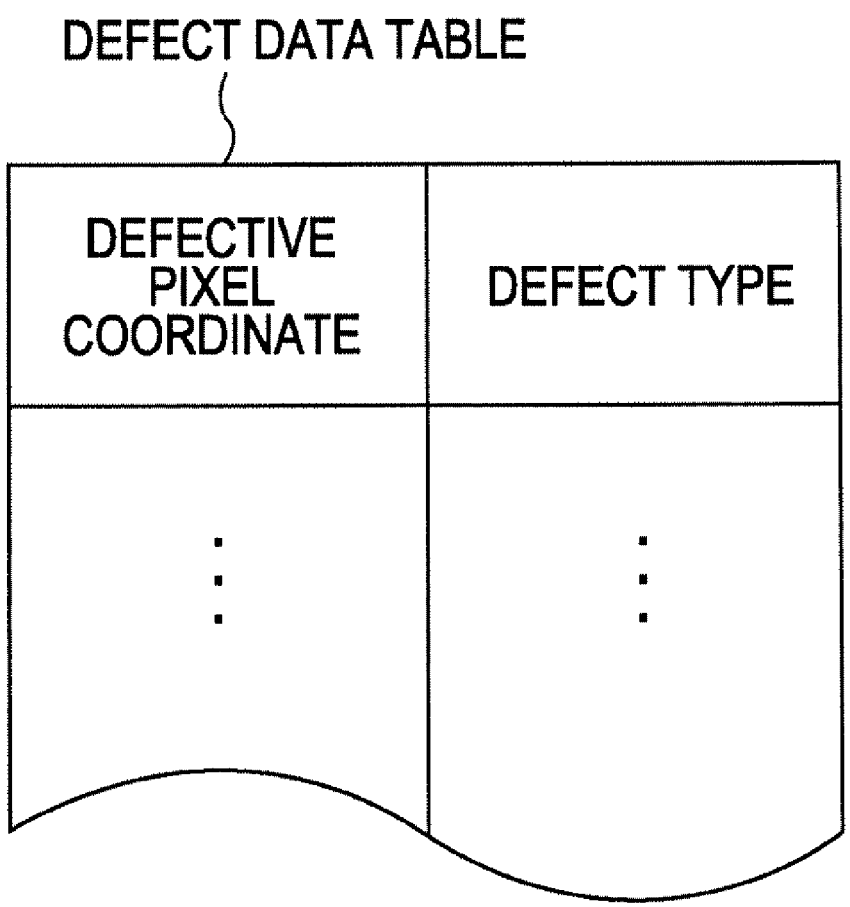
FIG. 21 is a diagram illustrating an example of a defect data table.

FIG. 21 illustrates an example of a defect data table stored in the defect data table memory 202 shown in FIG. 18.

In the example shown in FIG. 21, defect pixel coordinates and a defect type of each defective pixel are described as defect data in the defect data table.

Figure 22:
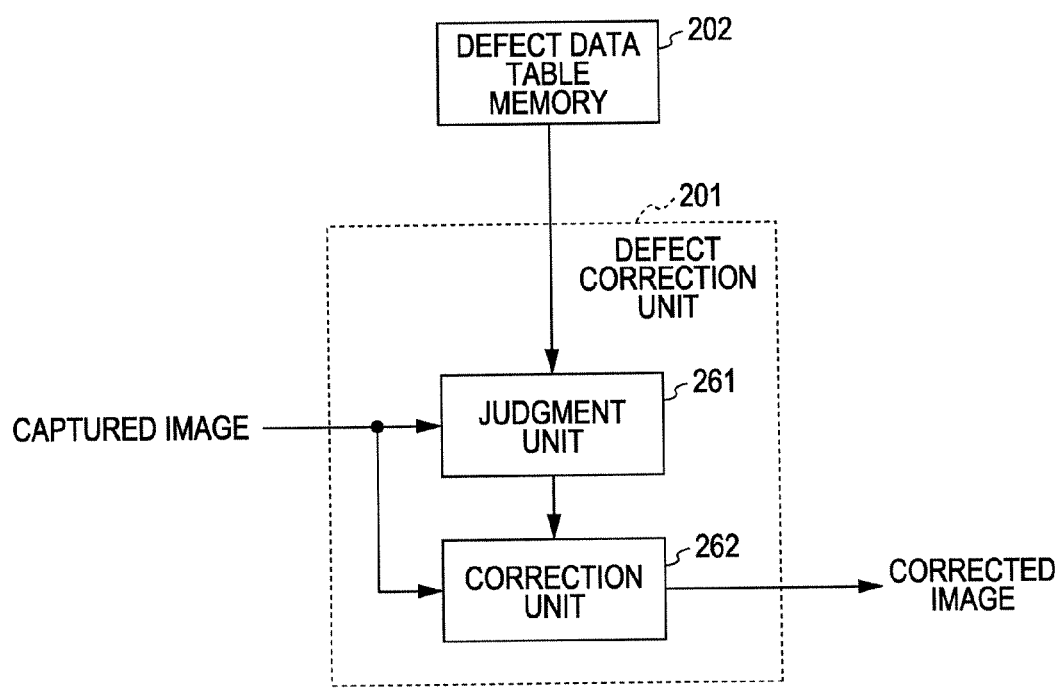
FIG. 22 is a block diagram illustrating an example of a configuration of a defect correction unit.

FIG. 22 illustrates an example of a configuration of the defect correction unit 201 shown in FIG. 18.

As shown in FIG. 22, the defect correction unit 201 includes a judgment unit 261 and a correction unit 262.

The test image data output from the front end unit 6 (FIG. 1) is supplied to the judgment unit 261.

The judgment unit 261 selects pixels one by one as a pixel of interest from the image data and determines whether the pixel of interest is defective, by referring to the defect data table stored in the defect data table memory 202.

In a case where the judgment unit 261 determines that the pixel of interest is defective, the judgment unit 261 further determines whether the defective pixel of interest is of the permanent defect type or of the intermittent defect type, by referring to the defect data table stored in the defect data table memory 202.

In a case where the judgment unit 261 determines that the pixel of interest is defective, the judgment unit 261 supplies a correction command signal to the correction unit 262 to correct the pixel value of the pixel of interest.

On the other hand, in a case where it is determined that the pixel of interest is an intermittent defective pixel, the judgment unit 261 determines whether the intermittent defective pixel is currently in the defective state in which the intermittent defective pixel has an abnormal pixel value, by comparing the pixel value of the intermittent defective pixel of interest with the threshold value for determining the state of intermittent defective pixels.

In a case where the judgment unit 261 determines that the pixel of interest is in a defective state, the judgment unit 261 supplies a correction command signal to the correction unit 262.

In addition to the correction command signal supplied from the judgment unit 261, the same test image data as that supplied to the judgment unit 261 is also supplied to the correction unit 262 from the front end unit 6.

Each time the correction unit 262 receives a pixel value of one of pixels sequentially supplied from the front end unit 6, the correction unit 262 determines whether a correction command signal has been received from the judgment unit 261 indicating that the present pixel is a pixel to be corrected. If it is determined that no correction command signal has been received and thus the present pixel is not a pixel to be corrected, the correction unit 262 directly outputs the pixel value of the present pixel as a pixel value of corrected image data.

On the other hand, if a correction command signal has been received from the judgment unit 261 and thus the present pixel is a pixel to be corrected, the correction unit 262 corrects the pixel value of the present pixel and outputs the corrected pixel value as a pixel value of the corrected image data.

The correction of the pixel value of the pixel of interest specified to be corrected may be performed in a similar manner to the correction unit 162 shown in FIG. 13.

Next, referring to a flow chart shown in FIG. 23, a defect detection process performed by the defect detection unit 203 shown in FIG. 19 is described below.

Figure 23:
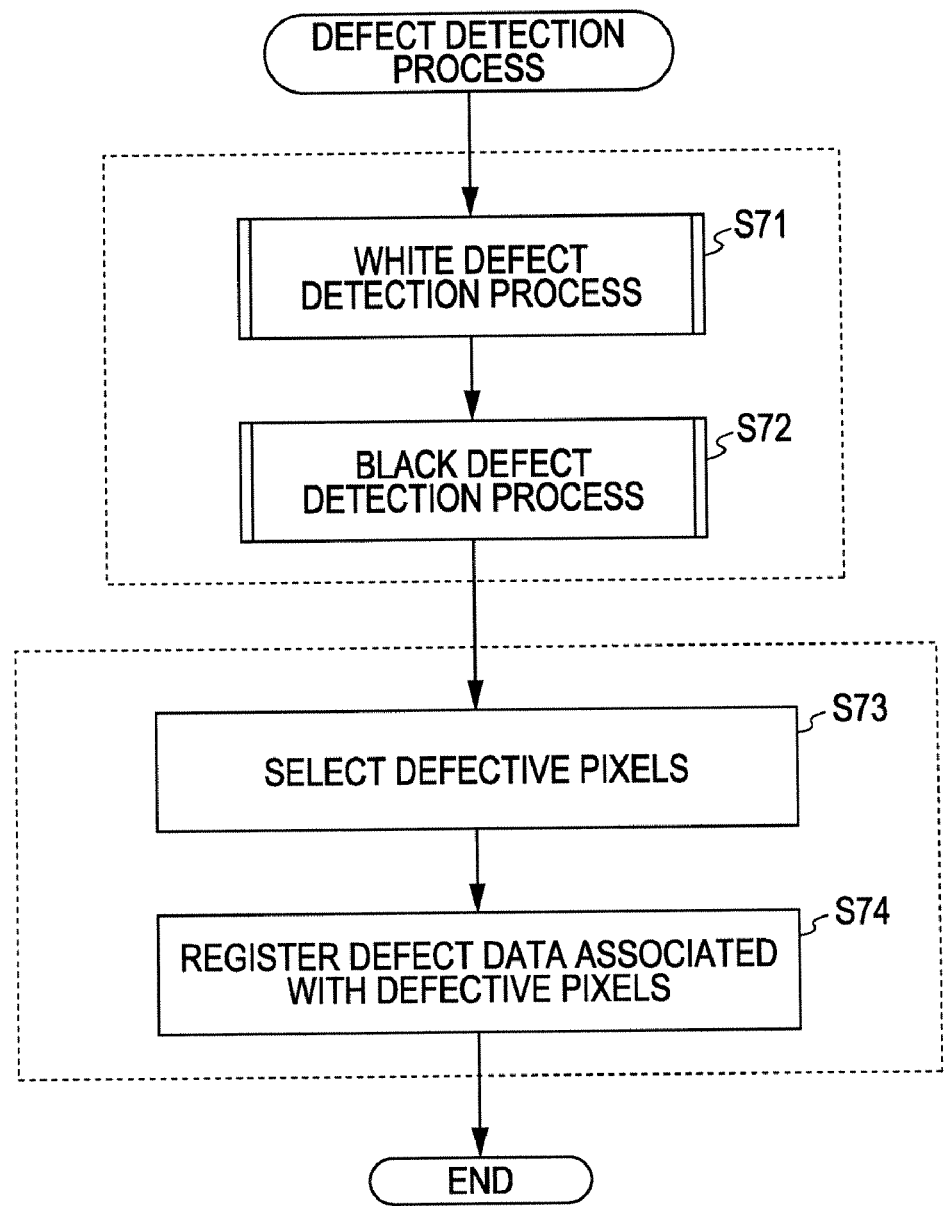
FIG. 23 is a flow chart illustrating a defect detection process.

The defect detection process shown in FIG. 23 is performed, for example, in a production line of the digital still camera shown in FIG. 1 before the digital still camera is shipped.

In step S71, the white defect detection unit 221 in the defect detection unit 203 performs the white defect detection process to detect white defective pixels, and supplies data indicating the result of determination for each pixel of the test image data as to whether the pixel of a non-defective pixel, a permanent defective pixel, or intermittent defective pixel to the defective pixel selection unit 223. The process then proceeds to step S72.

In step S72, the black defect detection unit 222 performs the black defect detection process to detect black defective pixels and supplies data indicating the result of determination for each pixel of the test image data as to whether the pixel of a non-defective pixel, a permanent defective pixel, or intermittent defective pixel to the defective pixel selection unit 223. The process then proceeds to step S73.

In step S73, the defective pixel selection unit 223 selects defective pixels from pixels of the test image data in accordance with the judgment result notified from the white defect detection unit 221 and the black defect detection unit 222. Furthermore, the defective pixel selection unit 223 produces defect data including defect pixel coordinates and the defective type of each defective pixel. The process then proceeds to step S74.

In step S74, the defective pixel selection unit 223 supplies the defect data associated with defective pixels to the defect data table memory 202. The defect data table memory 202 registers the received defect data in the defect data table. Thereafter, the defect detection process is ended.

Next, referring to a flow chart shown in FIG. 24, the white defect detection process performed in step S71 in FIG. 23 by the white defect detection unit 221 shown in FIG. 19 is described in detail below.

In step S81 in the white defect detection process, the frame memory 235 of the white defect detection unit 221 initializes the number of occurrences of white defects stored therein to 0.

In this white defect detection process, the microcomputer 11 (FIG. 1) controls the image sensor 4 via the timing generator 5 so as to take an image a predetermined plurality of times.

As a result, test image data for use in detection of white defective pixels is produced by the image sensor 4 and supplied to the minimum value detection unit 231 of the white defect detection unit 221, and step S82 is performed by the minimum value detection unit 140 shown in FIG. 5 in a similar manner to step S32 in FIG. 16.

This step S82 is performed each time test image data is taken by the image sensor 4 and supplied to the minimum value detection unit 231. As with the minimum value detection unit 140 shown in FIG. 5, the minimum value detection unit 231 detects a minimum value among a plurality of pixel values at each pixel position observed via a predetermined number of image taking operations.

The process then proceeds from step S82 to step S83. In step S83, the defective pixel detection unit 233 of the occurrence counter 232 in the white defect detection unit 221 (FIG. 19) selects pixels one by one from the test image data and compares the pixel value of a pixel selected currently (hereinafter referred to as a pixel of interest) with the threshold value for detecting white defect. If the pixel of interest has a pixel value equal to or greater than the threshold value for detecting white defect, the pixel of interest is determined to be a white defective pixel. More specifically, the defective pixel detection unit 233 determines whether the pixel value of the pixel of interest is equal to or greater than the threshold value for detecting white defect, and if so, the defective pixel detection unit 233 determines that the pixel of interest is a defective pixel.

The defective pixel detection unit 233 supplies coordinates indicating the location of the pixel of interest determined to be a defective pixel to the adder 234. Thereafter, the process proceeds from step S83 to step S84. In step S84, the adder 234 accesses the frame memory 235 and reads the number of occurrences of white defects stored at an address corresponding to the pixel position of the pixel of interest supplied from the defective pixel detection unit 233, and the adder 234 increments the number of occurrences of white defects by one. The adder 234 then replaces the current data stored in the frame memory 235 at the address corresponding to the location of the pixel of interest with the incremented number of occurrences of white defects.

The process proceeds from step S84 to step S85. In step S85, the white defect detection unit 221 determines whether the image taking operation has been performed the predetermined number of times.

If it is determined in step S85 that the operation of capturing test image data has not been performed the predetermined number of times, the image sensor 4 captures test image data once more and supplies the captured test image data to the minimum value detection unit 231 and the defective pixel detection unit 233 of the occurrence counter 232. Thereafter, the process returns to step S82 to repeat steps S82 to S85.

Via the iterative execution of steps S82 to S85, as described above, the minimum value detection unit 231 detects a minimum pixel value for each pixel from the plurality of frames of test image data obtained as a result of the predetermined number of image taking operations performed by the image sensor 4.

If it is determined in step S85 that the operation of capturing test image data has been performed the predetermined number of times, that is, if the minimum pixel value for each pixel has been detected from the plurality of frames of test image data obtained as a result of the predetermined number of image taking operations performed by the image sensor 4, and the number of occurrences of white defects as counted at each pixel position over the plurality of frames of test image data has been stored in the frame memory 235, then the minimum pixel value detected by the minimum value detection unit 231 for each pixel location over the plurality of frames of test image data and the number of occurrences of white defects stored in the frame memory 235 are supplied to the judgment unit 236.

The process then proceeds from step S85 to step S86. In step S86, the judgment unit 236 selects pixels one by one as a pixel of interest from the test image data and determines whether the number of occurrences of white defect is 0 for the pixel of interest.

If it is determined in step S86 that the number of occurrences of white defect is 0 for the pixel of interest, the process proceeds to step S87. In step S87, the judgment unit 236 notifies the defective pixel selection unit 223 that the pixel of interest is a non-defective pixel.

On the other hand, if it is determined in step S86 that the number of occurrences of white defect is not equal to 0 for the pixel of interest, that is, if the number of occurrences of white defect at the pixel of interest is one or greater, the process proceeds to step S88. In step S88, the judgment unit 236 determines whether the number of occurrences of white defect at the pixel of interest is equal to the predetermined number of image taking operations.

If it is determined in step S88 that the number of occurrences of white defect at the pixel of interest is equal to the predetermined number of image taking operations, the process proceeds to step S89. In step S89, the judgment unit 236 notifies the defective pixel selection unit 223 that the pixel of interest is a permanent defective pixel.

On the other hand, if it is determined in step S88 that the number of occurrences of white defect at the pixel of interest is not equal to the predetermined number of image taking operations, the process proceeds to step S90. In step S90, the judgment unit 236 determines whether the minimum value of pixel values at the pixel of interest captured via the predetermined number of image taking operations (hereinafter referred to simply as the minimum value at the pixel of interest) is equal to or smaller than the threshold value for determining the type of white defect.

If it is determined in step S90 that the minimum value at the pixel of interest is greater than the threshold value for determining the type of white defect, the process proceeds to step S89. In step S89, the judgment unit 236 notifies the defective pixel selection unit 223 that the pixel of interest is a permanent defective pixel.

On the other hand, if it is determined in step S90 that the minimum value at the pixel of interest is equal to or smaller than the threshold value for determining the type of white defect, the process proceeds to step S91. In step S91, the judgment unit 236 notifies the defective pixel selection unit 223 that the pixel of interest is an intermittent defective pixel.

Next, referring to a flow chart shown in FIG. 25, the black defect detection process performed in step S72 in FIG. 23 by the black defect detection unit 222 shown in FIG. 19 is described in detail below.

In step S101 in the black defect detection process, the frame memory 245 of the black defect detection unit 222 initializes the number of occurrences of black defects stored therein to 0.

In this black defect detection process, the microcomputer 11 (FIG. 1) controls the image sensor 4 via the timing generator 5 so as to take an image a predetermined plurality of times.

As a result, test image data for use in detection of black defective pixels is produced by the image sensor 4 and supplied to the maximum value detection unit 241 of the black defect detection unit 222, and step S102 is performed by the maximum value detection unit 130 shown in FIG. 5 in a similar manner to step S22 in FIG. 15.

This step S102 is performed each time test image data is taken by the image sensor 4 and supplied to the maximum value detection unit 241. As with the maximum value detection unit 130 in FIG. 5, the maximum value detection unit 241 detects a maximum value among a plurality of pixel values at each pixel position observed via a predetermined number of image taking operations.

The process then proceeds from step S102 to step S103. In step S103, the defective pixel detection unit 243 of the occurrence counter 242 in the black defect detection unit 222 (FIG. 19) selects pixels one by one from the test image data and compares the pixel value of a pixel selected currently (hereinafter referred to as a pixel of interest) with the threshold value for detecting black defect. If the pixel of interest has a pixel value equal to or smaller than the threshold value for detecting black defect, the pixel of interest is determined to be a black defective pixel. More specifically, the defective pixel detection unit 243 determines whether the pixel value of the pixel of interest is equal to or smaller than the threshold value for detecting black defect, and if so, the defective pixel detection unit 243 determines that the pixel of interest is a defective pixel.

The defective pixel detection unit 243 supplies coordinates indicating the location of the pixel of interest determined to be a defective pixel to the adder 244. The process then proceeds from step S103 to step S104. In step S104, the adder 244 accesses the frame memory 245 and reads the number of occurrences of black defects stored at an address corresponding to the pixel position of the pixel of interest, and the adder 244 increments the number of occurrences of black defects by one. The adder 244 then replaces the current data stored in the frame memory 245 at the address corresponding to the location of the pixel of interest with the incremented number of occurrences of black defects.

The process proceeds from step S104 to step S105. In step S105, the black defect detection unit 222 determines whether the image taking operation has been performed the predetermined number of times.

If it is determined in step S105 that the operation of capturing test image data has not been performed the predetermined number of times, the image sensor 4 captures test image data once more and supplies the captured test image data to the maximum value detection unit 241 and the defective pixel detection unit 243 of the occurrence counter 242. Thereafter, the process returns to step S102 to repeat steps S102 to S105.

Via the iterative execution of steps S102 to S105, as described above, the maximum value detection unit 241 detects a maximum pixel value for each pixel from the plurality of frames of test image data obtained as a result of the predetermined number of image taking operations performed by the image sensor 4.

If it is determined in step S105 that the operation of capturing test image data has been performed the predetermined number of times, that is, if the maximum pixel value for each pixel has been detected from the plurality of frames of test image data obtained as a result of the predetermined number of image taking operations performed by the image sensor 4, and the number of occurrences of black defects as counted at each pixel position over the plurality of frames of test image data has been stored in the frame memory 245, then the maximum pixel value detected by the maximum value detection unit 241 for each pixel location over the plurality of frames of test image data and the number of occurrences of black defects stored in the frame memory 245 are supplied to the judgment unit 246.

The process then proceeds from step S105 to step S106. In step S106, the judgment unit 246 selects pixels one by one as a pixel of interest from the test image data and determines whether the number of occurrences of black defect is 0 for the pixel of interest.

If it is determined in step S106 that the number of occurrences of black defect is 0 for the pixel of interest, the process proceeds to step S107. In step S107, the judgment unit 246 notifies the defective pixel selection unit 223 that the pixel of interest is a non-defective pixel.

On the other hand, if it is determined in step S106 that the number of occurrences of black defect is not equal to 0 for the pixel of interest, that is, if the number of occurrences of black defect at the pixel of interest is one or greater, then the process proceeds to step S108. In step S108, the judgment unit 246 determines whether the number of occurrences of black defect at the pixel of interest is equal to the predetermined number of image taking operations.

If it is determined in step S108 that the number of occurrences of black defect at the pixel of interest is equal to the predetermined number of image taking operations, the process proceeds to step S109. In step S109, the judgment unit 246 notifies the defective pixel selection unit 223 that the pixel of interest is a permanent defective pixel.

On the other hand, if it is determined in step S108 that the number of occurrences of black defect at the pixel of interest is not equal to the predetermined number of image taking operations, the process proceeds to step S110. In step S110, the judgment unit 246 determines whether the maximum value of pixel values at the pixel of interest captured via the predetermined number of image taking operations (hereinafter referred to simply as the maximum value at the pixel of interest) is equal to or greater than the threshold value for determining the type of black defect.

The threshold value for determining the defect type of black defective pixel is set in advance to a value which is sufficiently greater than the threshold value for detecting black defect and thus can be regarded as a white level.

If it is determined in step S110 that the maximum value at the pixel of interest is smaller than the threshold value for determining the type of black defect, the process proceeds to step S109. In step S109, the judgment unit 246 notifies the defective pixel selection unit 223 that the pixel of interest is a permanent defective pixel.

On the other hand, if it is determined in step S110 that the maximum value at the pixel of interest is equal to or greater than the threshold value for determining the type of black defect, the process proceeds to step S111. In step S111, the judgment unit 246 notifies the defective pixel selection unit 223 that the pixel of interest is an intermittent defective pixel.

Next, referring to a flow chart shown in FIG. 26, a defect correction process performed by the defect correction unit 201 shown in FIG. 22 is described below.

As described above, the image data output from the front end unit 6 (FIG. 1) is supplied to the judgment unit 261 and the correction unit 262 in the defect correction unit 201.

In step S131, the judgment unit 261 selects pixels one by one as a pixel of interest from the image data supplied from the front end unit 6 and determines whether the pixel of interest is a permanent defective pixel, by referring to the defect data table stored in the defect data table memory 202.

If it is determined in step S131 that the pixel of interest is a permanent defective pixel, the process proceeds to step S132. In step S132, the correction unit 262 corrects the pixel value of the pixel of interest and outputs the corrected pixel value as a pixel value of corrected image data. The process then proceeds to step S135.

On the other hand, if it is determined in step S131 that the pixel of interest is not a permanent defective pixel, the process proceeds to step S133. In step S133, the judgment unit 261 determines whether the pixel of interest is an intermittent defective pixel, by referring to the defect data table stored in the defect data table memory 202.

If it is determined in step S133 that the pixel of interest is not an intermittent defective pixel, that is, if the pixel of interest is a non-defective pixel, the correction unit 262 directly outputs the pixel value of the pixel of interest as a pixel value of corrected image data. The process then proceeds to step S135.

In a case where it is determined in step S133 that the pixel of interest is an intermittent defective pixel, the process proceeds to step S134. In step S134, the judgment unit 261 determines whether the intermittent defective pixel is currently in the defective state, by comparing the pixel value of the intermittent defective pixel of interest with the threshold value for determining the state of intermittent defective pixels.

In the judgment as to whether a pixel determined as an intermittent defective pixel is currently in the defective state, the threshold value for determining the state of intermittent defective pixels may be set to be equal to the varying threshold value for detecting white defect or the varying threshold value for detecting black defect used in the relative defect detection method. If the pixel value of the pixel of interest determined to be an intermittent defective pixel is equal to or greater than the threshold value defining whether white intermittent defective pixels are in the defective state, or equal to or smaller than the threshold value defining whether black intermittent defective pixels are in the defective state, the intermittent defective pixel is determined to be currently in the defective state.

The determination as to whether a pixel determined as an intermittent defective pixel is currently in the defective state may be made in accordance with a result of comparison of the pixel value of the intermittent defective pixel with the variable threshold value for determining the state of intermittent defective pixels and in accordance with a result of comparison with the fixed threshold value.

If it is determined in step S134 that the intermittent defective pixel of interest is currently not in the defective state, i.e., if the intermittent defective pixel of interest currently behaves as a non-defective pixel, the correction unit 262 directly outputs the pixel value of the pixel of interest as a pixel value of corrected image data. The process then proceeds to step S135.

On the other hand, if it is determined in step S134 that the intermittent defective pixel of interest is currently in the defective state, i.e., if the intermittent defective pixel of interest currently behaves as a defective pixel, the correction unit 262 corrects the pixel value of the pixel of interest and outputs the corrected pixel value as a pixel value of corrected image data. The process then proceeds to step S135.

In step S135, the judgment unit 261 determines whether the pixel of interest is a pixel located at the end of the test image data, that is, whether the test image data includes no more pixels to be tested.

If it is determined in step S135 that the test image data includes more pixels to be tested, then the judgment unit 261 selects one pixel as a new pixel of interest from pixels which have not been tested. The processing flow then returns to step S131 to repeat the process from step S131.

On the other hand, if it is determined in step S135 that the test image data includes no more pixels to be tested, the defect correction unit 201 ends the defect correction process.

As described above, in the operation performed by the defect handling unit 51 shown in FIG. 18, the defect detection unit 203 detects an occurrence of white defect by detecting a pixel having a pixel value greater than the threshold value for detecting white defect, and counts the number of occurrences of white defect at each pixel position of test image data over a plurality of frames captured via the image taking operation performed a plurality of times. The defect detection unit 203 further determines whether each detected white defective pixel is of the permanent defect type or of the intermittent defect, based on whether the minimum value at each pixel position of test image data as observed over the plurality of frames is greater or smaller than the threshold value which is set to be smaller than the threshold value for detecting white defective pixels so as to detect the type of white defective pixels, and also based on the number of occurrences of white defect observed at each pixel position. The defect detection unit 203 detects an occurrence of black defect by detecting a pixel having a pixel value smaller than the threshold value for detecting black defect, and counts the number of occurrences of black defect at each pixel location of test image data over the plurality of frames captured via the image taking operation performed the plurality of times. The defect detection unit 203 further determines whether each detected black defective pixel is of the permanent defect type or of the intermittent defect, based on whether the maximum value at each pixel position of test image data as observed over the plurality of frames is greater or smaller than the threshold value which is set to be greater than the threshold value for detecting black defective pixels so as to detect the type of black defective pixels, and also based on the number of occurrences of black defect observed at each pixel position. The type of each defective pixel detected is described in the defect data. According to the defect data, the defect correction unit 201 determines whether each pixel of image data is defective or not and further determines the defect type (the permanent defect type or the intermittent defect type) of each defective pixel.

In the defect handling unit 51 shown in FIG. 18, the defect correction unit 201 always corrects pixel values for defective pixels of the permanent defect type. However, for intermittent defective pixels, the defect correction unit 201 determines whether each intermittent defective pixel is in a defective state by comparing the pixel value of each intermittent defective pixel with a threshold value for determining the state of intermittent defective pixels, and the defect correction unit 201 corrects the pixel value only when the intermittent defective pixel is in the defective state. Thus, defective pixels are corrected in a highly reliable manner.

That is, intermittent defective pixels can be in the non-defective state in which intermittent defective pixels behave as non-defective pixels and can be in the defective state in which intermittent defective pixels behave as defective pixels. When intermittent defective pixels are not in the defective state, pixel values thereof are not abnormal. If a correction is made for an intermittent defective pixel which is not in the defective state, the result is that the corrected pixel value can be abnormal.

To avoid the above problem, the defect data is checked to determine whether each defective pixel is of the permanent defect type or of the intermittent defect type, and the pixel value correction is always made for pixels determined to be of the permanent defect type, while correction for each intermittent defective pixel is made only when the intermittent defective pixel is in the defective state, thereby preventing intermittent defective pixels in the non-defective state from being modified into improper values.

Next, referring to a flow chart shown in FIG. 27, another example of a defect correction process performed by the defect correction unit 201 shown in FIG. 22 is described below.

As described above, the image data output from the front end unit 6 (FIG. 1) is supplied to the judgment unit 261 and the correction unit 262 in the defect correction unit 201.

The judgment unit 261 selects pixels one by one as a pixel of interest from the image data supplied from the front end unit 6, and steps S141 to S144 are performed in a similar manner to steps S131 to S134 shown in FIG. 26.

More specifically, if the pixel of interest is a permanent defective pixel, then in step S142, the correction unit 262 corrects the pixel value of the pixel of interest and outputs the corrected pixel value as a pixel value of corrected image data. The process then proceeds to step S146.

On the other hand, if the pixel of interest is an intermittent defective pixel and is currently in the defective state, then in step S144, the correction unit 262 corrects the pixel value of the pixel of interest and outputs the corrected pixel value as a pixel value of corrected image data. The process then proceeds to step S146.

If the pixel of interest is an intermittent defective pixel and is currently not in the defective state, then in step S144, the correction unit 262 directly outputs the pixel value of the pixel of interest as a pixel value of corrected image data. The process then proceeds to step S146.

If the pixel of interest is a non-defective pixel which is neither a permanent defective pixel nor an intermittent defective pixel, that is, if it is determined in step S141 that the pixel of interest is not a permanent defective pixel and it is further determined in step S143 that the pixel of interest is not an intermittent defective pixel, then the process proceeds to step S145. In step S145, the judgment unit 261 determines whether the non-defective pixel of interest is currently in the defective state, by comparing the pixel value of the non-defective pixel of interest with the threshold value for determining the state of non-defective pixels.

In the determination as to whether a non-defective pixel of interest is currently in the defective state, the threshold value for determining the state of non-defective pixels may be set to be equal to the varying threshold value for detecting white defect or the varying threshold value for detecting black defect used in the relative defect detection method. If the pixel value of the non-defective pixel of interest is equal to or greater than the threshold value defined for detecting non-defective pixel being in the white defective state, or equal to or smaller than the threshold value defined for detecting non-defective pixel being in the black defective state, the non-defective pixel of interest is determined to be in the defective state.

The determination as to whether a non-defective pixel of interest is currently in the defective state may be made in accordance with a result of comparison of the pixel value of the pixel of interest with the variable threshold value for determining the state of non-defective pixels and in accordance with a result of comparison with the fixed threshold value.

If it is determined in step S145 that the non-defective pixel of interest is currently not in the defective state, the correction unit 262 directly outputs the pixel value of the pixel of interest as a pixel value of corrected image data. The process then proceeds to step S146.

On the other hand, if it is determined in step S145 that the non-defective pixel of interest is currently in the defective state, the correction unit 262 corrects the pixel value of the pixel of interest and outputs the corrected pixel value as a pixel value of corrected image data. The process then proceeds to step S146.

In step S146, the judgment unit 261 determines whether the pixel of interest is a pixel located at the end of the test image data, that is, whether the test image data includes no more pixels to be tested.

If it is determined in step S146 that the test image data includes more pixels to be tested, then the judgment unit 261 selects one pixel as a new pixel of interest from pixels which have not been tested. The processing flow then returns to step S141 to repeat the process from step S141.

On the other hand, if it is determined in step S146 that the test image data includes no more pixels to be tested, the defect correction unit 201 ends the defect correction process.

As described above, the defect correction unit 201 makes the determination as to whether a pixel of interest is in defective state, not only for intermittent defective pixels but also non-defective pixels, and corrects a pixel value of the pixel of interest if the pixel of interest is determined to be currently in the defective state. This makes it possible to correct pixel values of defective pixels in a more reliable manner.

Because the defect correction unit 201 determines whether each pixel of image data is defective or not according to the defect data table, any pixel which is not registered as a defective pixel in the defect data table is determined as a non-defective pixel. In the defect correction process in FIG. 26, no correction is made for any pixel determined to be non-defective according to the defect data table, that is, no correction is made for any pixel which is not registered in the defect data table.

However, after defect data is registered in the defect data table, a defect can occur at a pixel determined as a non-defective pixel. When a pixel has such a defect (hereinafter, such a pixel will be referred to as a later-occurring-defect pixel), if the defect level thereof is high, the defect will be conspicuous.

To avoid the above problem, non-defective pixels are also checked to determine whether they are in a defective state, in a similar manner to checking for intermittent defective pixels as described above with reference to FIG. 27. If a later occurrence of defect is detected at a pixel previously determined as non-defective, the pixel value of this pixel is corrected. This makes it possible to also handle later-occurrences of defects.

Pixels originally or later determined to be intermittent defective pixels tend to fall into a defective state when an image taking operation with a long exposure time is performed. In view of the above, correction (in step S134 in FIG. 26 or step S144 or S145 in FIG. 27) for intermittent defective pixels and later-occurring-defect pixels may not be performed when an image taking operation with a short exposure time is performed, but correction may be performed only when an image taking operation with a long exposure time is performed. This results in a reduction in probability that pixels originally or later determined to be intermittent defective pixels are incorrectly subjected to correction when they are not in defective states.

The threshold value for determining whether an intermittent defective pixel is in a defective state may or may not be equal to the threshold value for determining whether a non-defective pixel is in a defective state.

The intermittent defective pixels are pixels determined as defective pixel in the defect detection process. On the other hand, non-defective pixels are pixels which were not detected as defective pixels in the defect detection process, although they may fall in the defective state after the defect detection process. Therefore, the probability that a non-defective pixel is in a defective state is lower than the probability that an intermittent defective pixel is in a defective state.

In view of the above, the threshold value for determining whether non-defective pixels are in the defective state may be set to a value which causes most non-defective pixels to be determined to be non-defective, that is, the threshold may be set to a strict value. On the other hand, the threshold value for determining whether intermittent defective pixels are in the defective state may be set to a value which causes intermittent defective pixels on the border to be determined to be in the defective state.

More specifically, the threshold value for detecting non-defective pixels in the defective state may be set to a value greater, by a predetermined amount, than the variable threshold value for detecting white defect used in the relative defect detection method or may be set to a value smaller, by a predetermined amount, than the threshold value for detecting black defect. The threshold value for detecting an intermittent defective pixel in a defective state may be set to a value equal to the variable threshold value for detecting white defect used in the relative defect detection method (or smaller by a predetermined amount than the threshold value for detecting white defect), or may be set to the threshold value for detecting black defect (or greater by a predetermined amount than the threshold value for detecting black defect).

The employment of a strict value as the threshold value for detecting non-defective pixels being in the defective state prevents non-defective pixels from being incorrectly regarded as being in the defective state and thus prevents pixel values of non-defective pixels being in the normal state from being incorrectly modified into abnormal values, which would result in degradation in quality of images taken by the digital still camera.

In the example shown in FIG. 19, the defect detection unit 203 includes both the white defect detection unit 221 for detecting white defective pixels and the black defect detection unit 222 for detecting black defective pixels. Alternatively, the defect detection unit 203 may include only one of the white defect detection unit 221 for detecting white defective pixels and the black defect detection unit 222 for detecting black defective pixels. However, in the case where the defect detection unit 303 includes only one of the white defect detection unit 221 and the black defect detection unit 222, it is possible to detect only white defective pixels or black defective pixels.

Figure 28:
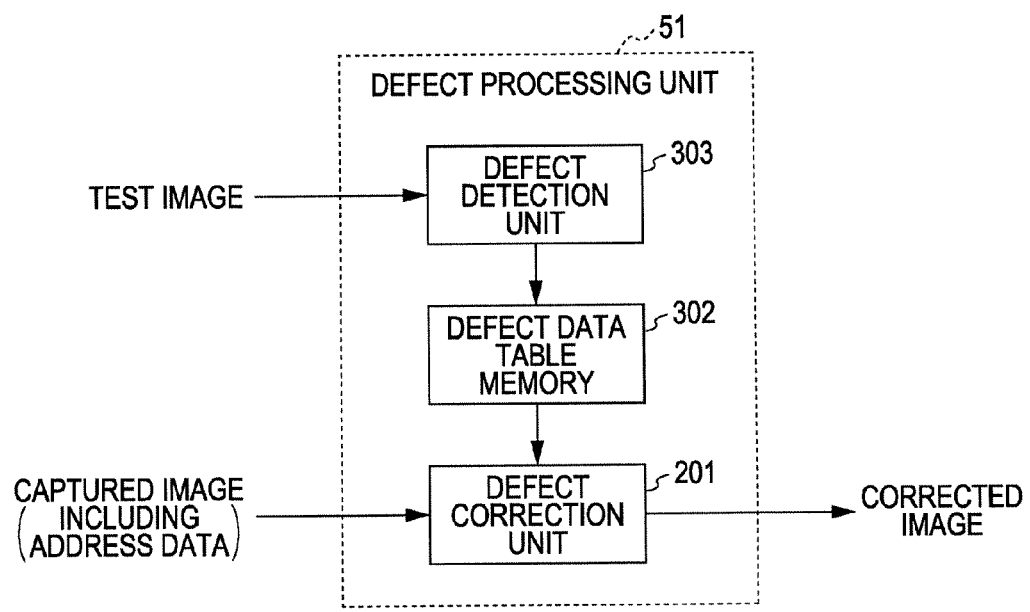
FIG. 28 is a block diagram illustrating another example of a configuration of a defect handling unit.

FIG. 28 illustrates another example of a configuration of the defect handling unit 51 shown in FIG. 3.

In FIG. 28, similar parts to those in FIG. 18 are denoted by similar reference numerals, and a duplicated explanation thereof is omitted herein.

As shown in FIG. 28, the defect handling unit 51 includes a defect correction unit 201, a defect data table memory 302, and a defect detection unit 303.

The defect data table memory 302 is configured in a similar manner to the defect data table memory 102 shown in FIG. 4, and serves to store the defect data table in which defect data associated with defective pixels detected by the defect detection unit 303 is described.

As with the defect detection unit 103 shown in FIG. 4, the defect detection unit 303 is supplied with test image data to be used in the defect pixel detection process.

The defect detection unit 303 performs the defect detection process, as with the defect detection unit 103 shown in FIG. 4 or as with the defect detection unit 203 shown in FIG. 18. More specifically, the defect detection unit 303 detects defective pixels using the test image data supplied to the defect detection unit 203, and registers defect data associated with the detected defective pixel in the defect data table in the defect data table memory 302.

The defect detection process and the defect correction process performed by the defect handling unit 51 configured in the above-described manner are explained in further detail below.

If a user operates the operation unit 12 shown in FIG. 1 to issue a command to perform the defect detection process, a defect detection command signal is output from the operation unit 12 as an operation signal corresponding to the operation performed by the user, and supplied to the microcomputer 11.

If the microcomputer 11 receives the defect detection command signal from the operation unit 12, switches the operation mode from the normal mode to the defect detection mode, and controls the image sensor 4 via the timing generator 5 (FIG. 1) so as to take an image a plurality of times.

A plurality of frames of image data or corrected image data obtained as a result of the image taking operation performed by the image sensor 4 are supplied as test image data to the defect detection unit 303.

The microcomputer 11 controls, via the microcomputer interface 33 (FIG. 3), the defect detection unit 303 of the defect handling unit 51 in the camera signal processing unit 31 to perform the defect detection process.

Thus, under the control of the microcomputer 11, the defect detection unit 303 performs the defect detection process as described below. If the defect detection unit 303 receives the plurality of frames of test image data from the image sensor 4, the defect detection unit 303 detects defective pixels and registers defect data associated with detected defective pixels in the defect data table in the defect data table memory 302.

If the defect detection unit 303 has registered defect data in the defect data table, the microcomputer 11 switches the operation mode from the defect detection mode to the normal mode.

In a case where the defect data table in the defect data table memory 302 has existing defect data, new defect data produced by the defect detection unit 303 is stored in the defect data table such that the existing defect data is overwritten by the new defect data.

In the operation in the normal mode, if the image sensor 4 takes an image, and resultant image data is supplied to the defect correction unit 201, the defect correction unit 201 performs the defect correction process as described above with reference to FIG. 18.

Figure 29:
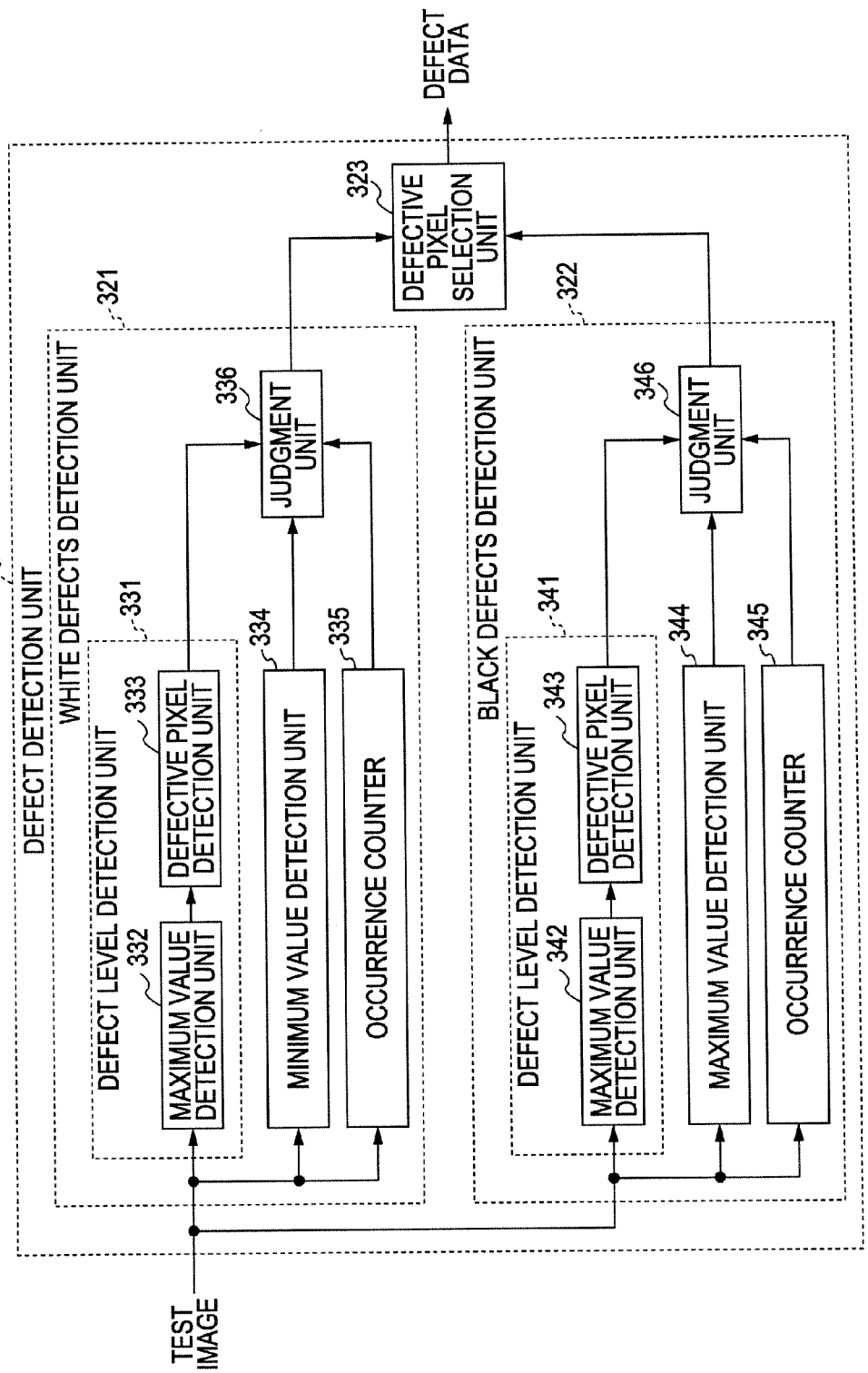
FIG. 29 is a block diagram illustrating an example of a configuration of a defect detection unit.

FIG. 29 illustrates an example of a configuration of the defect detection unit 303 shown in FIG. 28.

The defect detection unit 303 includes a white defect detection unit 321, a black defect detection unit 322, and a defective pixel detection unit 323.

The white defect detection unit 321 includes defect level detection unit 331, a minimum value detection unit 334, an occurrence counter 335, and a judgment unit 336. The white defect detection unit 321 detects a white defective pixel and determines the defect level of the detected white defective pixel. The white defect detection unit 321 further determines the defect type of the detected white defective pixel, that is, determines whether the detected white defective pixel is of the permanent defect type or the intermittent defect type. The white defect detection unit 321 then supplies data indicating the determination result as to whether the pixel of interest is a white defective pixel or not and data indicating the defect type of the detected white defective pixel to the defective pixel detection unit 323.

In the white defect detection unit 321, the defect level detection unit 331, the minimum value detection unit 334, and the occurrence counter 335 are supplied with the plurality of frames of test image data obtained via the test image taking operation performed a plurality of times by the image sensor 4.

The defect level detection unit 331 includes a maximum value detection unit 332 and a defective pixel detection unit 333, and serves to detect a white defective pixel and determines the defect level of the detected white defective pixel, by comparing a maximum pixel value detected at each pixel of test image data captured via an image taking operation performed a plurality of times by the image sensor 4 with a threshold value for detecting white defect. Data indicating the detection result is supplied to the judgment unit 336.

The maximum value detection unit 332 is configured in a similar manner to the maximum value detection unit 130 shown in FIG. 5, and serves to detect a maximum value of pixel values obtained at each pixel position of the plurality of frames of test image data and supply maximum value image data indicating detected maximum pixel values of respective pixels to the defective pixel detection unit 333.

The defective pixel detection unit 333 is configured in a similar manner to the defective pixel detection unit 134 shown in FIG. 5, and serves to detect white defective pixels by comparing the pixel value of each pixel of maximum value image data supplied from the maximum value detection unit 332 with the threshold value for detecting white defect in a similar manner to the defective pixel detection unit 134 shown in FIG. 5. The defective pixel detection unit 333 further determines the defect level of each white defective pixel by subtracting the threshold value for detecting white defect from the pixel value of each white defective pixel and employing the subtraction result as the defect level. The data indicating detected white defective pixels and defect levels thereof is supplied from the defective pixel detection unit 333 to the judgment unit 336.

The minimum value detection unit 334 is configured in a similar manner to the minimum value detection unit 231 shown in FIG. 19 (and thus also to the minimum value detection unit 140 shown in FIG. 5) and serves to, as with the minimum value detection unit 231 shown in FIG. 19, detect a minimum value of pixel values obtained at each pixel position of a plurality of frames of test image data and supply minimum value image data including detected minimum pixel values of respective pixels to the judgment unit 336.

The occurrence counter 335 is configured in a similar manner to the occurrence counter 232 shown in FIG. 19 and serves to, as with the occurrence counter 232 shown in FIG. 19, to detect white defective pixels by comparing a pixel value at each pixel position of the plurality of frames of test image data with the threshold value for detecting white defect and count the number of occurrences of white defective pixels separately for each pixel location over the plurality of frames of test image data. The data indicating the result is supplied to the judgment unit 336.

The judgment unit 336 identifies white defective pixels according to the detection result supplied from the defect level detection unit 331 (more specifically, the defective pixel detection unit 333). Furthermore, according to the minimum value image data supplied from the minimum value detection unit 334, i.e., data indicating a minimum pixel value detected at each pixel of test image data captured via the image taking operation performed a plurality of times by the image sensor 4, and also according to the number of occurrences of white defects supplied from the occurrence counter 335, the judgment unit 336 determines the defect type of each pixel determined to be a white defective pixel, i.e., determines whether each pixel determined to be a white defective pixel is of the permanent defect type or the intermittent defect type, in a similar manner to the judgment unit 236 shown in FIG. 19. The judgment unit 336 produces defect data indicating defect pixel coordinates, a defect level, and a defect type of each defective pixel and supplies the defect data to the defective pixel selection unit 323.

The black defect detection unit 322 includes a defect level detection unit 341, a maximum value detection unit 344, an occurrence counter 345, and a judgment unit 346. The black defect detection unit 322 detects a black defective pixel and determines the defect level of the detected black defective pixel. The black defect detection unit 322 further determines the defect type of the detected black defective pixel, that is, determines whether the detected black defective pixel is of the permanent defect type or the intermittent defect type. The black defect detection unit 322 then supplies data indicating the determination result as to whether the pixel of interest is a black defective pixel or not and data indicating the defect type of the detected black defective pixel to the defective pixel detection unit 323.

In the black defect detection unit 322, the defect level detection unit 341, the maximum value detection unit 344, and the occurrence counter 345 are supplied with a plurality of frames of test image data obtained via the test image taking operation performed a plurality of times by the image sensor 4.

The defect level detection unit 341 includes a minimum value detection unit 342 and a defective pixel detection unit 343, and serves to detect a black defective pixel and determine the defect level of the detected black defective pixel by comparing a minimum pixel value detected at each pixel of test image data captured via an image taking operation performed a plurality of times by the image sensor 4 with a threshold value for detecting black defect. The detection result is supplied to the judgment unit 346.

The minimum value detection unit 342 is configured in a similar manner to the minimum value detection unit 140 shown in FIG. 5, and serves to detect a minimum value of pixel values obtained at each pixel position of a plurality of frames of test image data and supply minimum value image data indicating detected minimum pixel values of respective pixels to the defective pixel detection unit 343.

The defective pixel detection unit 343 is configured in a similar manner to a defective pixel detection unit 144 shown in FIG. 5, and serves to detect black defective pixels by comparing the pixel value of each pixel of minimum value image data supplied from the minimum value detection unit 342 with the threshold value for detecting black defect in a similar manner to the defective pixel detection unit 144 shown in FIG. 5. The defective pixel detection unit 343 further determines the defect level of each black defective pixel by subtracting the threshold value for detecting black defect from the pixel value of each black defective pixel and employing the subtraction result as the defect level. The data indicating detected black defective pixels and defect levels thereof are supplied from the defective pixel detection unit 343 to the judgment unit 346.

The maximum value detection unit 344, is configured in a similar manner to the maximum value detection unit 241 shown in FIG. 19 (and thus also to the maximum value detection unit 130 shown in FIG. 5) and serves to, as with the maximum value detection unit 241 shown in FIG. 19, detect a maximum value of pixel values obtained at each pixel position of a plurality of frames of test image data and supply maximum value image data indicating detected maximum pixel values of respective pixels to the judgment unit 346.

The occurrence counter 345 is configured in a similar manner to the occurrence counter 242 shown in FIG. 19 and serves to, as with the occurrence counter 242 shown in FIG. 19, detect black defective pixels by comparing a pixel value at each pixel position of the plurality of frames of test image data with the threshold value for detecting black defect and count the number of occurrences of black defective pixels separately for each pixel location over the plurality of frames of test image data. The data indicating the result is supplied to the judgment unit 346.

The judgment unit 346 identifies black defective pixels according to the detection result supplied from the defect level detection unit 341 (more specifically, the defective pixel detection unit 343). Thereafter, according to the maximum value image data supplied from the maximum value detection unit 344, i.e., data indicating a maximum pixel value detected at each pixel of test image data captured via the image taking operation performed a plurality of times by the image sensor 4, and also according to the number of occurrences of black defects supplied from the occurrence counter 345, the judgment unit 346 determines the defect type of each pixel determined to be a black defective pixel, i.e., determines whether each pixel determined to be a black defective pixel is of the permanent defect type or the intermittent defect type, in a similar manner to the judgment unit 246 shown in FIG. 19. The judgment unit 346 produces defect data indicating defect pixel coordinates, a defect level, and a defect type of each defective pixel and supplies the defect data to the defective pixel selection unit 323.

As described above, the defective pixel selection unit 323 is supplied with the defect data indicating defect pixel coordinates, defect levels, and defect types of respective defective pixels from the white defect detection unit 321 and the black defect detection unit 322.

On the basis of defect levels indicated by the defect data, the defective pixel selection unit 323 selects a predetermined number, N, of defective pixels with large defect levels and supplies the defect data associated with the selected N defective pixels to the defect data table memory 302. The defect data table memory 302 registers the received defect data in the defect data table.

In a case where the number of defect data or defective pixels supplied from the white defect detection unit 321 and the black defect detection unit 322 is smaller than the predetermined number N, the defective pixel selection unit 323 selects all defective pixels and registers the defect data of all defective pixels in the defect data table, in a similar manner to the defective pixel selection unit 123 shown in FIG. 5.

The number N may be determined, for example, depending on the storage capacity of the defect data table memory 302.

Figure 30:
FIG. 30 is a diagram illustrating an example of a defect data table.

FIG. 30 illustrates an example of a defect data table stored in the defect data table memory 302 shown in FIG. 28.

In the example shown in FIG. 30, defect pixel coordinates, a defect level, and a defect type of each defective pixel are described as defect data in the defect data table.

Referring to a flow chart shown in FIG. 31, a defect detection process performed by the defect detection unit 303 shown in FIG. 29 is described below.

Figure 31:
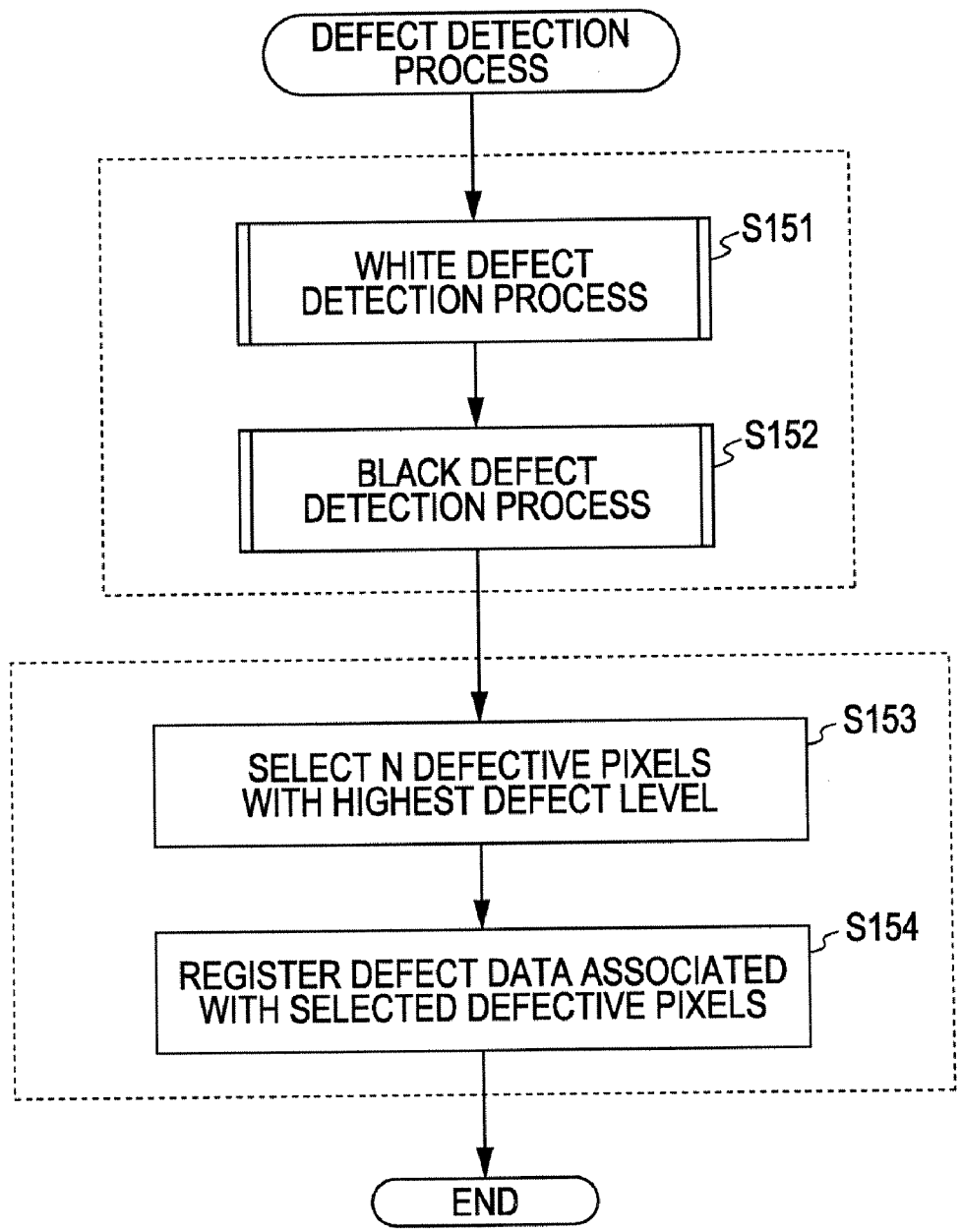
FIG. 31 is a flow chart illustrating a defect detection process.

The defect detection process shown in FIG. 31 is performed, for example, in a production line of the digital still camera shown in FIG. 1 before the digital still camera is shipped.

In step S151, the white defect detection unit 321 in the defect detection unit 303 shown in FIG. 29 performs the white defect detection process to detect white defective pixels. The defect data associated with the detected white defective pixels is supplied to the defective pixel selection unit 323. The process then proceeds to step S152.

In step S152, the black defect detection unit 322 performs the black defect detection process to detect black defective pixels. The defect data associated with the detected black defective pixels is supplied to the defective pixel selection unit 323. The process then proceeds to step S153.

In step S153, the defective pixel selection unit 323 selects N defective pixels with greatest defect levels in accordance with the defect data supplied from the white defect detection unit 321 and the black defect detection unit 322. The process then proceeds to step S154. In step S154, the defective pixel selection unit 323 supplies the defect data associated with the selected N defective pixels with greatest defect levels to the defect data table memory 302. The defect data table memory 302 registers the received defect data in the defect data table. Thereafter, the defect detection process is ended.

Figure 32:
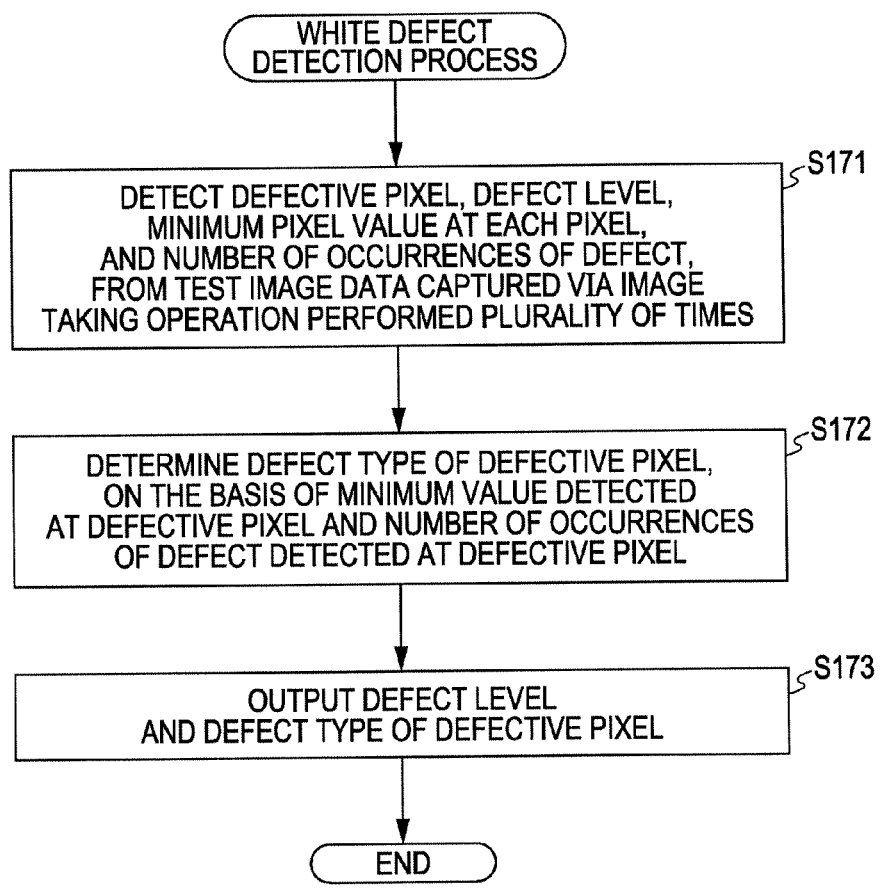
FIG. 32 is a flow chart illustrating a white defect detection process.

Referring to a flow chart shown in FIG. 32, the white defect detection process performed in step S151 in FIG. 31 by the white defect detection unit 321 shown in FIG. 29 is described in further detail below.

In this white defect detection process, the microcomputer 11 (FIG. 1) controls the image sensor 4 via the timing generator 5 so as to take an image a predetermined plurality of times. As a result, a plurality of frames of test image data are produced via the image taking operation performed the predetermined plurality of times, and supplied to the defect level detection unit 331, the minimum value detection unit 334, and the occurrence counter 335 in the white defect detection unit 321.

In step S171, using the plurality of frames of test image data supplied, the white defect detection unit 321 detects defect levels, defect levels thereof, minimum value image data (indicating a minimum value at each pixel position of test image data as observed over the plurality of frames), and the number of occurrences of white defect observed at each pixel position.

More specifically, in this step S171, the maximum value detection unit 332 of the defect level detection unit 331 in the white defect detection unit 321 determines maximum value image data from the plurality of frames of test image data in a similar manner to the white defect detection process shown in FIG. 15 performed by the maximum value detection unit 130 shown in FIG. 5, and the maximum value detection unit 332 supplies the resultant maximum value image data to the defective pixel detection unit 333.

Based on the maximum value image data, the defective pixel detection unit 333 detects white defective pixels and defect levels thereof in a similar manner to the white defect detection process in FIG. 15 performed by the defective pixel detection unit 134 shown in FIG. 5. Data indicating coordinates of detected white defective pixels and defect levels thereof are supplied from the defective pixel detection unit 333 to the judgment unit 336.

Figure 24:
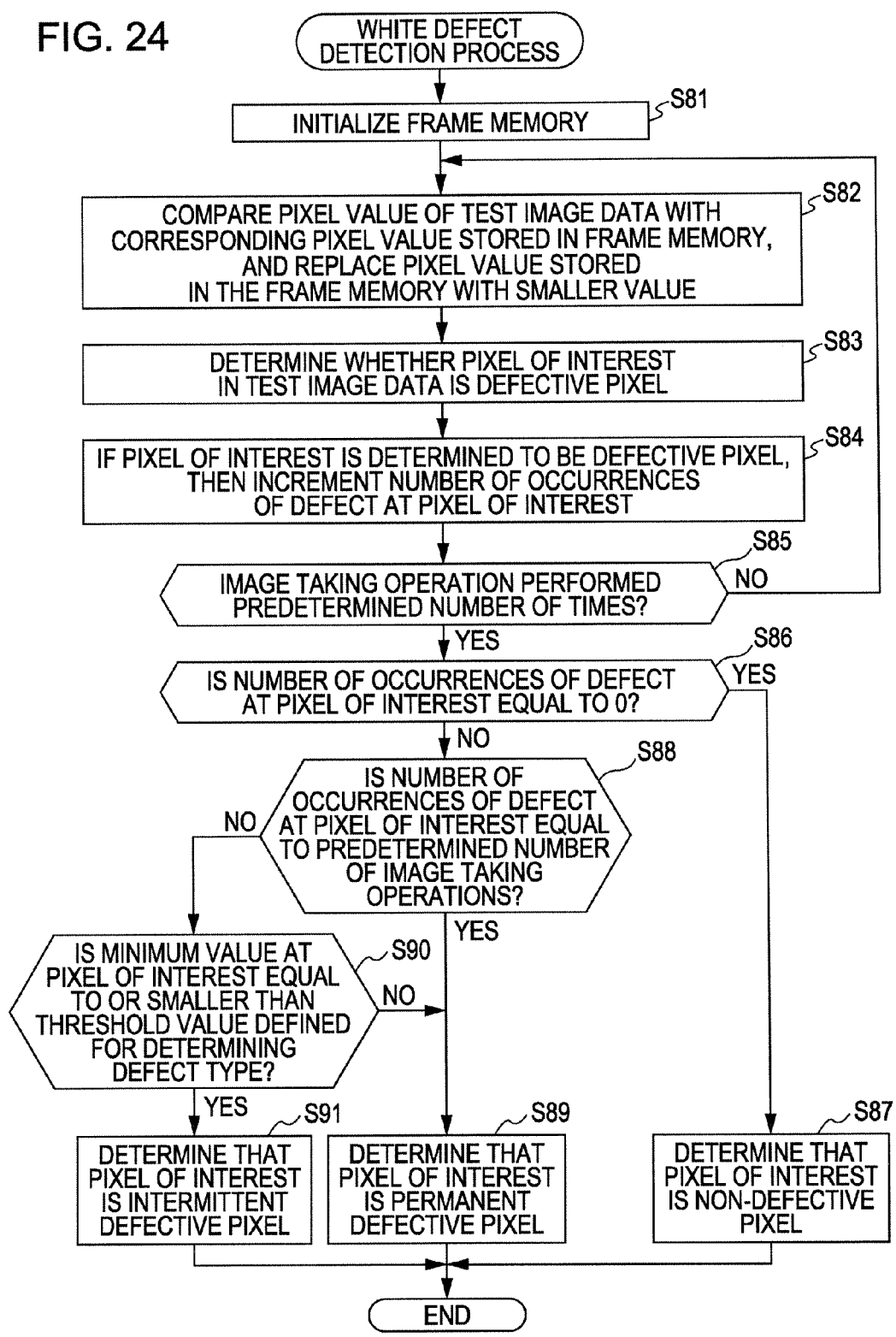
FIG. 24 is a flow chart illustrating a white defect detection process.

Furthermore, in step S171, the minimum value detection unit 334 determines minimum value image data from the plurality of frames of test image data in a similar manner to the white defect detection process in FIG. 24 performed by the minimum value detection unit 231 shown in FIG. 19, and supplies the resultant minimum value image data to the judgment unit 336.

Furthermore, in step S171, the occurrence counter 335 determines the number of occurrences of white defect from the plurality of frames of test image data in a similar manner to the white defect detection process in FIG. 24 performed by the occurrence counter 232 shown in FIG. 19, and the occurrence counter 335 supplies the determined result to the judgment unit 336.

The process then proceeds from step S172 to step S173. In step S173, according to the minimum value image data supplied from the minimum value detection unit 334, i.e., data indicating a minimum value at each pixel position of test image data as observed over the plurality of frames, and also according to the number of occurrences of white defects supplied from the occurrence counter 335, the judgment unit 336 determines defect types of respective detected white defective pixels, in a similar manner to the white defect detection process shown in FIG. 24 performed by the judgment unit 236 shown in FIG. 19. The process then proceeds to step S173.

In step S173, the judgment unit 336 produces defect data including coordinates, defective levels, and defective types of respective white defective pixels and supplies the resultant defect data to the defective pixel selection unit 323. Thereafter, the white defect detection process is ended.

Figure 33:
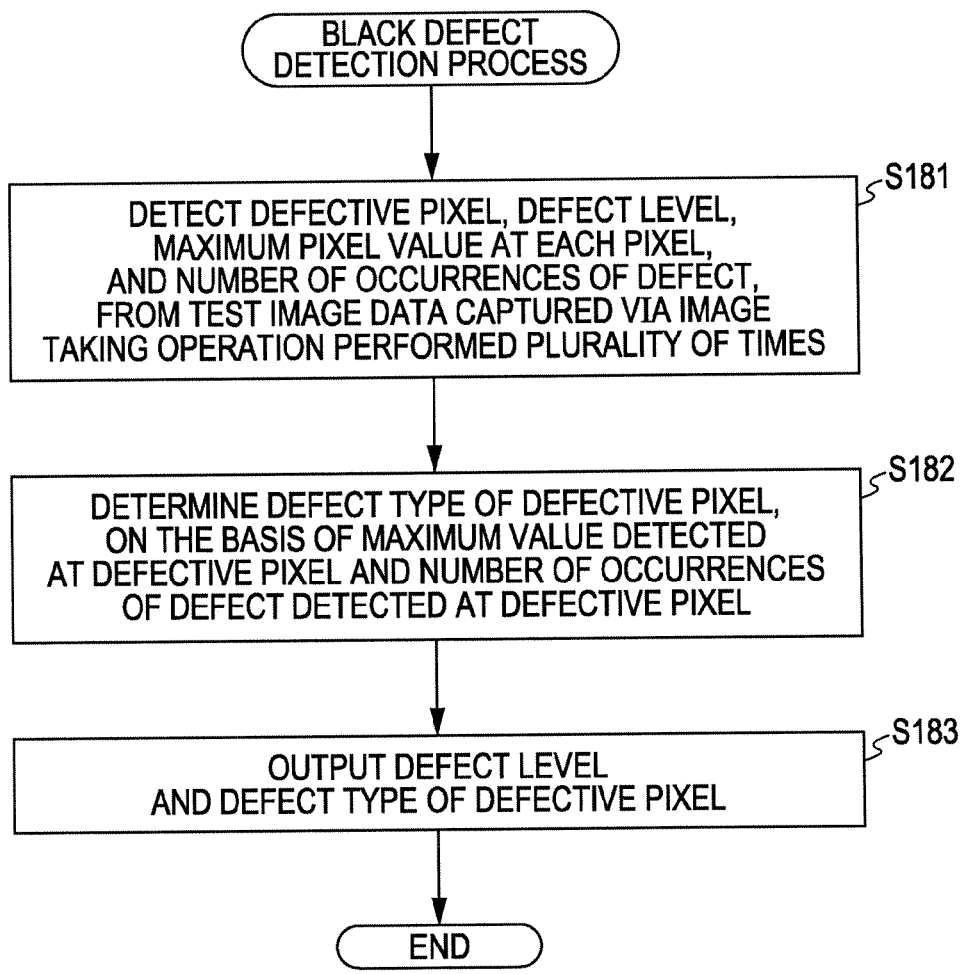
FIG. 33 is a flow chart illustrating a black defect detection process.

Referring to a flow chart shown in FIG. 33, the black defect detection process performed in step S152 in FIG. 31 by the black defect detection unit 322 shown in FIG. 29 is described in further detail below.

In this black defect detection process, the microcomputer 11 (FIG. 1) controls the image sensor 4 via the timing generator 5 so as to take an image a predetermined plurality of times. As a result, a plurality of frames of test image data are produced via the image taking operation performed the predetermined plurality of times, and supplied to the defect level detection unit 341, the maximum value detection unit 344, and the occurrence counter 345 in the black defect detection unit 322.

In step S181, the black defect detection unit 322 detects black defective pixels and defect levels thereof, maximum value image data indicating a maximum pixel value at each pixel position of test image data as observed over the plurality of frames, and the number of occurrences of black defects at each pixel position.

More specifically, in this step S181, the minimum value detection unit 342 of the defect level detection unit 341 in the black defect detection unit 322 determines minimum value image data from the plurality of frames of test image data in a similar manner to the black defect detection process shown in FIG. 16 performed by the minimum value detection unit 140 shown in FIG. 5, and the minimum value detection unit 342 supplies the resultant minimum value image data to the defective pixel detection unit 343.

Based on the minimum value image data, the defective pixel detection unit 343 detects black defective pixels and defect levels thereof in a similar manner to the black defect detection process shown in FIG. 16 performed by the defective pixel detection unit 144 shown in FIG. 5. Data indicating coordinates of detected black defective pixels and defect levels thereof are supplied from the defective pixel detection unit 343 to the judgment unit 346.

Figure 25:
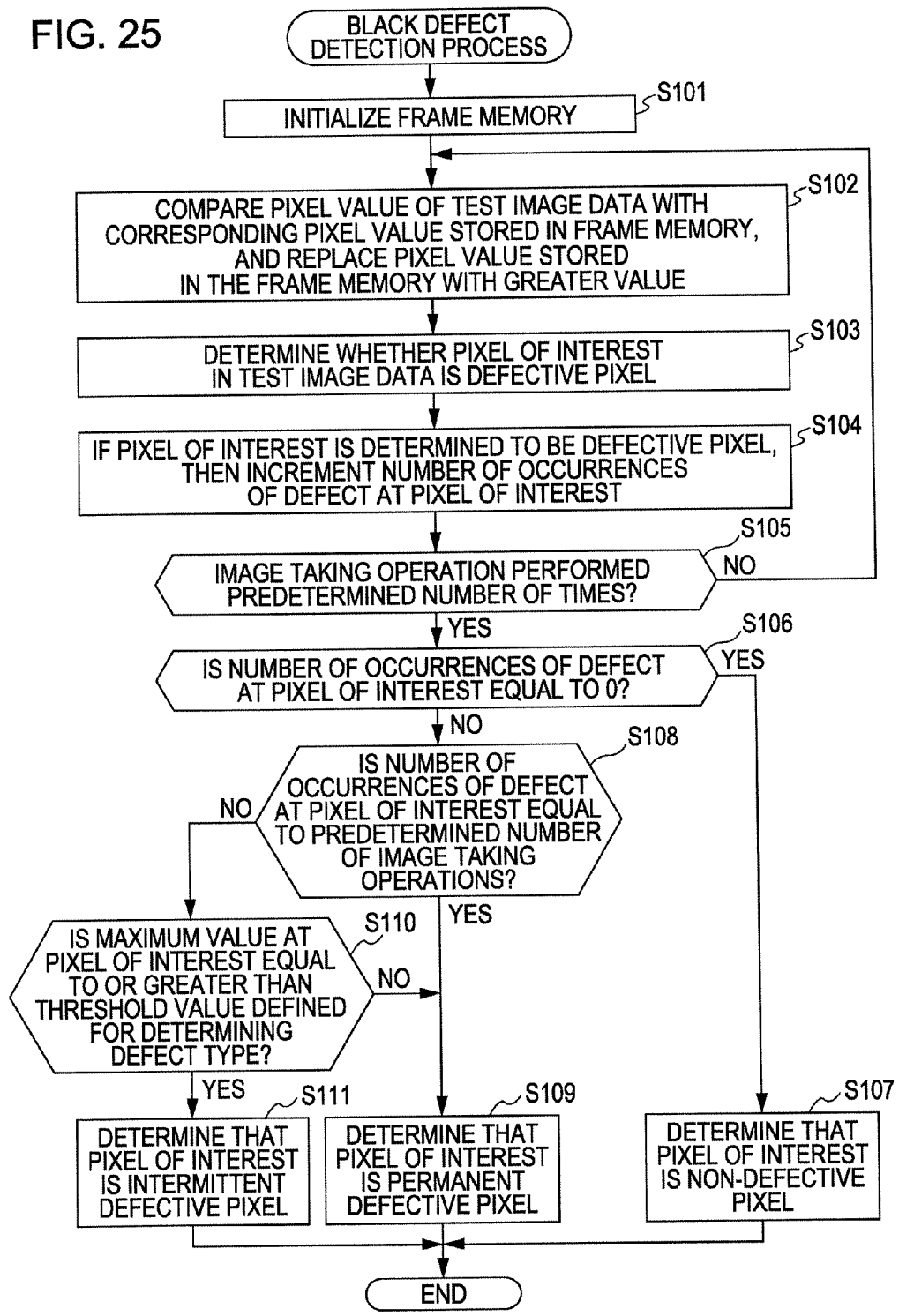
FIG. 25 is a flow chart illustrating a black defect detection process.

Furthermore, in step S181, the maximum value detection unit 344 determines maximum value image data from the plurality of frames of test image data in a similar manner to the black defect detection process shown in FIG. 25 performed by the maximum value detection unit 241 shown in FIG. 19, and the maximum value detection unit 344 supplies the resultant maximum value image data to the judgment unit 346.

Furthermore, in step S181, the occurrence counter 345 determines the number of occurrences of black defect at each pixel position as observed via the plurality of frames of test image data, and the occurrence counter 345 supplies the determined result to the judgment unit 346.

The process then proceeds from step S182 to step S183. In step S183, according to the maximum value image data supplied from the maximum value detection unit 344, i.e., data indicating a maximum value at each pixel position of test image data as observed over the plurality of frames, and also according to the number of occurrences of black defects supplied from the occurrence counter 345, the judgment unit 346 determines defect types of respective detected black defective pixels, in a similar manner to the black defect detection process shown in FIG. 25 performed by the judgment unit 236 shown in FIG. 19. The process then proceeds to step S183.

In step S183, the judgment unit 346 produces defect data including coordinates, defective levels, and defective types of respective black defective pixels and supplies the resultant defect data to the defective pixel selection unit 323. Thereafter, the black defect detection process is ended.

Thus, the defect correction unit 201 shown in FIG. 28 performs the defect correction process in the manner shown in FIG. 26 or in the manner shown in FIG. 27.

As described above, in the operation performed by the defect handling unit 51 shown in FIG. 28, the defect detection unit 303, as with the defect detection unit 103 shown in FIG. 4, detects defective pixels and defect levels thereof, and the defect detection unit 303 selects N defective pixels in decreasing order of the defect level starting from the highest defect level, and registers the selected N defective pixels in the defect data table, thereby making it possible to preferentially correct pixel values of defective pixels which are high in defect level.

Besides, because only defect data of N defective pixels with high defect levels are registered in the defect data table, it is allowed to use low-cost RAM with a low storage capacity as the defect data table memory 302 for storing the defect data table. In other words, in a case where the defect data table memory 302 for storing the defect data table is limited in storage capacity, N defective pixels with high defect levels are allowed to be registered in the defect data table in the defect data table memory 302 with limited storage capacity, thereby making it possible to preferentially correct pixel values of defective pixels which are high in defect level.

In the defect handling unit 51 shown in FIG. 28, the defect detection unit 303 detects defect types of respective defective pixels and describes the detected defect types in the defect data, in a similar manner to the defect detection unit 203 shown in FIG. 18. This makes it possible to correct defective pixels depending on defective types thereof in a highly reliable manner.

In the example shown in FIG. 29, the defect detection unit 303 includes both the white defect detection unit 321 for detecting white defective pixels and the black defect detection unit 322 for detecting black defective pixels. Alternatively, the defect detection unit 303 may include only one of the white defect detection unit 321 for detecting white defective pixels and the black defect detection unit 322 for detecting black defective pixels. However, in the case where the defect detection unit 303 includes only one of the white defect detection unit 321 and the black defect detection unit 322, it is possible to detect only white defective pixels or black defective pixels.

The processing sequence performed by the defect handling unit 51 (FIG. 3) may be executed by hardware or software. In the case where the processes are performed by software, a software program is installed on a general-purpose computer or the like.

FIG. 34 illustrates an example of a configuration of a computer which executes a program installed therein to perform the various processes described above.

The program may be stored, in advance, on a hard disk 405 or a ROM 403 serving as a storage medium, which is disposed inside the computer.

Alternatively, the program may be stored (recorded) temporarily or permanently on a removable storage medium 411 such as a floppy disk, a CD-ROM (Compact Disc Read Only Memory), a MO (Magnetooptical) disk, a DVD (Digital Versatile Disc), a magnetic disk, or a semiconductor memory. Such a removable storage medium 411 may be provided in the form of so-called package software.

Instead of installing the program from the removable storage medium 411 onto the computer, the program may also be transferred to the computer from a download site via a digital broadcasting satellite by means of radio transmission or via a network such as a LAN (Local Area Network) or the Internet by means of wire communication. In this case, the computer receives, using a communication unit 408, the program transmitted in the above-described manner and installs the program on the hard disk 405 disposed in the computer.

The computer includes a CPU (Central Processing Unit) 402. An input/output interface 410 is connected to the CPU 402 via a bus 401. If the CPU 402 receives, via the input/output interface 410, a command issued by a user using an input unit 407 including a keyboard, a mouse, microphone, or the like, the CPU 402 executes the program stored in a ROM (Read Only Memory) 403. Alternatively, the CPU 402 may execute a program loaded in a RAM (Random Access Memory) 404 wherein the program may be loaded into the RAM 404 by transferring a program stored on the hard disk 405 into the RAM 404, or transferring a program which has been installed on the hard disk 405 after being received from a satellite or a network via the communication unit 408, or transferring a program which has been installed on the hard disk 405 after being read from a removable recording medium 411 loaded on a drive 409. By executing the program, the CPU 402 performs the process described above with reference to the flow charts or the block diagrams. The CPU 402 outputs the result of the process, as required, to an output device including a LCD (Liquid Crystal Display) and/or a speaker via an input/output interface 410. The result of the process may also be transmitted via the communication unit 408 or may be stored on the hard disk 405.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

Although in the embodiments described above, the present invention is applied to a digital still camera, the present invention may be applied to a wide variety of image processing apparatuses, such as a video camera, adapted to process an image output from an image sensor such as a CCD or CMOS image sensor.

Although the present invention has been described above with reference to specific embodiments, the present invention is not limited to those specific embodiments described above, but various modifications are possible.

For example, a plurality of blocks may be integrated into a single block, or a single block may be implemented so as to provide functions provided by a plurality of separate blocks in the above embodiments. More specifically, in the defect detection unit 303 shown in FIG. 29, a single block for determining maximum value image data may be implemented such that it functions as both the maximum value detection unit 332 and the maximum value detection unit 344, and a single block for determining minimum value image data may be implemented such that it functions as both the minimum value detection unit 334 and the minimum value detection unit 342.

Furthermore, a frame memory for storing temporarily data may be shared various purposes. For example, although in the embodiment described above with reference to FIG. 19, the minimum value detection unit 231 of the white defect detection unit 221 in the defect detection unit 203 has the frame memory 143 for storing minimum value image data shown in FIG. 5, and the occurrence counter 232 has the frame memory 235 for storing the number of occurrences of white defects, the functions of these two frame memories 143 and 235 may be realized using a single frame memory.

In the embodiments described above, it is assumed that the defect detection process is performed in a production line of the digital still camera before digital still cameras are shipped. The defect detection process may be performed when a user of the digital still camera performs a particular operation.

It should be mentioned herein again that various modifications, combinations, sub-combinations and alterations may occur depending on design requirements and other factors insofar as they are within the scope of the appended claims or the equivalents thereof.

What is claimed is:

1. An image processing apparatus adapted to process an image output from image sensing means, comprising:
   defect detection means for detecting a defective pixel; and
   defect correction means for correcting a pixel value of a pixel of the image output from the image sensing means, in accordance with a defect data table in which defect data associated with the defective pixel detected by the defect detection means is registered,
   the defect detection means including
      white defect detection means and black defect detection means, the white defect detection means being adapted to detect a defective pixel and a defect level indicating the degree of a defect of the detected defective pixel, by comparing a maximum pixel value detected at each pixel position of a plurality of images captured via an image taking operation performed a plurality of times by the image sensing means with a threshold value for detecting white defect, the black defect detection means being adapted to detect a defective pixel and a defect level indicating the degree of a defect of the detected defective pixel, by comparing a minimum pixel value detected at each pixel position of the plurality of images with a threshold value for detecting black defect, and
      defective pixel selection means for selecting, based on the defect levels, a predetermined plurality of defective pixels with high defect degrees, and registering defect data associated with the predetermined plurality of selected defective pixels in the defect data table.

2. The image processing apparatus according to claim 1, wherein
   the threshold value for detecting white defect is a fixed threshold value determined in advance or is a variable threshold value dynamically determined depending on pixel values of pixels located close to a pixel being subjected to the comparison of the pixel value with respect to the threshold value for detecting white defect, and
   the threshold value for detecting black defect is a fixed threshold value determined in advance or is a variable threshold value dynamically determined depending on pixel values of pixels located close to a pixel being subjected to the comparison of the pixel value with respect to the threshold value for detecting black defect.

3. The image processing apparatus according to claim 1, wherein
   the white defect detection means is adapted to further
      count the number of occurrences of detection of white defect with pixel values greater than the threshold value for detecting white defect as counted separately for each pixel position over the plurality of images, and
      determine whether each detected defective pixel is of a permanent defect type or an intermittent defect type, on the basis of the relative magnitude of the minimum pixel value as observed at each pixel position over the plurality of images with respect to a predetermined threshold value smaller than the threshold value for detecting white defect, and on the basis of the number of occurrences of detection of white defect,
   the black defect detection means is adapted to further
      count the number of occurrences of detection of black defect with pixel values smaller than the threshold value for detecting black defect as counted separately for each pixel position over the plurality of images, and
      determine whether each detected defective pixel is of the permanent defect type or the intermittent defect type, on the basis of the relative magnitude of the maximum pixel value as observed at each pixel position over the plurality of images with respect to a predetermined threshold value greater than the threshold value for detecting black defect, and on the basis of the number of occurrences of detection of black defect, and
   the defect data includes data indicating types of respective defective pixels.

4. The image processing apparatus according to claim 3, wherein
   the threshold value for detecting white defect is set in advance to a fixed value or is dynamically set to a variable value determined depending on pixel values of pixels located close to a pixel under the white defect test, and
   the threshold value for detecting black defect is a fixed threshold value determined in advance or is a variable threshold value dynamically determined depending on pixel values of pixels located close to a pixel being subjected to the comparison of the pixel value with respect to the threshold value for detecting black defect.

5. The image processing apparatus according to claim 3, wherein the defect correction means is adapted to make the pixel value correction such that
   for any defective pixel of the permanent defect type in the image output from the image sensing means, the defect correction means unconditionally corrects the pixel value of each defective pixel, and
   for any defective pixel of the intermittent defect type in the image output from the image sensing means, the defect correction means determines whether each intermittent defective pixel is currently in a defective state by comparing the pixel value of each intermittent defective pixel with a threshold value for determining the state of intermittent defective pixels, and the defect correction means corrects the pixel value of each intermittent defective pixel if and only if it is determined that the intermittent defective pixel is in the defective state.

6. The image processing apparatus according to claim 5, wherein the threshold value for detecting intermittent defective pixels is a variable threshold value dynamically determined depending on pixel values of pixels located close to a pixel of interest being subjected to the comparison of the pixel value with respect to the threshold value for detecting intermittent defective pixels.

7. The image processing apparatus according to claim 5, wherein, for any non-defective pixel other than permanent defective pixels and intermittent defective pixels of the pixels of the image output from the image sensing means, the defect correction means determines whether each non-defective pixel is currently in a defective state by comparing the pixel value of each non-defective pixel with a threshold value for determining the state of non-defective pixels, and corrects a pixel value of each non-defective pixel if and only if the non-defective pixel of interest is determined to be currently in the defective state.

8. The image processing apparatus according to claim 7, wherein the threshold value for determining the state of non-defective pixels is a variable threshold value dynamically determined depending on pixel values of pixels located close to a non-defective pixel of interest being subjected to the comparison of the pixel value with respect to the threshold value.

9. The image processing apparatus according to claim 7, wherein the threshold value for determining the state of intermittent defective pixels and the threshold value for determining the state of non-defective pixels are different from each other.

10. A method of processing an image output from image sensing means, comprising the steps of:
  detecting a defective pixel; and
  correcting a pixel value of a pixel of the image output from the image sensing means, in accordance with a defect data table in which defect data associated with the defective pixel detected in the defective pixel detection step is registered,
  the defect detection step including
    a white defect detection step and a black defect detection step, the white defect detection step including detecting a defective pixel and a defect level indicating the degree of a defect of the detected defective pixel, by comparing a maximum pixel value detected at each pixel position of a plurality of images captured via an image taking operation performed a plurality of times by the image sensing means with a threshold value for detecting white defect, the black defect detection step including detecting a defective pixel and a defect level indicating the degree of a defect of the detected defective pixel, by comparing a minimum pixel value detected at each pixel position of the plurality of images with a threshold value for detecting black defect, and
    selecting, based on the defect levels, a predetermined plurality of defective pixels with high defect degrees, and registering defect data associated with the predetermined plurality of selected defective pixels in the defect data table.

11. A computer-readable storage medium storing, therein, a program, which, when executed by a computer processor, causes the computer to process an image output from an image sensing means by a method comprising the steps of:
  detecting a defective pixel;
  correcting a pixel value of a pixel of the image output from the image sensing means, in accordance with a defect data table in which defect data associated with the defective pixel detected in the defective pixel detection step is registered,
  the defect detection step including
    a white defect detection step and a black defect detection step, the white defect detection step including detecting a defective pixel and a defect level indicating the degree of a defect of the detected defective pixel, by comparing a maximum pixel value detected at each pixel position of a plurality of images captured via an image taking operation performed a plurality of times by the image sensing means with a threshold value for detecting white defect, the black defect detection step including detecting a defective pixel and a defect level indicating the degree of a defect of the detected defective pixel, by comparing a minimum pixel value detected at each pixel position of the plurality of images with a threshold value for detecting black defect, and
    selecting, based on the defect levels, a predetermined plurality of defective pixels with high defect degrees, and registering defect data associated with the predetermined plurality of selected defective pixels in the defect data table.

12. An image processing apparatus adapted to process an image output from an image sensor, comprising:
  a defect detection unit adapted to detect a defective pixel; and
  a defect correction unit adapted to correct a pixel value of a pixel of the image output from the image sensor, in accordance with a defect data table in which defect data associated with the defective pixel detected by the defect detection unit is registered,
  the defect detection unit including
    a white defect detection unit and a black defect detection unit, the white defect detection unit being adapted to detect a defective pixel and a defect level indicating the degree of a defect of the detected defective pixel, by comparing a maximum pixel value detected at each pixel position of a plurality of images captured via an image taking operation performed a plurality of times by the image sensor with a threshold value for detecting white defect, the black defect detection unit being adapted to detect a defective pixel and a defect level indicating the degree of a defect of the detected defective pixel, by comparing a minimum pixel value detected at each pixel position of the plurality of images with a threshold value for detecting black defect, and
    a defective pixel selection unit adapted to select, based on the defect levels, a predetermined plurality of defective pixels with high defect degrees, and registering defect data associated with the predetermined plurality of selected defective pixels in the defect data table.

* * * * *